(12) United States Patent
Maruyama et al.

(10) Patent No.: US 10,368,017 B2
(45) Date of Patent: Jul. 30, 2019

(54) IMAGE PROCESSING APPARATUS, IMAGE PROCESSING METHOD, AND COMPUTER-READABLE RECORDING MEDIUM

(71) Applicant: OLYMPUS CORPORATION, Tokyo (JP)

(72) Inventors: Hiroki Maruyama, Hino (JP); Manabu Ichikawa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 6 days.

(21) Appl. No.: 15/845,166

(22) Filed: Dec. 18, 2017

(65) Prior Publication Data
US 2018/0109745 A1    Apr. 19, 2018

Related U.S. Application Data

(63) Continuation of application No. PCT/JP2015/071175, filed on Jul. 24, 2015.

(51) Int. Cl.
*H04N 5/357* (2011.01)
*H04N 1/409* (2006.01)
(Continued)

(52) U.S. Cl.
CPC ............ *H04N 5/357* (2013.01); *G06T 5/002* (2013.01); *G06T 5/50* (2013.01); *H04N 1/409* (2013.01); *H04N 5/21* (2013.01); *H04N 5/217* (2013.01); *H04N 5/2173* (2013.01); *H04N 5/232* (2013.01); *H04N 5/23209* (2013.01); *H04N 5/3575* (2013.01); *H04N 5/378* (2013.01); *G06T 2207/20216* (2013.01)

(58) Field of Classification Search
CPC ...................................................... H04N 5/357
See application file for complete search history.

(56) References Cited

U.S. PATENT DOCUMENTS

2010/0066868 A1*  3/2010  Shohara ................... G06K 9/40
                                                                      348/241
2014/0375846 A1*  12/2014  Toyoda ................... G06T 5/002
                                                                      348/241

FOREIGN PATENT DOCUMENTS

JP     2010124321 A    6/2010
JP     2012105063 A    5/2012
(Continued)

OTHER PUBLICATIONS

International Search Report dated Oct. 27, 2015 issued in PCT/JP2015/071175.

*Primary Examiner* — Jefferey F Harold
*Assistant Examiner* — Justin B Sanders
(74) *Attorney, Agent, or Firm* — Scully, Scott, Murphy & Presser, P.C.

(57) ABSTRACT

An image processing apparatus includes: an acquisition unit configured to acquire image data and noise information including one of positional information on a reading circuit in which blinking defect noise caused by the reading circuit occurs and positional information on each of pixels; and a correction unit configured to set the image data acquired by the acquisition unit as correction target image data, and correct a pixel value of a pixel of interest of the correction target image data based on the noise information and reference image data that is based on image data acquired at a time different from the correction target image data.

17 Claims, 27 Drawing Sheets

(51) Int. Cl.
*H04N 5/21* (2006.01)
*H04N 5/232* (2006.01)
*G06T 5/00* (2006.01)
*G06T 5/50* (2006.01)
*H04N 5/217* (2011.01)
*H04N 5/378* (2011.01)

(56) References Cited

FOREIGN PATENT DOCUMENTS

| | | | | |
|---|---|---|---|---|
| JP | 2014107611 A | * | 6/2014 | ............... H04N 9/64 |
| JP | 2014107611 A | | 6/2014 | |

* cited by examiner

IMAGE PROCESSING APPARATUS, IMAGE PROCESSING METHOD, AND COMPUTER-READABLE RECORDING MEDIUM

CROSS-REFERENCE TO RELATED APPLICATIONS

This application is a continuation of PCT international application Ser. No. PCT/JP2015/071175 filed on Jul. 24, 2015 which designates the United States, incorporated herein by reference.

BACKGROUND

1. Technical Field

The disclosure relates to an image processing apparatus, an image processing method, and a computer-readable recording medium.

2. Related Art

In recent years, in an image sensor, such as a complementary metal oxide semiconductor (CMOS), miniaturization of pixels and a reading circuit for reading signals from the pixels has been developed. Such a miniaturized reading circuit causes reduction in sensitivity and increase in various kinds of noise. To cope with the reduction in sensitivity, a sharing pixel structure is adopted, in which a single reading circuit is shared by a plurality of pixels to read signals, in order to reduce an area required for the circuit in an image sensor and increase an aperture ratio (a percentage of a light-receiving unit) of each of the pixels to thereby improve the sensitivity.

Meanwhile, examples of noise that occurs in the image sensor include dark current shot noise due to a dark current, random noise due to thermal noise or the like in a reading circuit, a defective pixel in which a pixel value always shows an abnormal value, and blinking defect noise in which a pixel value randomly fluctuates. The blinking defect noise as mentioned above includes random telegraph signal (RTS) noise caused by a reading circuit. As a technology for correcting the RTS noise, there is a known technology in which whether there is an influence of the RTS noise on a pixel of interest in a captured image is determined based on a pixel value of the pixel of interest, a pixel value of a neighboring pixel of the pixel of interest, and a noise level of the RTS noise that is detected in advance for each of the pixels of the image sensor (hereinafter, referred to as an "RTS noise level"), and when it is determined that there is an influence of the RTS noise, the RTS noise level is added to or subtracted from the pixel value of the pixel of interest (see JP 2012-105063 A).

SUMMARY

In some embodiments, provided is an image processing apparatus for correcting blinking defect noise contained in image data generated by an image sensor, the image sensor including: a plurality of pixels arranged two-dimensionally and configured to receive light from outside to generate a signal according to an amount of the received light; and a plurality of reading circuits configured to read the signal as a pixel value. The image processing apparatus includes: an acquisition unit configured to acquire the image data and noise information including one of positional information on a reading circuit in which blinking defect noise caused by the reading circuit occurs and positional information on each of the pixels; and a correction unit configured to set the image data acquired by the acquisition unit as correction target image data, and correct a pixel value of a pixel of interest of the correction target image data based on the noise information and reference image data that is based on image data acquired at a time different from the correction target image data.

In some embodiments, provided is an image processing method performed by an image processing apparatus for correcting blinking defect noise contained in image data generated by an image sensor, the image sensor including: a plurality of pixels arranged two-dimensionally and configured to receive light from outside to generate a signal according to an amount of the received light; and a plurality of reading circuits configured to read the signal as a pixel value. The image processing method includes: acquiring the image data and noise information including one of positional information on a reading circuit in which blinking defect noise caused by the reading circuit occurs and positional information on each of the pixels; setting the acquired image data as correction target image data; and correcting a pixel value of a pixel of interest of the correction target image data based on the noise information and reference image data that is based on image data acquired at a time different from the correction target image data.

In some embodiments, provided is a non-transitory computer-readable recording medium recording an program. The program causes an image processing apparatus for correcting blinking defect noise contained in image data generated by an image sensor, the image sensor comprising: a plurality of pixels arranged two-dimensionally and configured to receive light from outside to generate a signal according to an amount of the received light; and a plurality of reading circuits configured to read the signal as a pixel value, to execute: acquiring the image data and noise information including one of positional information on a reading circuit in which blinking defect noise caused by the reading circuit occurs and positional information on each of the pixels; setting the acquired image data as correction target image data; and correcting a pixel value of a pixel of interest of the correction target image data based on the noise information and reference image data that is based on image data acquired at a time different from the correction target image data.

The above and other features, advantages and technical and industrial significance of this disclosure will be better understood by reading the following detailed description of presently preferred embodiments of the disclosure, when considered in connection with the accompanying drawings.

DETAILED DESCRIPTION

Modes for carrying out the disclosure (hereinafter, referred to as "embodiment(s)") will be described below with reference to the drawings. The disclosure is not limited by the embodiments below. The same components are denoted by the same reference signs throughout the drawings.

First Embodiment

Configuration of Imaging System

Figure 1:
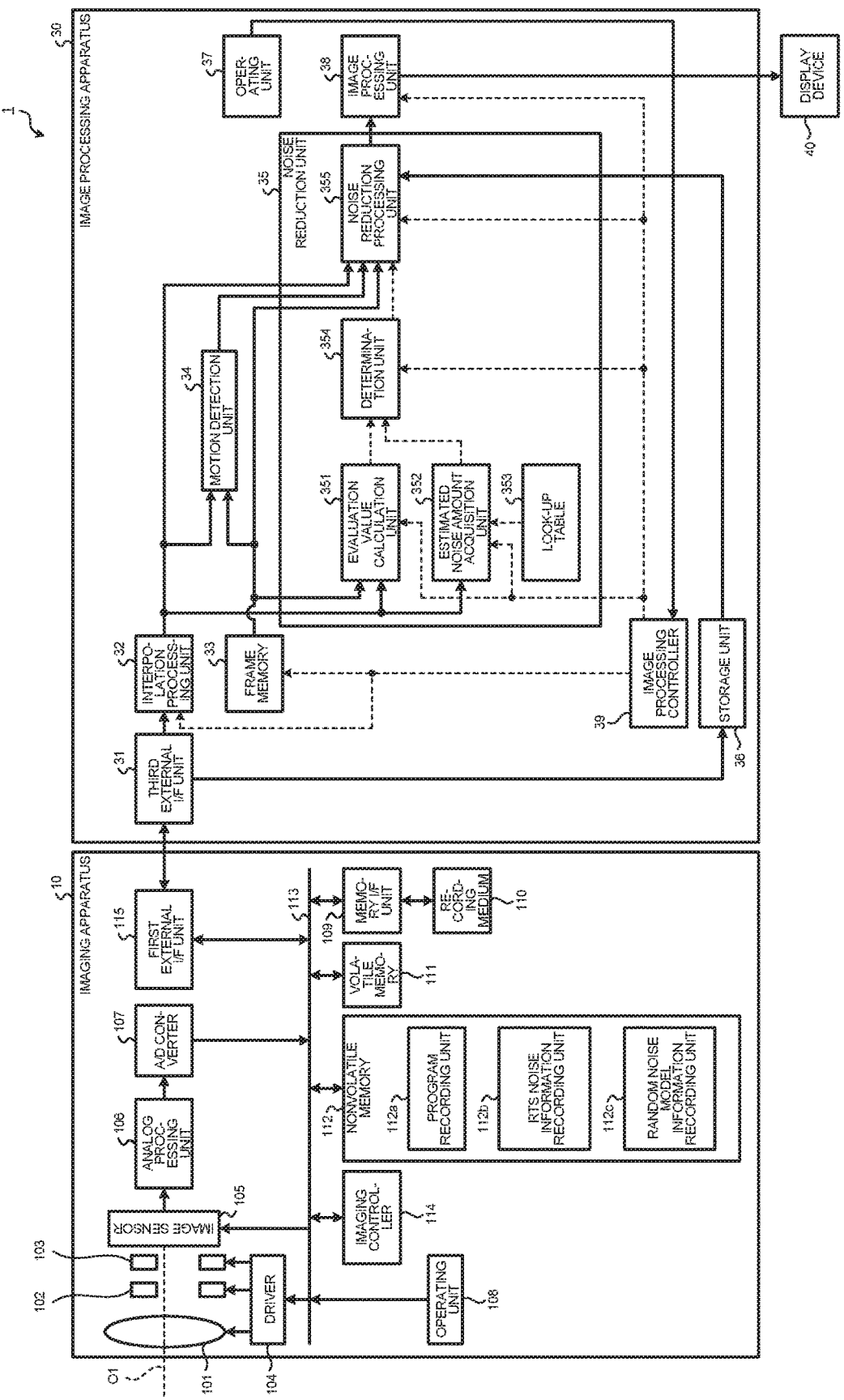
FIG. 1 is a block diagram schematically illustrating a configuration of an imaging system according to a first embodiment of the disclosure.

FIG. 1 is a block diagram schematically illustrating a configuration of an imaging system according to a first embodiment of the disclosure. An imaging system 1 illustrated in FIG. 1 includes an imaging apparatus 10, an image processing apparatus 30, and a display device 40.

Configuration of Imaging Apparatus

First, a configuration of the imaging apparatus 10 will be described. As illustrated in FIG. 1, the imaging apparatus 10 includes an optical system 101, a diaphragm 102, a shutter 103, a driver 104, an image sensor 105, an analog processing unit 106, an A/D converter 107, an operating unit 108, a memory I/F unit 109, a recording medium 110, a volatile memory 111, a nonvolatile memory 112, a bus 113, an imaging controller 114, and a first external I/F unit 115.

The optical system 101 is constituted by one or more lenses. The optical system 101 is constituted by, for example, a focus lens and a zoom lens.

The diaphragm 102 adjusts exposure by limiting an incident amount of light collected by the optical system 101. The diaphragm 102 limits the incident amount of light collected by the optical system 101 under the control of the imaging controller 114 to be described later. It may be possible to control the incident amount of light by using the shutter 103 or an electronic shutter in the image sensor 105 without using the diaphragm 102. The optical system 101 and the diaphragm 102 may be detachably attached to the imaging apparatus 10.

The shutter 103 sets a state of the image sensor 105 to an exposure state or a light blocking state. The shutter 103 is constituted by, for example, a focal plane shutter or the like. It may be possible to use the electronic shutter in the image sensor 105 without using the shutter 103.

The driver 104 drives the optical system 101, the diaphragm 102, and the shutter 103 under the control of the imaging controller 114 to be described later. For example, the driver 104 moves the optical system 101 along an optical axis O1 to change a zoom magnification or adjust a focus position of the imaging apparatus 10.

The image sensor 105 receives light collected by the optical system 101, converts the light into image data (electrical signal), and outputs the image data under the control of the imaging controller 114 to be described later. The image sensor 105 is constituted by a complementary metal oxide semiconductor (CMOS) having a plurality of pixels arranged two-dimensionally, or the like. An RGB filter of Bayer arrangement is arranged in front of each of the pixels. The image sensor 105 is not limited to the Bayer arrangement, and may be a stacked type such as Foveon, for example. The filter to be used is not limited to RGB, and an arbitrary filter, such as a complementary color filter, may be applied. It may be possible to separately arrange a light source capable of applying different color light in a time division manner without arranging a filter in the image sensor 105, and form a color image by using sequentially fetched images while changing a color to be applied. The image sensor 105 has an electronic shutter function capable of electronically controlling an amount of received light.

Figure 2:
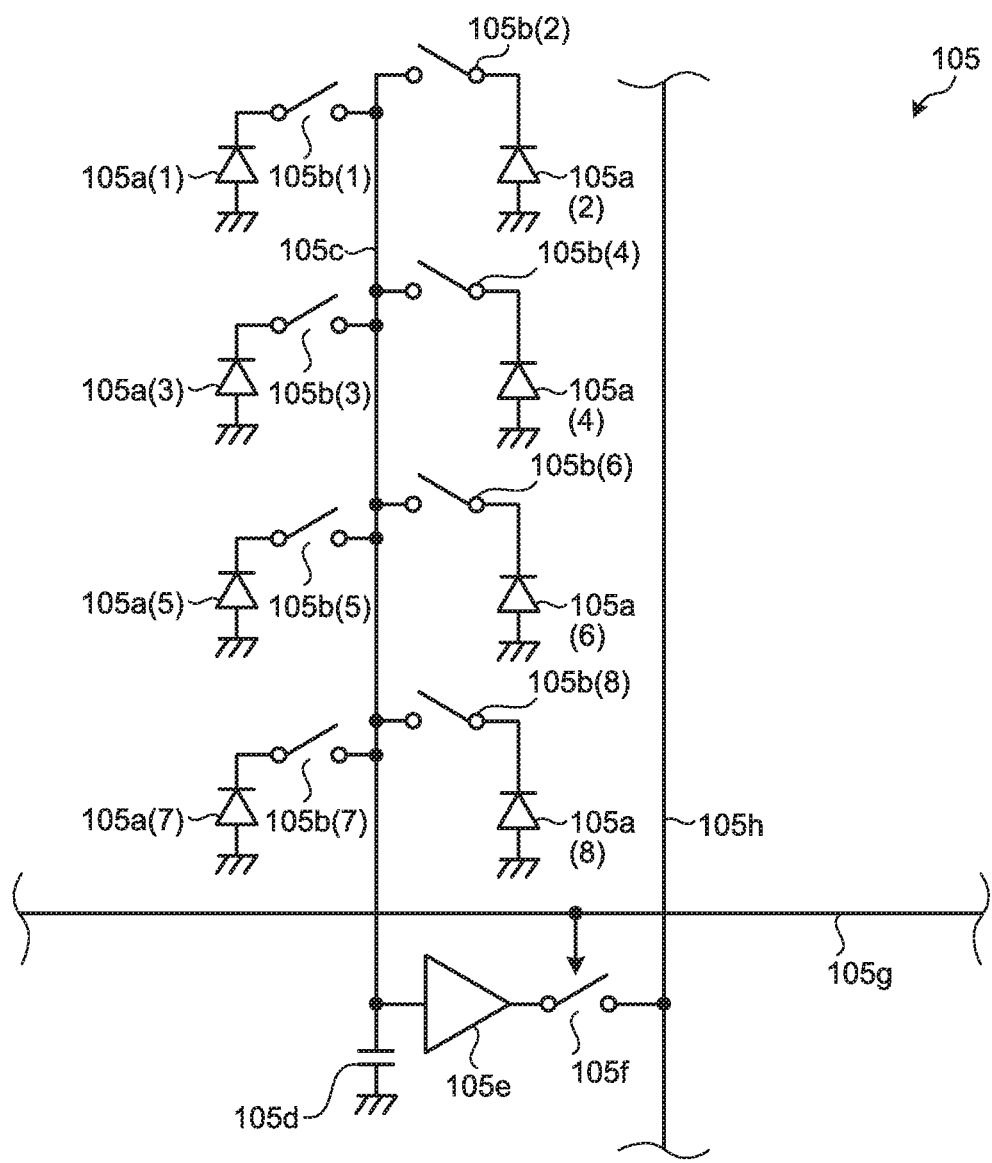
FIG. 2 is a schematic diagram illustrating a main part of an image sensor included in an imaging apparatus according to the first embodiment of the disclosure.

A configuration of the image sensor 105 will be described in detail below. FIG. 2 is a schematic diagram illustrating a main part of the image sensor 105. The image sensor 105 illustrated in FIG. 2 is an example in which a reading circuit is shared by a plurality of pixels in order to improve aperture ratios of the pixels to thereby improve sensitivity. In the image sensor 105 illustrated in FIG. 2, a single reading circuit is arranged for eight pixels, i.e., two pixels in a horizontal direction (lateral direction)×four pixels in a vertical direction (longitudinal direction). In FIG. 2, an example is illustrated in which a single group is formed by a single reading circuit and eight pixels, i.e., two pixels in the horizontal direction (lateral direction)×four pixels in the vertical direction (longitudinal direction); however, it is assumed that the pixels and the reading circuit as described above are arranged side by side in the horizontal direction and the vertical direction on the image sensor 105 of the first embodiment.

As illustrated in FIG. 2, the image sensor 105 includes a plurality of pixels (photodiodes) 105a that receive light by exposure and perform photoelectric conversion to generate charges corresponding to the exposure amounts, first switches 105b that are provided on the respective pixels 105a and opened and closed according to the control of the imaging controller 114, a vertical transfer line 105c that vertically transfers a signal (charge) output from each of the pixels 105a, a floating diffusion (FD) unit 105d that accumulates the signal output from each of the pixels 105a, an amplification unit 105e that amplifies a signal output from the FD unit 105d, a second switch 105f that is opened and closed according to the control of the imaging controller 114, a control line 105g that controls the second switch 105f, and a transfer line 105h that transfers an electrical signal amplified by the amplification unit 105e.

When reading signals corresponding to the exposure amounts in the pixels 105a(1) to 105a(8) as pixel values, the image sensor 105 configured as described above sets the FD unit 105d to a reset state and the imaging controller 114 turns on only the first switch 105b(1), so that a charge generated in the pixel 105a(1) is transferred to the FD unit 105d. Thereafter, the imaging controller 114 turns on the second switch 105f, and the image sensor 105 causes the amplification unit 105e to amplify the charge accumulated in the FD unit 105d and reads (outputs) the amplified charge as a pixel value. Subsequently, the image sensor 105 sets the FD unit 105d to the reset state and the imaging controller 114 turns on only the first switch 105b(2), so that a charge generated in the pixel 105a(2) is transferred to the FD unit 105d. Thereafter, the imaging controller 114 turns on the second switch 105f, and the image sensor 105 causes the amplification unit 105e to amplify the charge accumulated in the FD unit 105d and reads the amplified charge as a pixel value. By sequentially performing read operations as described above, the image sensor 105 can sequentially output signals corresponding to the exposure amounts in the pixels 105a(1) to 105a(8) as pixel values. In the first embodiment, the amplification unit 105e functions as a reading circuit that reads a charge from each of the pixels 105a.

Referring back to FIG. 1, the explanation of the configuration of the imaging apparatus 10 will be continued.

The analog processing unit 106 performs predetermined analog processing on an analog signal input from the image sensor 105, and outputs the processed signal to the A/D converter 107. Specifically, the analog processing unit 106 performs noise reduction processing, gain up processing, or the like on the analog signal input from the image sensor 105. For example, the analog processing unit 106 performs waveform shaping after reducing reset noise or the like with respect to the analog signal, and then increases gain so as to achieve target brightness.

The A/D converter 107 generates digital image data (hereinafter, referred to as "RAW image data") by performing A/D conversion on the analog signal input from the analog processing unit 106, and outputs the RAW image data to the volatile memory 111 via the bus 113. The A/D converter 107 may directly output the RAW image data to each of the units of the imaging apparatus 10 to be described later. The analog processing unit 106 and the A/D converter 107 as described above may be provided in the image sensor 105, and the image sensor 105 may directly output digital RAW image data.

The operating unit 108 gives various instructions on the imaging apparatus 10. Specifically, the operating unit 108 includes a power switch that changes a power supply state of the imaging apparatus 10 to an ON state or an OFF state, a release switch that gives an instruction to capture a still image, an operation switch that switches between various settings of the imaging apparatus 10, a moving image switch that gives an instruction to capture a moving image, and the like.

The recording medium 110 is constituted by a memory card externally attached to and detached from the imaging apparatus 10, and detachably attached to the imaging apparatus 10 via the memory I/F unit 109. The recording medium 110 may output programs and various kinds of information to the nonvolatile memory 112 via the memory I/F unit 109 under the control of the imaging controller 114 to be described later.

The volatile memory 111 temporarily stores image data input from the A/D converter 107 via the bus 113. For example, the volatile memory 111 temporarily stores image data sequentially output by the image sensor 105 frame by frame via the analog processing unit 106, the A/D converter 107, and the bus 113. The volatile memory 111 is constituted by a synchronous dynamic random access memory (SDRAM) or the like.

The nonvolatile memory 112 is constituted by a flash memory or the like, and records various programs for operating the imaging apparatus 10 and various kinds of data used during execution of the programs. The nonvolatile memory 112 includes a program recording unit 112a, an RTS noise information recording unit 112b that records RTS noise information, in which positional information on the reading circuit (the amplification unit 105e) for reading a pixel value or positional information on each of the pixels 105a is associated with a characteristic amount related to RTS noise caused by the reading circuit (the amplification unit 105e), and a random noise model information recording unit 112c that records one or more random noise models. Here, the characteristic amount is any one of the amplitude of the RTS noise (RTS_Value), the occurrence frequency of blinking defect noise, and the occurrence frequency in the RTS noise less than the amplitude of the RTS noise.

The bus 113 is constituted by a transmission path or the like that connects constituent parts of the imaging apparatus 10, and transfers various kinds of data generated inside the imaging apparatus 10 to each of the constituent parts of the imaging apparatus 10.

The imaging controller 114 is constituted by a central processing unit (CPU) or the like, and comprehensively controls operations of the imaging apparatus 10 by issuing instructions or transferring data to each of the units of the imaging apparatus 10 in accordance with a command signal or a release signal from the operating unit 108. For example, when a second release signal is input from the operating unit 108, the imaging controller 114 starts to control an imaging operation in the imaging apparatus 10. Here, the imaging operation in the imaging apparatus 10 is a predetermined processing operation performed by the analog processing unit 106 and the A/D converter 107 with respect to an exposure timing of the image sensor 105, an output timing of the analog signal, and the analog signal output from the image sensor 105. The image data subjected to the processing as described above is recorded in the recording medium 110 via the bus 113 and the memory I/F unit 109 under the control of the imaging controller 114.

The first external I/F unit 115 outputs information input from an external apparatus via the bus 113 to the nonvolatile memory 112 or the volatile memory 111, and outputs information stored in the volatile memory 111, information stored in the nonvolatile memory 112, and image data generated by the image sensor 105 to an external apparatus via the bus 113. Specifically, the first external I/F unit 115 outputs RAW image data generated by the image sensor 105, RTS noise information, and random noise model information to the image processing apparatus 30 via the bus 113.

Configuration of Image Processing Apparatus

Next, a configuration of the image processing apparatus 30 will be described. The image processing apparatus 30 includes a third external I/F unit 31, an interpolation processing unit 32, a frame memory 33, a motion detection unit 34, a noise reduction unit 35, a storage unit 36, an operating unit 37, an image processing unit 38, and an image processing controller 39.

The third external I/F unit 31 acquires, via the first external I/F unit 115 of the imaging apparatus 10, image data generated by the image sensor 105, RTS noise information on RTS noise recorded in the RTS noise information recording unit 112b inside the nonvolatile memory 112, and random noise model information recorded in the random noise model information recording unit 112c, and outputs the RAW image data (correction target image data), the RTS noise information, and the random noise model information acquired as above to the interpolation processing unit 32 and the storage unit 36. The third external I/F unit 31 and the first external I/F unit 115 are connected via a control cable, wireless communication, or the like capable of exchanging information bidirectionally, for example. In the first embodiment, the third external I/F unit 31 functions as an acquisition unit.

The interpolation processing unit 32 performs interpolation processing on the RAW image data, which is generated by the image sensor 105 and input from the third external I/F unit 31. Specifically, when the image sensor 105 has Bayer arrangement, the interpolation processing unit 32 performs interpolation processing on each of pixels in a RAW image corresponding to the RAW image data (hereinafter, referred to as a "current image") in order to interpolate a lost pixel value (signal value) and generate a current image in which pixel values of all of R, G, and B signals are provided at each of the pixels, and outputs the current image to the noise reduction unit 35.

The frame memory 33 is bidirectionally connected to the noise reduction unit 35, and temporarily stores frame data of an image to be displayed on the display device 40.

The motion detection unit 34 detects a motion vector (movement amount) of a subject based on a current image input from the interpolation processing unit 32, a current image which is stored in the frame memory 33 and in which noise is corrected by the noise reduction unit 35, and a corrected image (hereinafter, referred to as a "past image") corresponding to corrected image data that is temporally continued to the current image, and outputs a detection result to the noise reduction unit 35. The motion detection unit 34 detects a motion vector by using, for example, a well-known block matching process or the like. For example, the motion detection unit 34 detects a characteristic amount of a pixel of interest of the current image and a characteristic amount of a past image corresponding to a characteristic amount position of the pixel of interest of the current image, subsequently detects a pixel of the past image at which a distance between the characteristic amount and the characteristic amount of the pixel of interest of the current image is minimum, and finally detects a motion vector based on a position of the detected pixel and a position of the pixel of interest of the current image. Here, the characteristic amount of the pixel of interest of the current image and the characteristic amount of the past image corresponding to the characteristic amount position of the pixel of interest of the current image are pixel values, luminance values, or the like. The motion detection unit 34 may detect a motion vector for each of the pixels of the current image. In the first embodiment, the motion detection unit 34 functions as a movement amount calculation unit.

The noise reduction unit 35 performs a noise reduction process (hereinafter, referred to as an "NR processing") on the current image input from the interpolation processing unit 32. Specifically, the noise reduction unit 35 discriminates a rest state and a moving state for each of the pixels of the current image, and changes the NR processing depending on a discrimination result. For example, when determining that the current image is in the rest state, the noise reduction unit 35 selects a first NR processing (hereinafter, referred to as a "time-direction NR processing") for reducing noise in a time direction in which high-frequency components can be retained, and when determining that the current image is in the moving state, selects a second NR processing (hereinafter, referred to as a "spatial-direction NR processing) for reducing noise in a spatial direction. Here, the time-direction NR processing is processing for reducing noise by a weighted averaging process using a current image serving as a target of the NR processing and a past image (reference image data) acquired at a time different from the current image. In the weighted averaging process, a pixel of interest (processing target pixel) of the current image and a pixel (processing target pixel) of the past image corresponding to a position of the pixel of interest of the current image are used. The spatial-direction NR processing is processing for reducing noise by a weighted averaging process using a pixel of interest (processing target pixel) serving as a target of the NR processing and a neighboring pixel located around the pixel of interest. The rest state indicates a state in which a relative positional relationship between the image sensor 105 (the imaging apparatus 10) and a subject does not change over time. Furthermore, the moving state indicates a state in which the relative positional relationship between the image sensor 105 (the imaging apparatus 10) and a subject changes over time. In the first embodiment, the noise reduction unit 35 functions as a correction unit. When the subject is not moving, the noise reduction unit 35 may acquire, from the storage unit 36, a pixel value of a pixel of the past image corresponding to a neighboring pixel of the pixel of interest of the current image, and correct the pixel value of the pixel of interest based on the acquired pixel value of the pixel of the past image.

A detailed configuration of the noise reduction unit 35 will be described below. The noise reduction unit 35 includes an evaluation value calculation unit 351, an estimated noise amount acquisition unit 352, a look-up table 353, a determination unit 354, and a noise reduction processing unit 355.

The evaluation value calculation unit 351 calculates an evaluation value for determining whether a subject included in each of the temporally continued current images input from the interpolation processing unit 32 and the past images input from the frame memory 33 is in the rest state throughout frames.

The estimated noise amount acquisition unit 352 acquires an estimated noise amount that is estimated from an image corresponding to the image data input from the interpolation processing unit 32.

The look-up table 353 stores a noise model used when the estimated noise amount acquisition unit 352 estimates a noise amount.

The determination unit 354 determines whether the subject in the current image input from the interpolation processing unit 32 is in the rest state based on the evaluation value calculated by the evaluation value calculation unit 351 and the estimated noise amount acquired by the estimated noise amount acquisition unit 352.

When RTS noise is likely to occur at the pixel of interest, the noise reduction processing unit 355 increases intensity of noise reduction to correct the pixel value of the pixel of interest, and outputs the corrected pixel value to the image processing unit 38.

The storage unit 36 is constituted by a volatile memory or a nonvolatile memory, and stores the RTS noise information and a plurality of past images output from the third external I/F unit 31.

The operating unit 37 receives input of various operation signals related to the image processing apparatus 30. The operating unit 37 is constituted by, for example, a directional button, a push button, a touch panel, or the like.

The image processing unit 38 performs predetermined image processing on the RAW image data in which noise is reduced, and outputs the processed RAW image data to the display device 40. Here, the predetermined image processing executes basic image processing including at least white balance adjustment processing, gamma correction processing, color reproduction processing, edge enhancement processing, and the like. The image processing unit 38 also performs image processing for reproducing a natural image based on preset parameters of each image processing. Here, the parameters of each image processing are values of contrast, sharpness, saturation, white balance, and gradation.

The image processing controller 39 comprehensively controls each of the units included in the image processing apparatus 30. The image processing controller 39 is constituted by a central processing unit (CPU) or the like. The image processing controller 39 controls instructions, transfer of data, or the like to each of the units included in the image processing apparatus 30.

Configuration of Display Device

Next, a configuration of the display device 40 will be described. The display device 40 displays an image corresponding to image data input from the image processing apparatus 30. The display device 40 is constituted by a display panel made of liquid crystal, organic electro luminescence (EL), or the like.

In the imaging system 1 configured as described above, the image processing apparatus 30 corrects RTS noise that occurs in the image sensor 105, and the display device 40 displays an image corresponding to image data on which image processing is performed by the image processing apparatus 30.

Cause and Characteristics of RTS Noise

Next, a cause of the RTS noise and characteristics of the RTS noise will be described.

Figure 3:
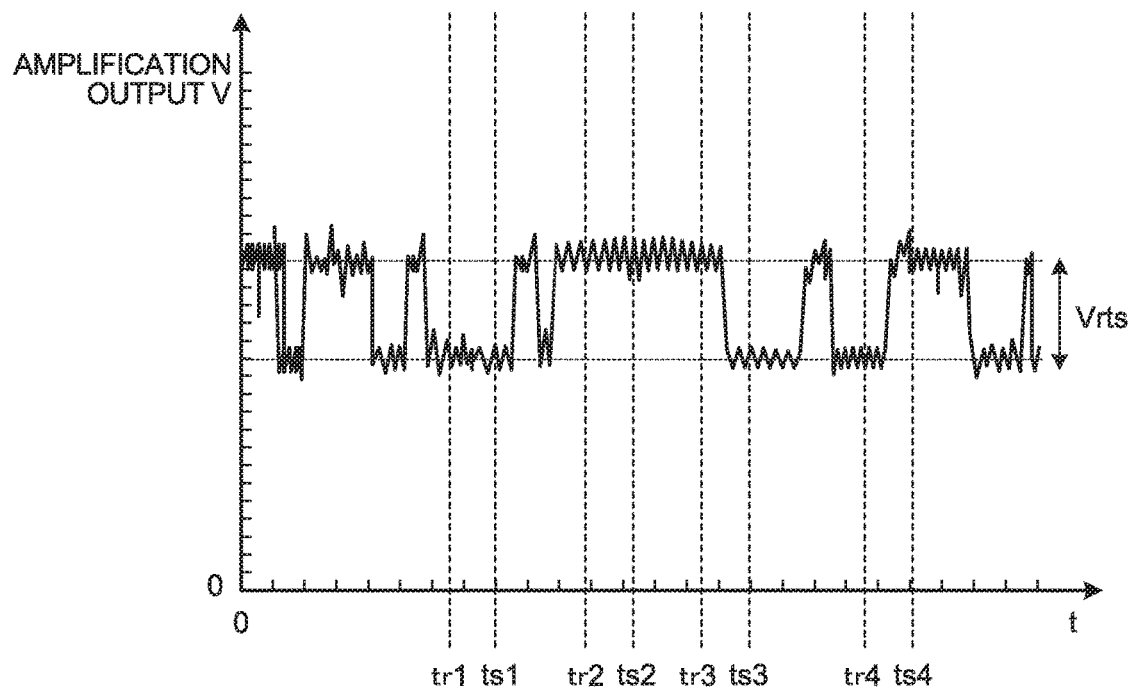
FIG. 3 is a diagram illustrating an example of fluctuation in an amplification output that is output from an amplification unit when RTS noise occurs in a case where light is blocked so that light does not hit the image sensor according to the first embodiment of the disclosure.
Figure 4:
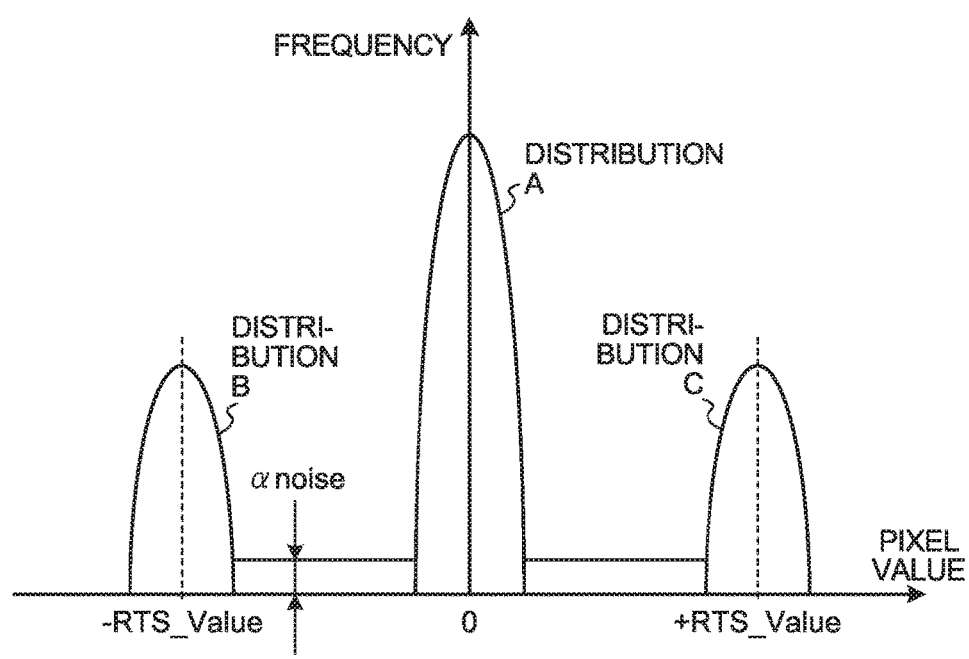
FIG. 4 is a diagram illustrating an example of a distribution of a pixel value that is read by using an amplification unit where RTS noise occurs according to the first embodiment of the disclosure.

FIG. 3 is a diagram illustrating an example of fluctuation in an amplification output that is output from the amplification unit 105e when RTS noise occurs in a case where light is blocked so that light does not hit the image sensor 105. FIG. 4 is a diagram illustrating an example of a distribution of a pixel value that is read by using the amplification unit 105e where the RTS noise occurs.

In a case where a trap level is present in a gate oxide film in the amplification unit 105e, the RTS noise occurs when a charge is captured or discharged at the trap level at a random timing. Therefore, as illustrated in FIG. 3, in the amplification unit 105e where RTS noise occurs, the amplification output fluctuates at random within a range of about Vrts. In addition, fluctuation of a potential does not occur instantaneously, but it takes a short period of time τ.

In general, in the image sensor 105, correlated double sampling processing (hereinafter referred to as "CDS processing") is performed in order to reduce noise from the pixel value read from the pixel 105a. In the CDS processing, the imaging controller 114 turns on a reset switch (not illustrated) of the image sensor 105 to reset a charge of the FD unit 105d, and the imaging controller 114 turns on the second switch 105f to generate a reset state to read (output) a reset state signal (reference signal). Subsequently, in the CDS processing, the imaging controller 114 turns on only the first switch 105b (or any of the first switches 105b(1) to 105b(8)) to transfer a charge generated at the pixel 105a to the FD unit 105d, generates a read state (output state) in which the second switch 105f is turned on, and reads (outputs) a read state signal. Subsequently, in the CDS processing, a signal obtained by subtracting the reset state signal (reference signal) from the read state signal is converted as a pixel value.

As illustrated in FIG. 3, when the image sensor 105 reads signals at time tr1 (reset state) and time ts1 (read state) through the CDS processing, amplification outputs V at the time tr1 and the time ts1 are substantially the same, so that the read pixel value is mainly influenced by random noise and distributed with the center at zero like a distribution A as illustrated in FIG. 4. Similarly, even at time tr2 (reset state) and time ts2 (read state), the image sensor 105 has substantially the same amplification outputs V at the time tr2 and the time ts2, so that the read pixel value is distributed like the distribution A as illustrated in FIG. 4.

Meanwhile, when the image sensor 105 reads signals at time tr3 (reset state) and time ts3 (read state) through the CDS processing, an amplification output at the time ts3 is about Vrts lower than an amplification output at the time tr3; therefore, when taking a difference between the two signals, the read pixel value is shifted in the minus direction by RTS_Value, which is a pixel value corresponding to Vrts that is a change amount of the amplification output, and is distributed like a distribution B centered at -RTS_Value.

In contrast, when the image sensor 105 reads signals at time tr4 (reset state) and time ts4 (read state) through the CDS processing, an amplification output at the time ts4 is about Vrts higher than an amplification output at the time tr4; therefore, when taking a difference between the two signals, the read pixel value is shifted in the plus direction by RTS_Value, which is the pixel value corresponding to Vrts that is the change amount of the amplification output, and is distributed like a distribution C centered at RTS_Value.

Here, the fluctuation of the amplification output in FIG. 3 occurs with time τ, so that a signal may be read while the potential fluctuates. In this case, an amplification output difference is larger than -Vrts and smaller than Vrts between a read time in the reset state and a read time in the read state. Consequently, a pixel value read from the image sensor 105 is also larger than -RTS_Value and smaller than RTS_Value. It can be assumed that the time τ is substantially constant when conditions (for example, temperature, driving voltage, or the like) of the image sensor 105 are constant; therefore, pixel values larger than -RTS_Value and smaller than RTS_Value occur with the similar probabilities. Here, the occurrence frequency of these pixel values is defined as αnoise. In addition, the distribution B and the distribution C are similar to each other except for median values. Therefore, hereinafter, a ratio of the distribution B or the distribution C to the distribution A is defined as arts. This arts increases as a fluctuation cycle of the amplification output of the amplification unit 105e decreases.

The pixel value read by using the amplification unit 105e where the RTS noise occurs through the CDS processing as described above is distributed as illustrated in FIG. 4. Under the condition that the image sensor 105 is exposed to light, the potential in the read state changes according to the exposure amount. However, the change in the potential due to the RTS noise is constant regardless of the exposure amount. That is, the RTS noise is independent of the exposure amount, and has a characteristic of randomly fluctuating with respect to a normal pixel value in a range from -RTS_Value or more and RTS_Value or less. In FIG. 4, the distribution A, the distribution B, and the distribution C are schematically illustrated; however, they are generally obtained as normal distributions.

In addition, the RTS noise is noise caused by the reading circuit (the amplification unit 105e); therefore, when the plurality of pixels 105a share a single reading circuit as illustrated in FIG. 2, RTS noise with similar characteristics occurs in all of the sharing pixels (the pixels 105a(1) to 105a(8)).

In addition to the reading circuit (the amplification unit 105e) illustrated in FIG. 2, RTS noise may also occur in a column amplifier, a source follower, or the like which is shared in the column direction of the image sensor 105. In this case, RTS noise with the similar characteristics occurs in all of pixels in the column direction in which the same column amplifier and the same source follower are shared. In the present embodiment, the disclosed technology is also applicable to RTS noise that occurs in a circuit other than the reading circuit (the amplification unit 105e).

As described above, when a subject is fixed and captured under the same conditions, RTS noise occurs as one type of blinking defect noise that causes a pixel value of a captured image to oscillate (fluctuate) within a certain range (-RTS_Value or more and RTS_Value or less).

Processing Performed by Image Processing Apparatus

Figure 5:
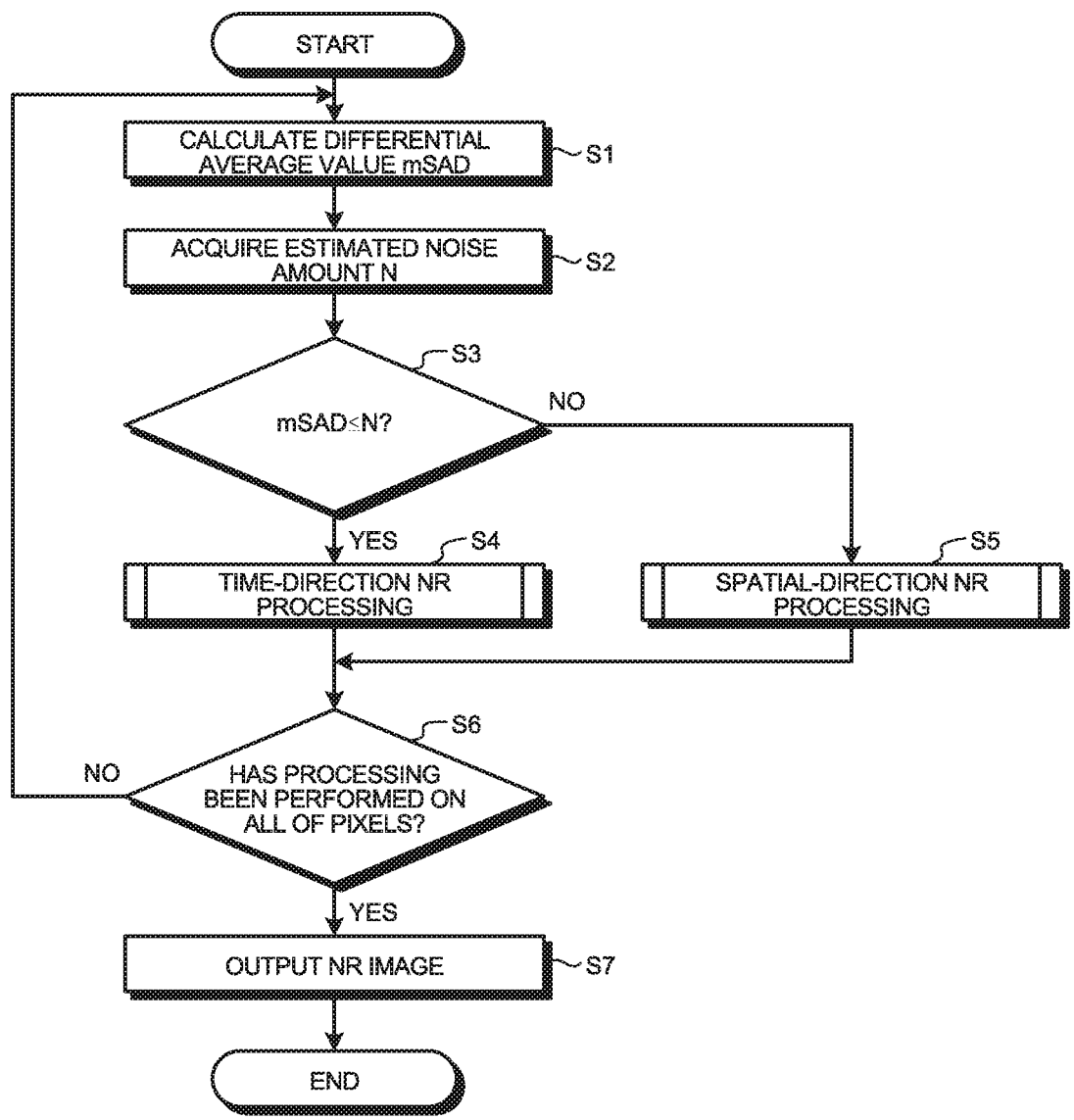
FIG. 5 is a flowchart illustrating an outline of processing performed by an image processing apparatus according to the first embodiment of the disclosure.

Next, processing performed by the image processing apparatus 30 will be described below. FIG. 5 is a flowchart illustrating an outline of processing performed by the image processing apparatus 30, and is a flowchart of a main routine performed by the image processing apparatus 30.

As illustrated in FIG. 5, the evaluation value calculation unit 351 first calculates a differential average value mSAD (inter-frame difference value) by using the current image (current frame) output from the interpolation processing unit 32 and the past image (past frame) stored in the frame memory 33 (Step S1). Here, the past image is an image that is subjected to NR processing and output from the noise reduction unit 35 at a time point one frame before the current image input from the interpolation processing unit 32. Specifically, when the coordinates of a pixel of interest that is a pixel to be subjected to the NR processing are denoted by (x, y), the evaluation value calculation unit 351 calculates the differential average value mSAD by using Equation (1) below, and outputs a value (m, n) with which SAD(m, n) in Equation (1) becomes minimum to the noise reduction processing unit 355 and the determination unit 354. Hereinafter, processing on the G signal will be described; however, the same processing is performed on the R signal and the B signal.

$$mSAD = \min \begin{Bmatrix} SAD(-1,-1), & SAD(0,-1), & SAD(1,-1), \\ SAD(-1,0), & SAD(0,0), & SAD(1,0), \\ SAD(-1,1), & SAD(0,1), & SAD(1,1), \end{Bmatrix}, \quad (1)$$

$$SAD(m, n) = \frac{1}{(2k+1)^2} \sum_{j=-k}^{k} \sum_{i=-k}^{k} |F_{G\_cur}(x+i, y+j) - F_{G\_pre}(x+i+m, y+j+n)|$$

In Equation (1) described above, min{ } represents processing for acquiring a minimum value of the value in the brackets. While a case is described in which m=-1, 0, 1, and n=-1, 0, 1; however, the disclosure is not limited thereto. A wider range may be set such that m=-10, -9, . . . , 9, 10 and n=-10, -9, . . . , 9, 10. In addition, $F_{G\_cur}(x, y)$ is a G signal value at the coordinates (x, y) in the current image (RGB image), and $F_{G\_pre}(x, y)$ is a G signal value at the coordinates (x, y) in the past image. k is a natural number, and (2k+1) corresponds to a kernel size for calculating the differential average value mSAD. k may be set to a constant value in advance or may be set to an arbitrary value by a user via the operating unit 37. |A| represents processing for acquiring an absolute value of a real number A.

In addition, (m, n) described in Equation (1) above corresponds to a motion vector between frames, and a search range of the motion vector is ±1 pixels when m=−1, 0, 1 and n=−1, 0, 1. In Equation (1) above, the minimum SAD in the search range is selected as mSAD.

Subsequently, the estimated noise amount acquisition unit 352 refers to the look-up table 353, and acquires an estimated noise amount N corresponding to a pixel value (signal value) of the pixel of interest in the current image (Step S2).

Figure 6:
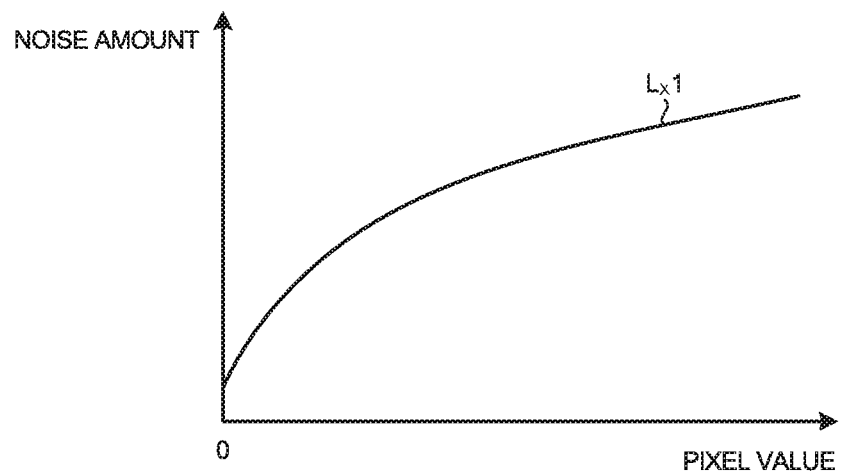
FIG. 6 is a diagram illustrating an example of a noise model stored in a look-up table included in the image processing apparatus according to the first embodiment of the disclosure.

FIG. 6 is a diagram illustrating an example of a noise model stored in the look-up table 353. In FIG. 6, a vertical axis represents a noise amount and a horizontal axis represents a pixel value. In FIG. 6, a standard deviation of a pixel value is used as the noise amount on the vertical axis, and a noise model corresponding to the characteristics of the image sensor 105 is illustrated.

As indicated by a curve $L_x1$ in FIG. 6, the noise amount in the image sensor 105 increases as the pixel value increases. Therefore, the estimated noise amount acquisition unit 352 in the first embodiment acquires the estimated noise amount N corresponding to the pixel value of the pixel of interest of the current image by referring to the noise model of the curve $L_x1$ in FIG. 6. In addition to the curve illustrated in FIG. 6, the noise model may be approximated by an approximation formula or a polygonal line.

Thereafter, the determination unit 354 performs a determination process as to whether the state is the rest state or the moving state by determining whether the differential average value mSAD calculated by the evaluation value calculation unit 351 is equal to or smaller than the noise amount N acquired by the estimated noise amount acquisition unit 352 (mSAD≤N) (Step S3). When the determination unit 354 determines that the differential average value mSAD calculated by the evaluation value calculation unit 351 is equal to or smaller than the noise amount N acquired by the estimated noise amount acquisition unit 352 (Step S3: Yes), the image processing apparatus 30 proceeds to Step S4 to be described below. In contrast, when the determination unit 354 determines that the differential average value mSAD calculated by the evaluation value calculation unit 351 is not equal to or smaller than the noise amount N acquired by the estimated noise amount acquisition unit 352 (Step S3: No), the image processing apparatus 30 proceeds to Step S5 to be described below.

At Step S4, the noise reduction processing unit 355 performs the time-direction NR processing on the pixel of interest in the current image. Details of the time-direction NR processing will be described later. After Step S4, the image processing apparatus 30 proceeds to Step S6 to be described below.

At Step S5, the noise reduction processing unit 355 performs the spatial-direction NR processing on the pixel of interest in the current image. Details of the spatial-direction NR processing will be described later. After Step S5, the image processing apparatus 30 proceeds to Step S6 to be described below.

Subsequently, when the image processing controller 39 determines that the NR processing has been performed on all of the pixels in the current image (Step S6: Yes), the image processing apparatus 30 proceeds to Step S7 to be described below. In contrast, when the image processing controller 39 determines that the NR processing has not been performed on all of the pixels in the current image (Step S6: No), the image processing apparatus 30 returns to Step S1 described above.

At Step S7, the noise reduction processing unit 355 outputs an NR image to the frame memory 33 and the image processing unit 38. After Step S7, the image processing apparatus 30 ends the processing.

The noise reduction processing unit 355 switches between the time-direction NR processing and the spatial-direction NR processing as processing to be performed, based on the determination performed by the determination unit 354 as to whether the differential average value mSAD calculated by the evaluation value calculation unit 351 is equal to or smaller than the noise amount N. However, the noise reduction processing unit 355 may perform both of the time-direction NR processing and the spatial-direction NR processing, and blends results of both of the NR processing based on a blend value that is set in accordance with the magnitude of the differential average value mSAD (or the magnitude of reliability indicating the likelihood of the motion vector).

Outline of Time-Direction NR Processing

Figure 7:
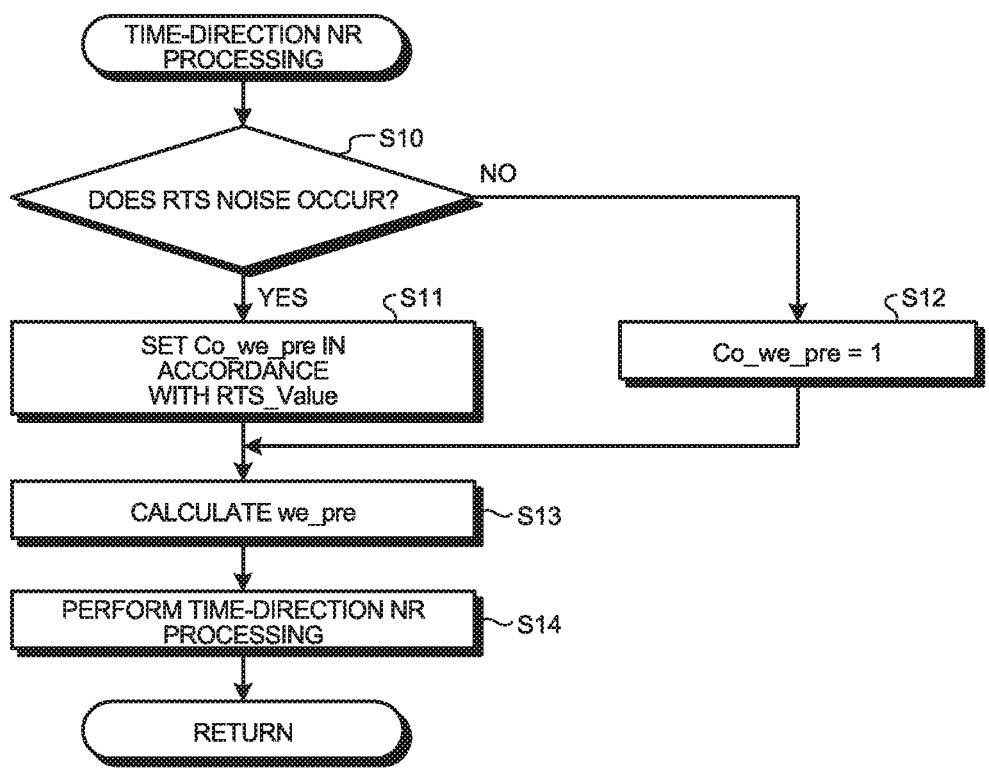
FIG. 7 is a flowchart illustrating an outline of time-direction NR processing illustrated in FIG. 5.

Next, details of the time-direction NR processing at Step S4 in FIG. 5 described above will be explained. FIG. 7 is a flowchart illustrating an outline of the time-direction NR processing.

As illustrated in FIG. 7, the noise reduction processing unit 355 acquires RTS noise information from the storage unit 36, and determines whether RTS noise is likely to occur at the pixel of interest of the current image based on the RTS noise information (Step S10). When the noise reduction processing unit 355 determines that the RTS noise is likely to occur at the pixel of interest of the current image (Step S10: Yes), the image processing apparatus 30 proceeds to Step S11 to be described below. In contrast, when the noise reduction processing unit 355 determines that the RTS noise is not likely to occur at the pixel of interest of the current image (Step S10: No), the image processing apparatus 30 proceeds to Step S12 to be described below.

At Step S11, the noise reduction processing unit 355 sets a coefficient Co_we_pre used in the time-direction NR processing, in accordance with RTS_Value included in the RTS noise information acquired from the storage unit 36. After Step S11, the image processing apparatus 30 proceeds to Step S13 to be described below.

Figure 8:
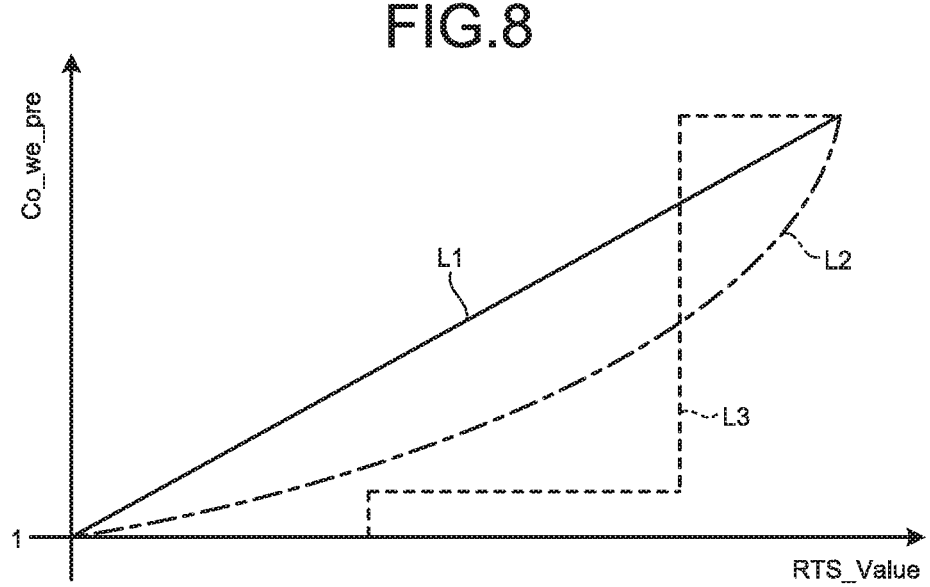
FIG. 8 is a diagram illustrating a relationship between RTS_Value and a coefficient Co_we_pre set by a noise reduction processing unit included in the image processing apparatus according to the first embodiment of the disclosure.

FIG. 8 is a diagram illustrating a relationship between RTS_Value and the coefficient Co_we_pre set by the noise reduction processing unit 355. In FIG. 8, a horizontal axis represents the magnitude of RTS_Value and a vertical axis represents the coefficient Co_we_pre.

As illustrated in FIG. 8, the noise reduction processing unit 355 sets the coefficient Co_we_pre in accordance with the magnitude of RTS_Value as indicated by a straight line L1, a curve L2, and a polygonal line L3. For example, the noise reduction processing unit 355 may set the coefficient Co_we_pre such that the coefficient linearly increases in accordance with the magnitude of RTS_Value as indicated by the straight line L1, may set the coefficient Co_we_pre such that the coefficient exponentially increases as indicated by the curve L2, or may set the coefficient Co_we_pre such that the coefficient gradually increases as indicated by the polygonal line L3. In this manner, when the RTS noise is likely to occur at the pixel of interest, the noise reduction processing unit 355 increases the coefficient Co_we_pre used in the time-direction NR processing, as compared to the case in which the RTS noise does not occur at the pixel of interest.

Referring back to FIG. 7, the explanation of the processing from Step S12 will be continued.

At Step S12, the noise reduction processing unit 355 sets the coefficient Co_we_pre to 1 (the coefficient Co_we_pre=1). After Step S12, the image processing apparatus 30 proceeds to Step S13 as described below.

The noise reduction processing unit 355 subsequently calculates a weighting coefficient we_pre by using the coefficient Co_we_pre set at Step S11 or Step S12 described above (Step S13). Specifically, the noise reduction processing unit 355 calculates the weighting coefficient we_pre by Equation (2) below.

$$we\_per = Co\_we\_pre \times we\_pre \qquad (2)$$

Thereafter, the noise reduction processing unit 355 performs the time-direction NR processing by using the weighting coefficient we_pre calculated at Step S13 described above (Step S14), and the image processing apparatus 30 returns to the main routine in FIG. 5. Specifically, the noise reduction processing unit 355 performs the time-direction NR processing by using Equation (3) below.

$$F_{G\_NR}(x, y) = \frac{we\_cur \times F_{G\_cur}(x, y) + we\_pre \times F_{G\_pre}(x+m, y+n)}{we\_cur + we\_pre} \qquad (3)$$

In Equation (3) described above, $F_{C\_NR}(x, y)$ represents a pixel value of the current image at the coordinates (x, y) of the NR image. In addition, we_cur and we_pre are weighting coefficients in a weighted averaging process. In the first embodiment, it may be possible to increase the noise reduction amount by increasing we_pre relative to we_cur. Furthermore, in the first embodiment, we_pre may be set to a constant value in advance or may be set to an arbitrary value by a user via the operating unit 37.

Outline of Spatial-Direction NR Processing

Figure 9:
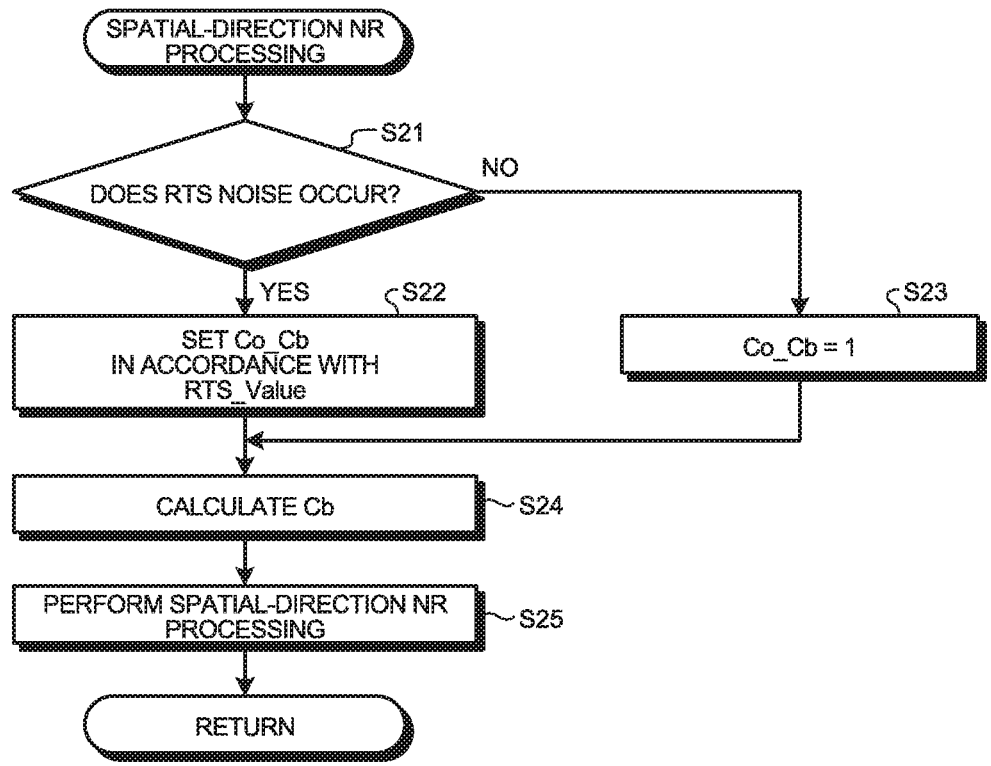
FIG. 9 is a flowchart illustrating an outline of spatial-direction NR processing illustrated in FIG. 5.

Next, details of the spatial-direction NR processing at Step S5 in FIG. 5 described above will be explained. FIG. 9 is a flowchart illustrating an outline of the spatial-direction NR processing.

As illustrated in FIG. 9, the noise reduction processing unit 355 acquires RTS noise information from the storage unit 36, and determines whether RTS noise is likely to occur at the pixel of interest of the current image based on the RTS noise information (Step S21). When the noise reduction processing unit 355 determines that the RTS noise is likely to occur at the pixel of interest of the current image (Step S21: Yes), the image processing apparatus 30 proceeds to Step S22 to be described below. In contrast, when the noise reduction processing unit 355 determines that the RTS noise is not likely to occur at the pixel of interest of the current image (Step S21: No), the image processing apparatus 30 proceeds to Step S22 to be described below.

At Step S22, the noise reduction processing unit 355 sets a coefficient Co_Cb used in the spatial-direction NR processing, in accordance with RTS_Value included in the RTS noise information acquired from the storage unit 36. After Step S22, the image processing apparatus 30 proceeds to Step S24 to be described below.

Figure 10:
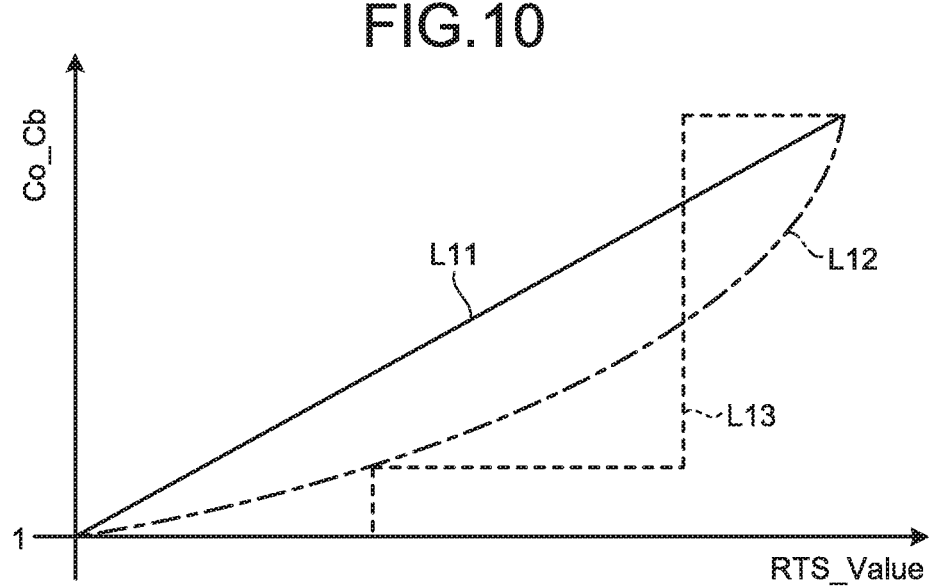
FIG. 10 is a diagram illustrating a relationship between RTS_Value and a coefficient Co_Cb set by the noise reduction processing unit included in the image processing apparatus according to the first embodiment of the disclosure.

FIG. 10 is a diagram illustrating a relationship between RTS_Value and the coefficient Co_Cb set by the noise reduction processing unit 355. In FIG. 10, a horizontal axis represents the magnitude of RTS_Value and a vertical axis represents the coefficient Co_Cb.

As illustrated in FIG. 10, the noise reduction processing unit 355 sets the coefficient Co_Cb in accordance with the magnitude of RTS_Value as indicated by a straight line L11, a curve L12, and a polygonal line L13. For example, the noise reduction processing unit 355 may set the coefficient Co_Cb such that the coefficient linearly increases in accordance with the magnitude of RTS_Value as indicated by the straight line L11, may set the coefficient Co_Cb such that the coefficient exponentially increases as indicated by the curve L12, or may set the coefficient Co_Cb such that the coefficient gradually increases as indicated by the polygonal line L13. In this manner, when the RTS noise is likely to occur at the pixel of interest, the noise reduction processing unit 355 increases the coefficient Co_Cb used in the spatial-direction NR processing, as compared to the case in which the RTS noise does not occur at the pixel of interest.

Referring back to FIG. 9, the explanation of the processing from Step S23 will be continued.

At Step S23, the noise reduction processing unit 355 sets the coefficient Co_Cb to 1 (the coefficient Co_Cb=1). After Step S23, the image processing apparatus 30 proceeds to Step S24 to be described below.

The noise reduction processing unit 355 subsequently calculates a weighting coefficient Cb by using the coefficient Co_Cb set at Step S22 or Step S23 described above (Step S24). Specifically, the noise reduction processing unit 355 calculates the weighting coefficient Cb by Equation (4) below.

$$Cb = Co\_Cb \times Cb \qquad (4)$$

Thereafter, the noise reduction processing unit 355 performs the spatial-direction NR processing by using the weighting coefficient Cb calculated at Step S24 described above (Step S25), and the image processing apparatus 30 returns to the main routine in FIG. 5. Specifically, the noise reduction processing unit 355 performs the spatial-direction NR processing by using Equation (5) below.

$$F_{G\_NR}(x, y) = \qquad (5)$$

$$\frac{\sum_{j=-1}^{1}\sum_{i=-1}^{1}\{we\_diff\_cur(x+i, y+j) \times F_{G\_cur}(x+i, y+j)\} + \sum_{j=-1}^{1}\sum_{i=-1}^{1}\{we\_diff\_pre(x+i, y+j) \times F_{G\_pre}(x+i+m, y+j+n)\}}{\sum_{j=-1}^{1}\sum_{i=-1}^{1} we\_diff\_cur(x+i, y+j) + \sum_{j=-1}^{1}\sum_{i=-1}^{1} we\_diff\_pre(x+i, y+j)}$$

In Equation (5) described above, we_diff_cur(x+i, y+j) and we_diff_pre(x+i, y+j) correspond to weighting coefficients in a weighted averaging process. The coefficients are given by a Gaussian distribution as indicated by Equation (6) below. Furthermore, i and j are natural numbers. Moreover, m and n are SAD(m, n) selected as the differential average value mSAD in Equation (1) described above.

$$we\_diff\_cur(x+i, y+j) = \exp\left[-\frac{\{F_{G\_cur}(x+i, y+j) - F_{G\_cur}(x, y)\}^2}{2\sigma^2}\right], \qquad (6)$$

$$we\_diff\_pre(x+i, y+j) =$$
$$\exp\left[-\frac{\{F_{G\_pre}(x+i, m, y+j+n) - F_{G\_cur}(x, y)\}^2}{2\sigma^2}\right]$$

As indicated by Equation (6) described above, in the spatial-direction NR processing used in the first embodiment, the weighting coefficients are adaptively set in accordance with the magnitude of a difference between the pixel value of the pixel of interest of the current image and a pixel value of a neighboring pixel of the pixel of interest. Specifically, when the difference between the pixel value of the pixel of interest of the current image and the pixel value of the neighboring pixel of the pixel of interest increases, a weight in the weighted averaging process decreases. Therefore, pixels in a region, such as an edge portion, in which pixel values largely change do not contribute to the weighted averaging process, and it is possible to reduce only noise components while maintaining the edge portion. However, in the spatial-direction NR processing, because the weighting coefficients are controlled in accordance with the difference between the pixel value of the pixel of interest of the current image and the pixel value of the neighboring pixel of the pixel of interest, the degree of noise reduction (intensity of smoothing) depends on the noise amount included in the image. Specifically, the difference increases as the noise increases, so that the weighting coefficients decrease and less contribute to the weighted average in Equation (3) described above. Therefore, the degree of noise reduction decreases as the noise increases, and the noise may not be reduced in the end.

To cope with this, in the first embodiment, the noise reduction processing unit 355 calculates a standard deviation σ of the Gaussian distribution in Equation (6) described above, based on the noise amount N calculated at Step S2 in FIG. 5. Specifically, the noise reduction processing unit 355 calculates the standard deviation σ by using Equation (7) below.

$$\sigma = Cb \times N \quad (7)$$

In Equation (7) described above, the weighting coefficient Cb is a positive real number. The weighting coefficient Cb may be set to a constant value in advance or may be set to an arbitrary value by a user via the operating unit 37.

In this manner, the noise reduction processing unit 355 can adaptively perform the noise reduction processing with respect to the noise amount by calculating the standard deviation σ of the Gaussian distribution based on the noise amount N. That is, because the standard deviation σ increases as the noise amount increases, the noise reduction processing unit 355 can increase the weighting coefficients even when the difference (for example, $F_{G\_cur}(x+i, y+j) - F_{G\_cur}(x+, y)$) in Equation (6) described above becomes larger than the noise, as compared to a case in which the standard deviation σ is independent of the estimated noise amount N. Therefore, even when the noise is large, it is possible to maintain the intensity of smoothing.

According to the first embodiment of the disclosure as described above, when the RTS noise is likely to occur at the pixel of interest of the current image based on the RTS noise information input from the third external I/F unit 31, the noise reduction unit 35 increases the coefficient of the NR processing with respect to the pixel value of the pixel of interest as compared to the coefficient of the NR processing performed on a pixel at which the RTS noise does not occur. Therefore, even when a correlation between the pixel value of the pixel of interest and the pixel value of the neighboring pixel is low, it is possible to reduce the RTS noise that may occur in a moving image, so that it is possible to improve image quality.

Furthermore, according to the first embodiment of the disclosure, when the RTS noise is likely to occur at the pixel of interest of the current image, it is sufficient to increase a coefficient for an NR function provided in a conventional imaging apparatus or the like with respect to the pixel value of the pixel of interest. Therefore, it is possible to reduce the RTS noise with a simple structure.

In the first embodiment of the disclosure, the motion detection unit 34 uses the SAD to calculate the motion vector (m, n). However, the motion vector may be calculated by a well-known method, such as sum of squared difference (SSD) or normalized cross-correlation (NCC).

Second Embodiment

Next, a second embodiment of the disclosure will be described. In an imaging system according to the second embodiment, an image processing apparatus of the second embodiment is configured differently from the image processing apparatus 30 of the first embodiment described above, and performs different processing. Specifically, the image processing apparatus according to the second embodiment calculates a representative value for correcting a pixel of interest based on a representative value calculated from a current image and a representative value calculated from a past image, and corrects a pixel value of the pixel of interest based on the representative value. Hereinafter, a configuration of the imaging system according to the second embodiment will be first described, and then the processing performed by the image processing apparatus according to the second embodiment will be described. The same components as those of the imaging system 1 of the first embodiment described above are denoted by the same reference signs, and explanation thereof will be omitted.

Configuration of Imaging System

Figure 11:
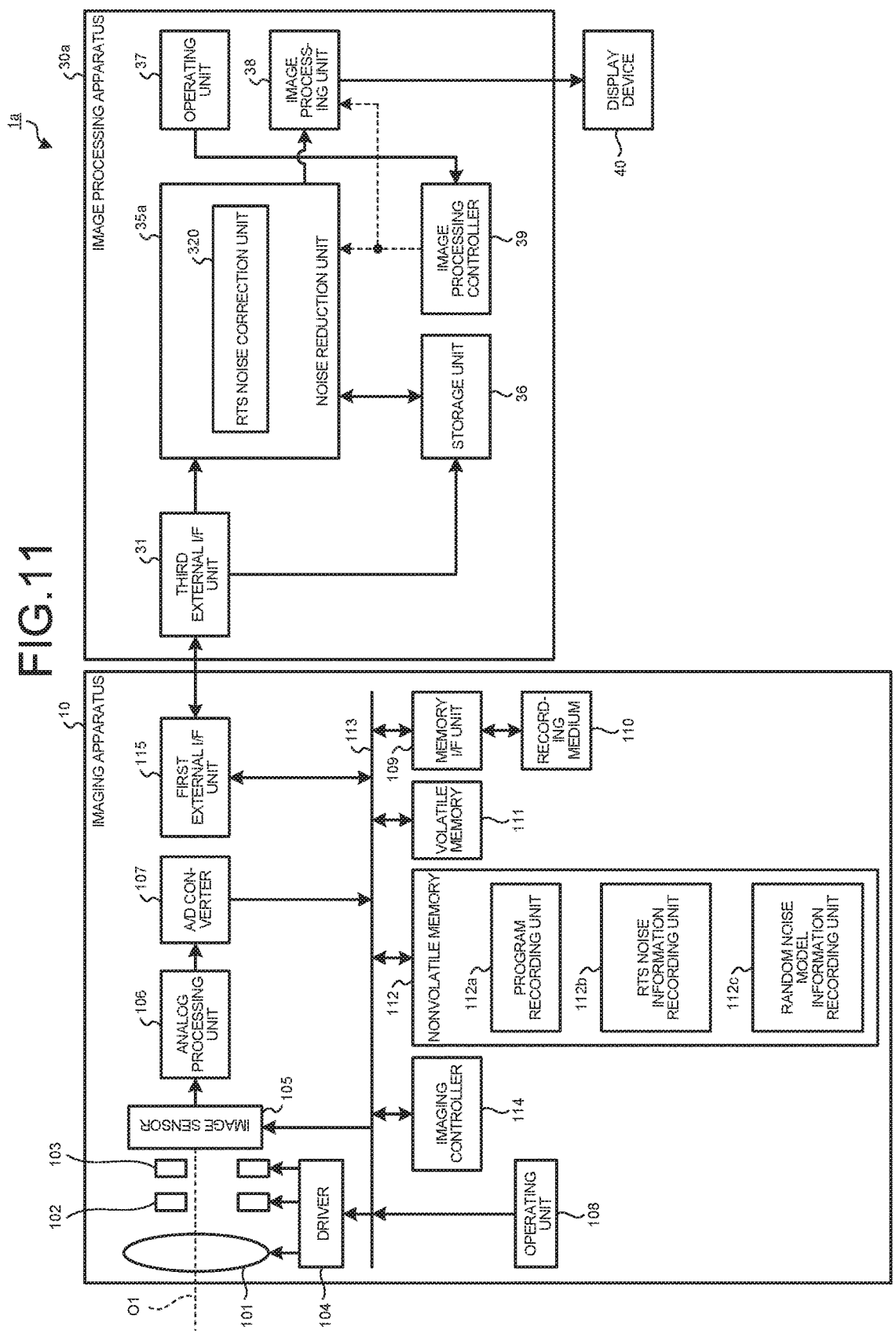
FIG. 11 is a block diagram schematically illustrating a configuration of an imaging system according to a second embodiment of the disclosure.

FIG. 11 is a block diagram schematically illustrating a configuration of the imaging system according to the second embodiment of the disclosure. An imaging system 1a illustrated in FIG. 11 includes an image processing apparatus 30a instead of the image processing apparatus 30 of the imaging system 1 of the first embodiment described above.

Configuration of Image Processing Apparatus

The image processing apparatus 30a is configured by removing the interpolation processing unit 32, the frame memory 33, and the motion detection unit 34 from the image processing apparatus 30 of the first embodiment described above, and replacing the noise reduction unit 35 with a noise reduction unit 35a.

The noise reduction unit 35a corrects RTS noise with respect to a current image input from the third external I/F unit 31, and outputs the corrected image to the image processing unit 38. The noise reduction unit 35a includes an RTS noise correction unit 320.

The RTS noise correction unit 320 performs RTS noise correction processing for correcting the RTS noise with respect to the current image input from the third external I/F unit 31, and outputs the current image subjected to the RTS noise correction to the image processing unit 38.

Figure 12:
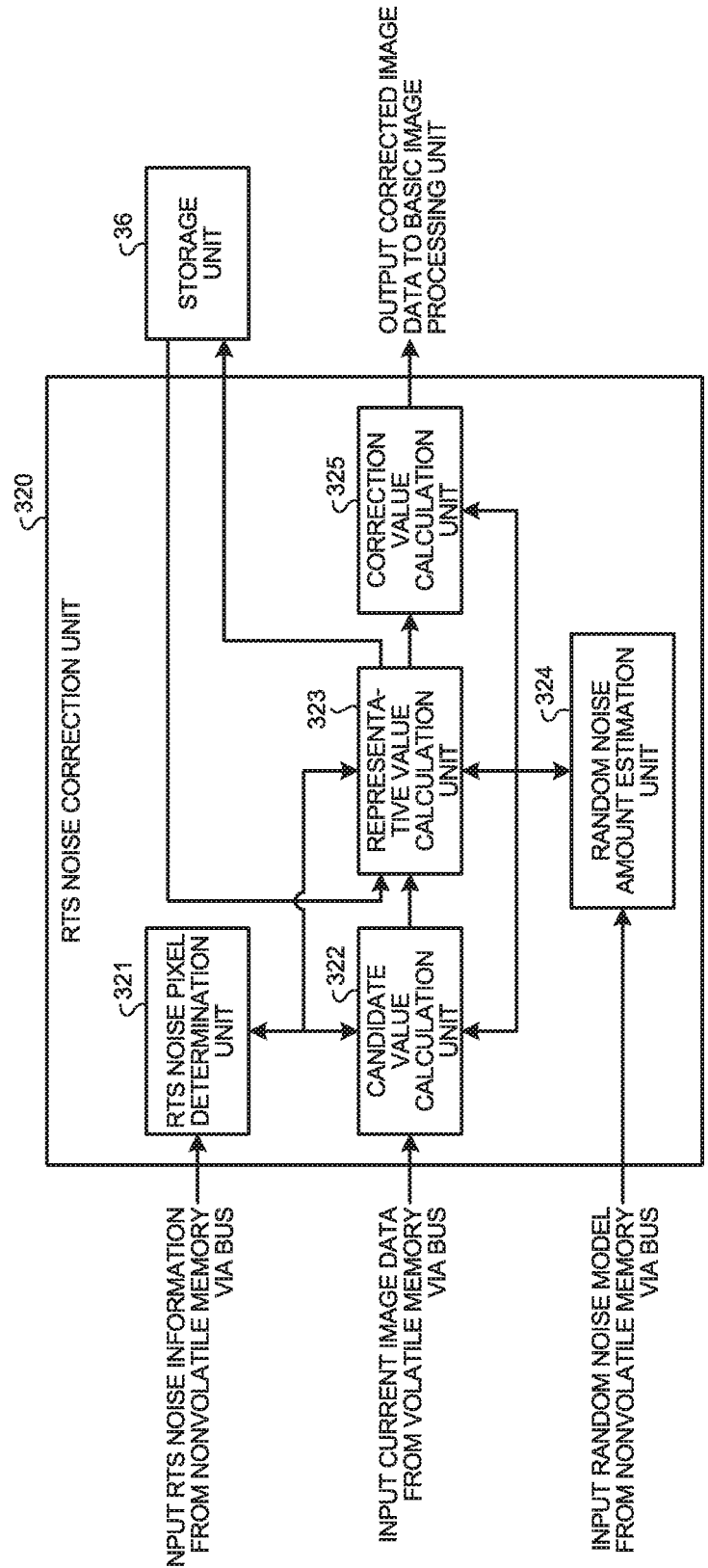
FIG. 12 is a block diagram illustrating a detailed configuration of an RTS noise correction unit according to the second embodiment of the disclosure.

A detailed configuration of the RTS noise correction unit 320 will be described below. FIG. 12 is a block diagram illustrating the detailed configuration of the RTS noise correction unit 320.

As illustrated in FIG. 12, the RTS noise correction unit 320 includes an RTS noise pixel determination unit 321, a candidate value calculation unit 322, a representative value calculation unit 323, a random noise amount estimation unit 324, and a correction value calculation unit 325.

The RTS noise pixel determination unit 321 determines whether RTS noise is likely to occur at a pixel of interest of the current image input from the third external I/F unit 31 based on RTS noise information input from the third external I/F unit 31, and outputs a determination result to the candidate value calculation unit 322 and the representative value calculation unit 323. Specifically, when a position of a pixel is input to the RTS noise pixel determination unit 321, it is determined whether the RTS noise information corresponding to this pixel (a pixel of interest) is present. When the RTS noise information is present, this RTS noise information (information indicating presence of the RTS noise) is output, and when the RTS noise information is not present, the RTS noise information is not output based on the assumption that the RTS noise does not occur at the pixel.

When the RTS noise pixel determination unit 321 determines that the RTS noise is likely to occur at the pixel of interest, the candidate value calculation unit 322 calculates a plurality of candidate values for a correction amount with respect to the pixel value of the pixel of interest based on the pixel value of the pixel of interest and the determination result obtained by the RTS noise pixel determination unit 321, and outputs the pixel value of the pixel of interest and the plurality of calculated candidate values to each of the representative value calculation unit 323, the random noise amount estimation unit 324, and the correction value calculation unit 325.

When the RTS noise pixel determination unit 321 determines that the RTS noise is likely to occur at the pixel of interest, the representative value calculation unit 323 calculates a representative value corresponding to a pixel value for which the RTS noise does not occur, based on at least a pixel which is located around the pixel of interest and for which the RTS noise pixel determination unit 321 has determined that the RTS noise does not occur, and based on a random noise amount which corresponds to the pixel of interest and which is calculated by the random noise amount estimation unit 324 to be described later. Furthermore, the representative value calculation unit 323 calculates a representative value of the current image based on the current image input from the third external I/F unit 31 and the past image stored in the storage unit 36, and outputs the representative value to the correction value calculation unit 325.

Figure 13:
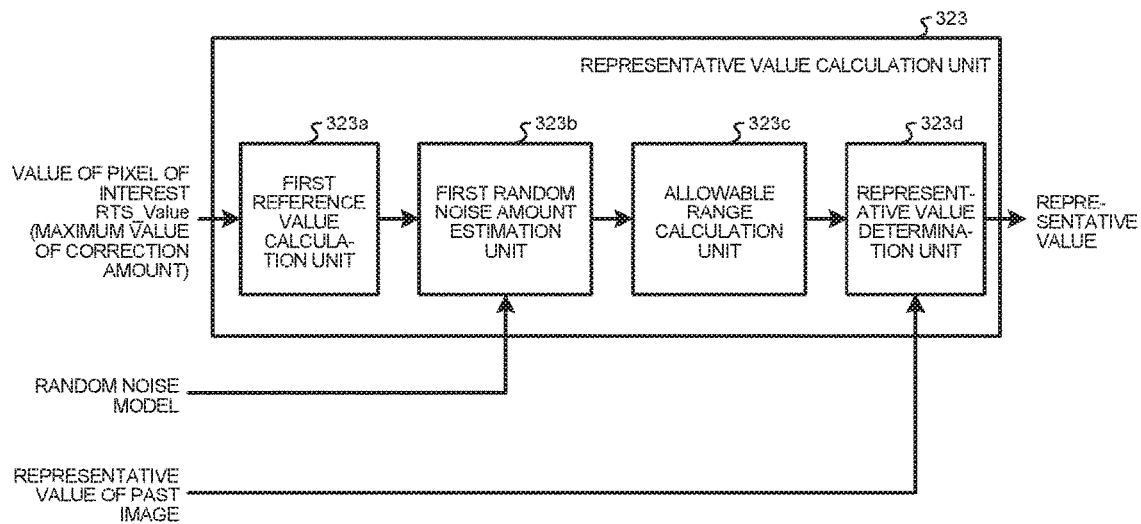
FIG. 13 is a block diagram illustrating a detailed configuration of a representative value calculation unit according to the second embodiment of the disclosure.

A detailed configuration of the representative value calculation unit 323 will be described below. FIG. 13 is a block diagram illustrating the detailed configuration of the representative value calculation unit 323.

As illustrated in FIG. 13, the representative value calculation unit 323 includes a first reference value calculation unit 323a, a first random noise amount estimation unit 323b, an allowable range calculation unit 323c, and a representative value determination unit 323d.

The first reference value calculation unit 323a calculates a reference value used to estimate the random noise amount. Specifically, the first reference value calculation unit 323a calculates, as the reference value, a sum of the pixel value of the pixel of interest and RTS_Value or a sum of the pixel value of the pixel of interest and a maximum value of the candidate values for the correction amount.

The first random noise amount estimation unit 323b calculates the random noise amount based on the random noise model input from the third external I/F unit 31 and the reference value calculated by the first reference value calculation unit 323a.

The allowable range calculation unit 323c calculates an allowable range (effective range), which is a range of pixel values available for the representative value calculation processing, based on pixel values of pixels in a calculation range that is set with reference to the pixel of interest and based on the random noise amount calculated by the first random noise amount estimation unit 323b.

The representative value determination unit 323d selects pixel values included in the allowable range (in the effective range) (pixel values of the same color as the pixel of interest in the case of the image sensor 105 using a color filter) among pixel values other than the pixel of interest in the calculation range, and determines a median value of the selected pixel values as the representative value when the selected pixel values are equal to or larger than a predetermined value. In addition, the representative value determination unit 323d determines a representative value of the current image based on the current image and the past image stored in the storage unit 36.

Referring back to FIG. 12, the explanation of the configuration of the RTS noise correction unit 320 will be continued.

The random noise amount estimation unit 324 estimates a random noise amount corresponding to a pixel value based on the random noise model input from the third external I/F unit 31, and outputs an estimation result to each of the candidate value calculation unit 322, the representative value calculation unit 323, and the correction value calculation unit 325. That is, when a pixel value is input to the random noise amount estimation unit 324, the random noise amount corresponding to the pixel value is output.

When the RTS noise pixel determination unit 321 determines that the pixel of interest is a pixel at which RTS noise is likely to occur, the correction value calculation unit 325 corrects the pixel value of the pixel of interest based on the plurality of candidate values calculated by the candidate value calculation unit 322. Specifically, the correction value calculation unit 325 calculates a pixel value for which the RTS noise is corrected, based on the pixel value of the pixel of interest, the plurality of candidate values calculated by the candidate value calculation unit 322, and the representative value calculated by the representative value calculation unit 323, and outputs the calculated pixel value to the image processing unit 38. More specifically, the correction value calculation unit 325 corrects the pixel value of the pixel of interest based on a candidate value for which a correction result is the closest to the representative value calculated by the representative value calculation unit 323 among the plurality of candidate values calculated by the candidate value calculation unit 322. In contrast, when the RTS noise pixel determination unit 321 determines that the pixel of interest is a pixel at which RTS noise does not occur, the correction value calculation unit 325 outputs the pixel value of the pixel of interest as it is. In the second embodiment, the correction value calculation unit 325 functions as a correction unit.

Figure 14:
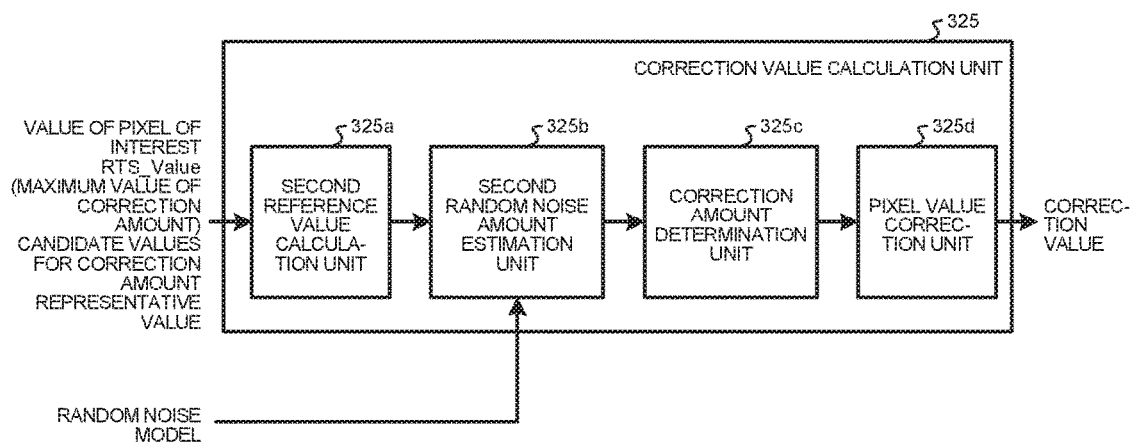
FIG. 14 is a block diagram illustrating a detailed configuration of a correction value calculation unit according to the second embodiment of the disclosure.

A detailed configuration of the correction value calculation unit 325 will be described below. FIG. 14 is a block diagram illustrating the detailed configuration of the correction value calculation unit 325.

As illustrated in FIG. 14, the correction value calculation unit 325 includes a second reference value calculation unit 325a, a second random noise amount estimation unit 325b, a correction amount determination unit 325c, and a pixel value correction unit 325d.

The second reference value calculation unit 325a calculates, as a reference value, a value obtained by subtracting RTS_Value from the pixel value of the pixel of interest or a value obtained by subtracting the maximum value of the candidate values for the correction amount from the pixel value of the pixel of interest.

The second random noise amount estimation unit 325b calculates the random noise amount based on the random noise model input from the third external I/F unit 31 and the reference value calculated by the second reference value calculation unit 325a.

The correction amount determination unit 325c calculates, as a threshold, a value obtained by multiplying the random noise amount calculated by the second random noise amount estimation unit 325b by a constant coefficient, determines whether the maximum candidate value among the candidate values for the correction amount calculated by the candidate value calculation unit 322 is equal to or larger than the threshold, and thereafter selects, as the correction amount, the representative value calculated by the representative value calculation unit 323 and a candidate value for the correction amount closest to the absolute value of the pixel of interest.

The pixel value correction unit 325d calculates a corrected pixel value of the pixel of interest by adding or subtracting the correction amount to or from the pixel value of the pixel of interest such that the pixel value approaches the representative value.

Processing Performed by Image Processing Apparatus

Figure 15:
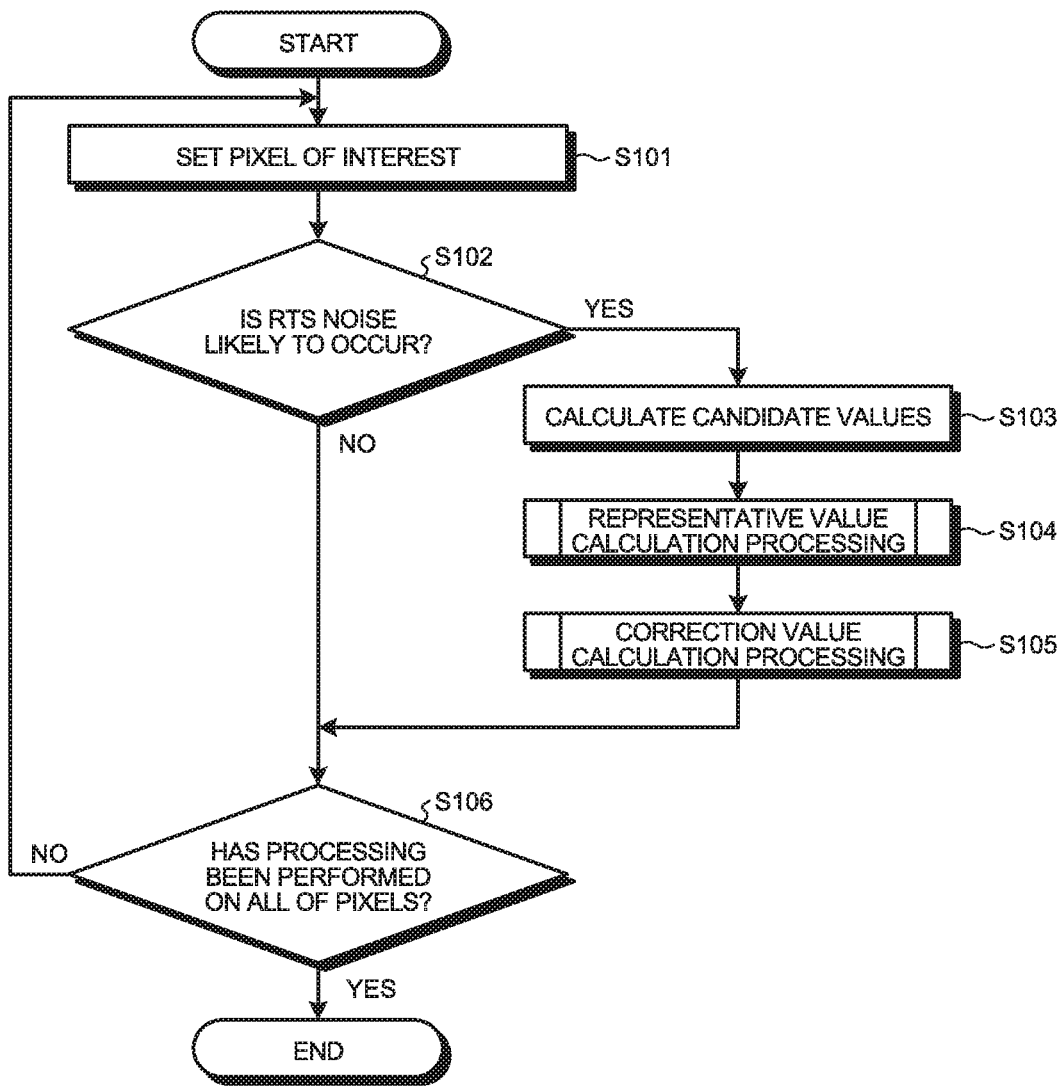
FIG. 15 is a flowchart illustrating an outline of processing performed by an image processing apparatus according to the second embodiment of the disclosure.

Next, processing performed by the image processing apparatus 30a will be described. FIG. 15 is a flowchart illustrating an outline of processing performed by the image processing apparatus 30a, and is a flowchart of a main routine performed by the image processing apparatus 30a.

As illustrated in FIG. 15, the RTS noise correction unit 320 first sets a pixel of interest for sequentially performing processing from Step S102 to Step S105 to be described later (Step S101). The RTS noise correction unit 320 assigns integers larger than zero in a raster order from an upper left to a lower light to each pixel, as indexes 1, 2, 3, . . . in order. Subsequently, every time performing the processing at Step S101, the RTS noise correction unit 320 increases a counter by 1 (the counter is reset to zero at the time the processing in FIG. 15 is started). The RTS noise correction unit 320 sets, as a pixel of interest, a pixel to which the index indicated by the counter is assigned. That is, when the RTS noise correction unit 320 performs the processing at Step S101 for the first time, the RTS noise correction unit 320 increases the counter that has been reset to zero by 1, so that the counter indicates 1 and the pixel on the upper left is set as a pixel of interest. When the RTS noise correction unit 320 performs the processing at Step S101 twice (for the second time), the counter indicates 2, so that the pixel on the right side of the pixel on the upper left is set as a pixel of interest.

Subsequently, the RTS noise pixel determination unit 321 acquires the RTS noise information recorded in the RTS noise information recording unit 112b of the nonvolatile memory 112 of the imaging apparatus 10 via the third external I/F unit 31, the first external I/F unit 115, and the bus 113, and determines whether RTS noise is likely to occur at the pixel of interest based on the acquired RTS noise information (Step S102). That is, the RTS noise pixel determination unit 321 determines whether positional information on a sharing pixel block including the pixel of interest is included in the RTS noise information. Specifically, the RTS noise pixel determination unit 321 determines whether the positional information on the sharing pixel block including the pixel of interest is included in the RTS noise information as a sharing pixel block in which the RTS noise is likely to occur. When the RTS noise pixel determination unit 321 determines that the RTS noise is likely to occur at the pixel of interest (determines that the positional information on the sharing pixel block including the pixel of interest is included in the RTS noise information) (Step S102: Yes), the image processing apparatus 30a proceeds to Step S103 to be described below. In contrast, when the RTS noise pixel determination unit 321 determines that the RTS noise is not likely to occur at the pixel of interest (determines that the positional information on the sharing pixel block including the pixel of interest is not included in the RTS noise information) (Step S102: No), the image processing apparatus 30a proceeds to Step S106 to be described below. In this case, when determining that the RTS noise is not likely to occur at the pixel of interest, the RTS noise pixel determination unit 321 outputs the pixel value of the pixel of interest as it is as the corrected pixel value to the representative value calculation unit 323.

At Step S103, the candidate value calculation unit 322 calculates a plurality of candidate values for a correction amount for correcting the RTS noise. Specifically, the candidate value calculation unit 322 sets, as the candidate values, all of values that can be taken as pixel values equal to or larger than zero and equal to or smaller than RTS_Value (all integers equal to or larger than zero and equal to or smaller than RTS_Value when only integers are taken as a RAW image), based on RTS_Value (included in the RTS noise information output from the RTS noise pixel determination unit 321) corresponding to the pixel of interest. When an amplifier gain value that is set in the column amplifier or the like of the image sensor 105 by the imaging controller 114 is different between when the RTS noise is detected (the amplifier gain value=G0) and when the RTS noise is corrected (the amplifier gain value=G1), the candidate value calculation unit 322 may replace RTS_Value with a value obtained by multiplying a ratio of the amplifier gain value obtained when the RTS noise is corrected and the amplifier gain value obtained when the RTS noise is detected (G=G1/G0) by RTS_Value. Furthermore, the candidate value calculation unit 322 may include RTS_Value for each of settable amplifier gain values into the RTS noise information in advance, and use RTS_Value in accordance with the set amplifier gain value.

Subsequently, the representative value calculation unit 323 performs representative value calculation processing for calculating a representative value (an expected pixel value in a case where the RTS noise does not occur at the pixel of interest) based on pixel values of neighboring pixels of the pixel of interest in the current image and the past image stored in the storage unit 36 (Step S104). The representative value calculation unit 323 may include a pixel at which the RTS noise occurs.

Outline of Representative Value Calculation Processing

Figure 16:
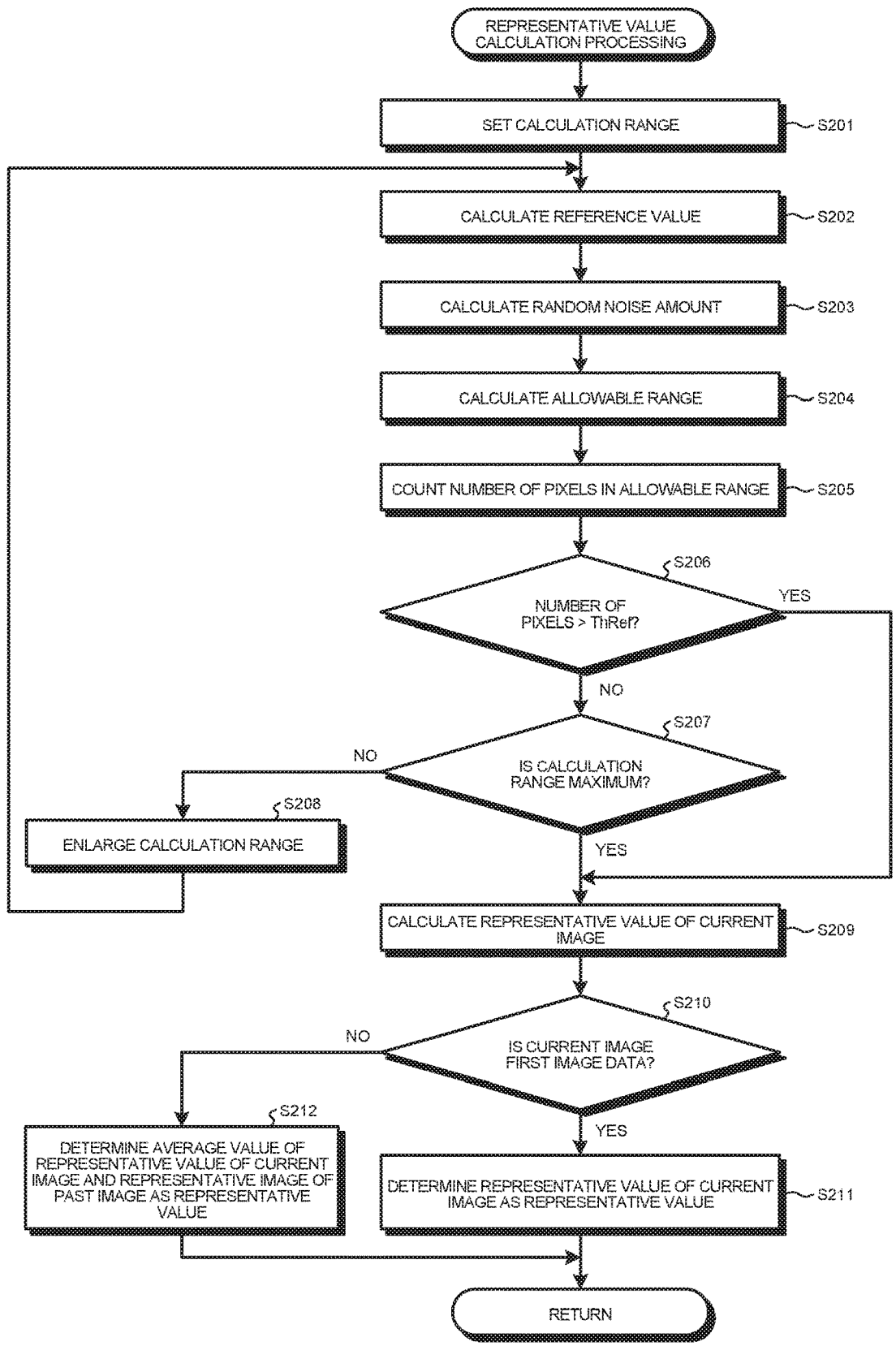
FIG. 16 is a flowchart illustrating an outline of representative value calculation processing illustrated in FIG. 15.

FIG. 16 is a flowchart illustrating an outline of the representative value calculation processing at Step S104 in FIG. 15.

As illustrated in FIG. 16, the representative value calculation unit 323 first sets a minimum calculation range to be a target for calculation of a representative value, with reference to the pixel of interest (Step S201). Specifically, in a case where a range of a maximum of 7×7 pixels in a target range with the pixel of interest at the center is set as the calculation range for example, the representative value calculation unit 323 sets a range of 3×3, which is the minimum range of 7×7 or less, as a minimum calculation range.

Subsequently, the first reference value calculation unit 323a calculates, as a reference value, a value obtained by adding RTS_Value to the pixel value of the pixel of interest or a value obtained by adding the maximum value of the candidate values for the correction amount to the pixel value of the pixel of interest (Step S202).

Thereafter, the first random noise amount estimation unit 323b calculates a random noise amount based on the random noise model input from the third external I/F unit 31 and the reference value calculated by the first reference value calculation unit 323a at Step S202 (Step S203). The first random noise amount estimation unit 323b in the second embodiment calculates the random noise amount (calculates a standard deviation) based on the noise model (random noise model) of the curve $L_x1$ in FIG. 6 as described above and the reference value calculated by the first reference value calculation unit 323a. In addition to the curve illustrated in FIG. 6, the noise model may be approximated by an approximation formula or a polygonal line.

After Step S203, the allowable range calculation unit 323c calculates an allowable range (effective range), which is a range of pixel values available for the representative value calculation process, based on pixel values of pixels in the calculation range (Step S204). Specifically, the allowable range calculation unit 323c calculates an upper limit of the allowable range (effective range) by Expression (8) below.

Reference value+Random noise amount (standard deviation)×$R$+RTS_Value  (8)

Here, R is a predetermined coefficient and is set depending on how visually the RTS noise can be recognized against random noise. For example, the coefficient of R is preferably set to around 2. Furthermore, the representative value calculation unit 323 calculates a lower limit of the allowable range by Expression (9) below.

Reference value−Random noise amount (standard deviation)×$R$−RTS_Value  (9)

It may be possible to use the maximum value of the plurality of candidate values instead of RTS_Value. Furthermore, the reference values in Expressions (8) and (9) may be reference values that are obtained by a reference value method different from the reference value used for estimating the random noise amount by the first random noise amount estimation unit 323b at Step S203 described above. In this manner, the allowable range calculation unit 323c can calculate the allowable range by taking into account the RTS noise of the pixel of interest and the random noise around the pixel of interest.

Thereafter, the allowable range calculation unit 323c determines whether each of the pixel values of the pixels other than the pixel of interest in the calculation range (the pixel values of the same color as the pixel of interest in the case of the image sensor 105 using a color filter) is in the allowable range calculated at Step S204 described above, and counts the number of the pixel values in the allowable range (Step S205). The count value obtained at Step S205 tends to increase in a case of a flat subject, and decrease in a case of a subject including an edge. It may be possible not to count pixels at which the RTS noise is likely to occur in the calculation range.

Subsequently, when the count value (the number of the pixels) counted at Step S205 described above is larger than a predetermined value ThRef (Step S206: Yes), the image processing apparatus 30a proceeds to Step S209 to be described below. Here, it is preferable to set the predetermined value ThRef to be equal to or larger than 1 in order for the representative value calculation unit 323 to calculate the representative value from the neighboring pixels of the pixel of interest. In contrast, when the count value counted at Step S205 described above is not larger than the predetermined value ThRef (Step S206: No), the image processing apparatus 30a proceeds to Step S207 to be described below.

At Step S207, when the calculation range to be a target for calculation of the representative value is maximum (Step S207: Yes), the image processing apparatus 30a proceeds to Step S209 to be described below. In contrast, when the calculation range to be a target for calculation of the representative value is not maximum (Step S207: No), the image processing apparatus 30a proceeds to Step S208 to be described below.

At Step S208, the allowable range calculation unit 323c enlarges the calculation range for calculation of the representative value (Step S208). Specifically, the allowable range calculation unit 323c enlarges the calculation range to be a target for calculation of the representative value by one or more pixels in the horizontal or vertical direction in a range that falls within the maximum range. For example, when the 3×3 range centered on the pixel of interest is set as the calculation range, the allowable range calculation unit 323c sets a 5×5 range centered on the pixel of interest again as the calculation range. After Step S208, the image processing apparatus 30a returns to Step S202. At Step S208, the allowable range calculation unit 323c sets the 3×3 range or the 5×5 range as the calculation range; however, the calculation range may be enlarged only horizontally or vertically to set a 5×3 range or a 3×5 range as the calculation range, for example.

At Step S209, the representative value determination unit 323d calculates a representative value of the current image. Specifically, the representative value determination unit 323d first selects pixel values (pixel values of the same color as the pixel of interest in the case of the image sensor 105 using a color filter) included in the allowable range (in the effective range) from among the pixel values other than the pixel of interest in the calculation range. Thereafter, when the number of the selected pixels is equal to or larger than the predetermined value ThRef, the representative value determination unit 323d calculates a median value of the selected pixel values as the representative value of the current image. When the number of the selected pixel values is an even number, the representative value determination unit 323d calculates a median value closer to the pixel value of the pixel of interest as the representative value of the current image. In this case, it is possible to prevent overcorrection. When the number of the selected pixels is smaller than the predetermined value ThRef, the representative value determination unit 323d calculates, as the representative value of the current image, a pixel value of a pixel closest to the pixel value of the pixel of interest among the pixels other than the pixel of interest in the calculation range. While the representative value determination unit 323d calculates the representative value by using the median value, the representative value may be calculated by a different method, such as an average value or an intermediate value of a distribution. Furthermore, the representative value determination unit 323d may determine an edge direction in the calculation range, and may calculate, as the representative value of the current image, a neighboring pixel value in the most correlated direction based on a result of the determination of the edge direction. Moreover, the representative value determination unit 323d may exclude a pixel at which the RTS noise is likely to occur among the pixels other than the pixel of interest in the calculation range. In this case, if there is no pixel at which the RTS noise is not likely to occur in the calculation range at the time of performing the processing at Step S209, the representative value determination unit 323d sets the pixel value of the pixel of interest of the current image as the representative value of the current image.

Subsequently, when the current image is the first image data for calculating the representative value (Step S210: Yes), the representative value determination unit 323d determines the representative value of the current image calculated at Step S209 described above as the representative value (Step S211). After Step S211, the image processing apparatus 30a returns to the main routine in FIG. 15 described above.

At Step S210, when the current image is not the first image data for calculating the representative value (Step S210: No), the representative value determination unit 323d determines, as the representative value, an average value of the representative value of the current image and the representative value of the past image stored in the storage unit 36 (Step S212). In this case, the representative value determination unit 323d may calculate the average value by using the representative value of each of past images stored in the storage unit 36. Furthermore, while the representative value determination unit 323d determines, as the representative value, the average value of the representative value of the current image and the representative value of the past image, it may be possible to determine a weighted average value or a median value as the representative value. Moreover, when a plurality of past images are stored in the storage unit 36, the representative value determination unit 323d may determine the representative value based on the representative value of each of the past images (for example, three or more past images) and the representative value of the current image. Furthermore, to prevent fluctuation in a certain range of a previous result, the representative value determination unit 323d may set a predetermined range based on the representative value of the past image stored in the storage unit 36, and determine the representative value of the current image such that the representative value of the current image falls within this range. After Step S212, the image processing apparatus 30a returns to the main routine in FIG. 15 described above.

As described above, after calculating the representative value of the current image in the representative value calculation processing as described above, when the current image is the first image data (when a past image is not stored in the storage unit 36), the representative value calculation unit 323 calculates the representative value of the current image as the representative value, and when the current image is not the first image data (when a past image is stored in the storage unit 36), the representative value calculation unit 323 calculates an average value of the representative value of the current image and the representative value of the past image as the representative value.

The representative value calculation unit 323 may store the current image and an image that is not yet corrected and temporally continued to the current image (hereinafter, referred to as an "uncorrected past image") in the storage unit 36, and calculate the representative value from the representative value of the uncorrected past image and the representative value of the current image.

Referring back to FIG. 15, the explanation of the processing from Step S105 will be continued.

At Step S105, the correction value calculation unit 325 performs correction value calculation processing for calculating a pixel value of the pixel of interest at which the RTS noise is corrected, based on the plurality of candidate values calculated by the candidate value calculation unit 322 at Step S103 described above, and based on the representative value calculated by the representative value calculation unit 323 at Step S104 described above. After Step S105, the image processing apparatus 30a proceeds to Step S106 to be described below.

Outline of Correction Value Calculation Processing

Figure 17:
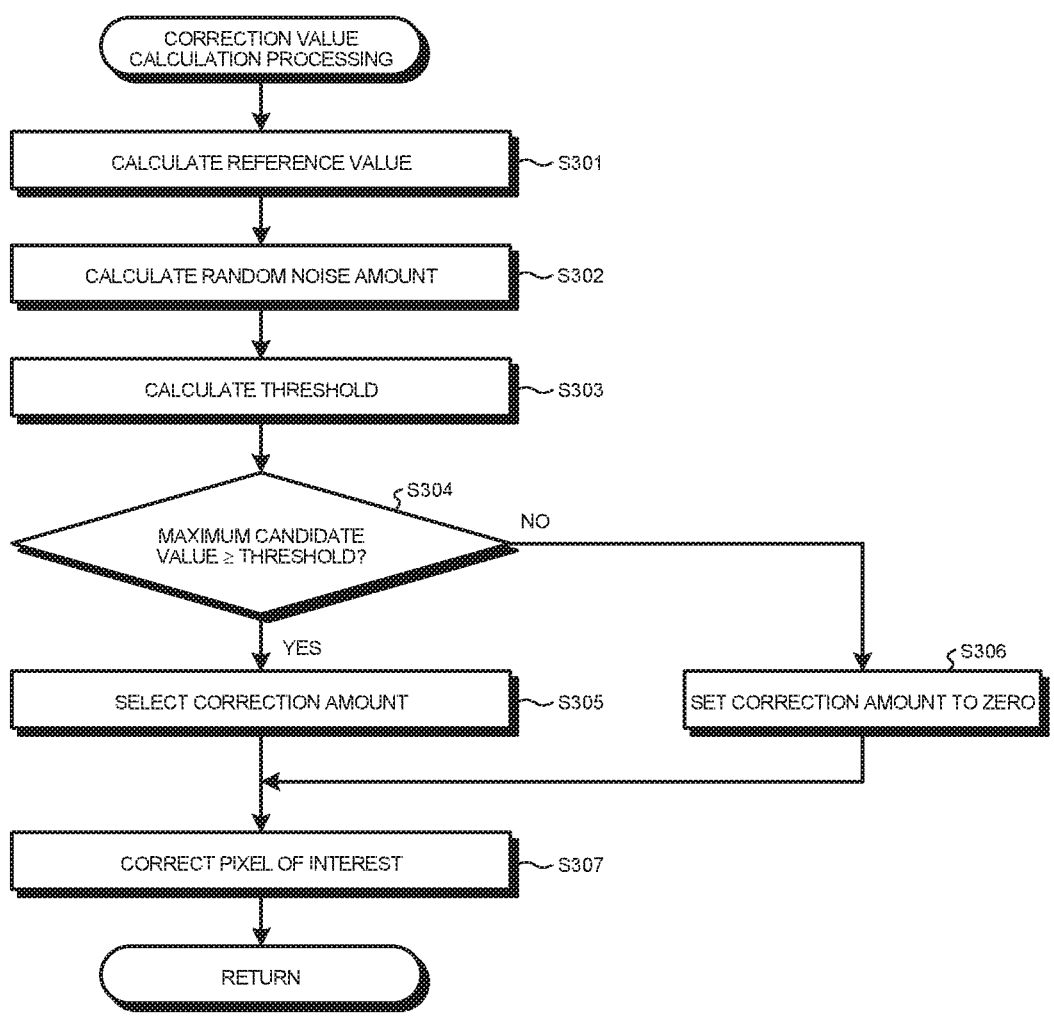
FIG. 17 is a flowchart illustrating an outline of correction value calculation processing illustrated in FIG. 15.

FIG. 17 is a flowchart illustrating an outline of the correction value calculation processing at Step S105 in FIG. 15.

As illustrated in FIG. 17, the second reference value calculation unit 325a first calculates, as the reference value, a value obtained by subtracting RTS_Value (a maximum value of the candidate values for the correction amount) from the pixel value of the pixel of interest (Step S301).

Subsequently, the second random noise amount estimation unit 325b acquires the random noise model recorded in the random noise model information recording unit 112c via the third external I/F unit 31, the first external I/F unit 115, and the bus 113, and calculates the random noise amount based on the acquired random noise model and the reference value calculated by the second reference value calculation unit 325a at Step S301 (Step S302).

Thereafter, the correction amount determination unit 325c calculates, as a threshold, a value by multiplying the random noise amount calculated by the second random noise amount estimation unit 325b at Step S302 described above by a constant coefficient (Step S303). Here, the threshold is calculated by Expression (10) below.

$$\text{Random noise amount} \times Rm \quad (10)$$

Rm is determined depending on how visually the RTS noise can be recognized against random noise. For example, it is preferable to set the value of Rm to around 2.

Subsequently, the correction amount determination unit 325c determines whether the maximum candidate value among the candidate values for the correction amount calculated by the candidate value calculation unit 322 at Step S103 in FIG. 15 described above is equal to or larger than the threshold calculated at Step S303 described above (Step S304). When the correction amount determination unit 325c determines that the maximum candidate value among the candidate values for the correction amount calculated by the candidate value calculation unit 322 at Step S103 in FIG. 15 described above is equal to or larger than the threshold (Step S304: Yes), the image processing apparatus 30a proceeds to Step S305 to be described below. In contrast, when the correction amount determination unit 325c determines that the maximum candidate value among the candidate values for the correction amount calculated by the candidate value calculation unit 322 at Step S103 in FIG. 15 described above is not equal to or larger than the threshold (Step S304: No), the image processing apparatus 30a proceeds to Step S306 to be described below.

At Step S305, the correction amount determination unit 325c selects, as the correction amount, the candidate value for the correction amount closest to the absolute value of a difference between the representative value calculated by the representative value calculation unit 323 at Step S104 in FIG. 15 described above and the pixel value of the pixel of interest. After Step S305, the image processing apparatus 30a proceeds to Step S307 to be described below.

At Step S306, the correction amount determination unit 325c sets the correction amount to zero. After Step S306, the image processing apparatus 30a proceeds to Step S307.

Subsequently, the pixel value correction unit 325d calculates a corrected pixel value of the pixel of interest by adding or subtracting the correction amount to or from the pixel value of the pixel of interest so as to approach the representative value (Step S307). After Step S307, the image processing apparatus 30a returns to the main routine in FIG. 15.

Referring back to FIG. 15, the explanation of the processing from Step S106 will be continued.

At Step S106, the RTS noise correction unit 320 determines whether the processing from Step S101 to Step S105 described above has been performed on all of the pixels. When the RTS noise correction unit 320 determines that the processing from Step S101 to Step S105 described above has been performed on all of the pixels (Step S106: Yes), the image processing apparatus 30a ends the processing. In contrast, when the RTS noise correction unit 320 determines that the processing from Step S101 to Step S105 described above has not been performed on all of the pixels (Step S106: No), the image processing apparatus 30a returns to Step S101 described above.

According to the second embodiment of the disclosure as described above, the representative value calculation unit 323 calculates a representative value corresponding to a pixel value for which the RTS noise does not occur, based on the representative value of the current image input from the third external I/F unit 31 and the representative value of the past image stored in the storage unit 36, and the correction value calculation unit 325 corrects the pixel value of the pixel of interest of the current image based on the representative value calculated by the representative value calculation unit 323. Therefore, even when the pixel value of the pixel of interest is constant and the magnitudes of the pixel values of the neighboring pixels of the pixel of interest fluctuate in each of current images, it is possible to reduce fluctuation in the corrected pixel value of the pixel of interest by calculating the representative value while including the representative value of the past image. As a result, even when a correlation between the pixel value of the pixel of interest and the pixel values of the neighboring pixels is low, it is possible to improve image quality.

Third Embodiment

Next, a third embodiment of the disclosure will be described. In an imaging system according to the third embodiment, a noise reduction unit is configured differently from the noise reduction unit 35a of the image processing apparatus 30a of the second embodiment described above, and an image processing apparatus according to the third embodiment performs different representative value calculation processing. Specifically, in the third embodiment, a position of a pixel of interest of a current image and a position of a pixel of a past image corresponding to the pixel of interest of the current image are aligned, and thereafter, a representative value corresponding to a pixel value for which RTS noise does not occur is calculated. Hereinafter, a configuration of the noise reduction unit according to the third embodiment will be first described, and then the representative value calculation processing performed by the image processing apparatus according to the third embodiment will be described. The same components as those of the imaging system 1 of the first embodiment described above are denoted by the same reference signs, and explanation thereof will be omitted.

Figure 18:
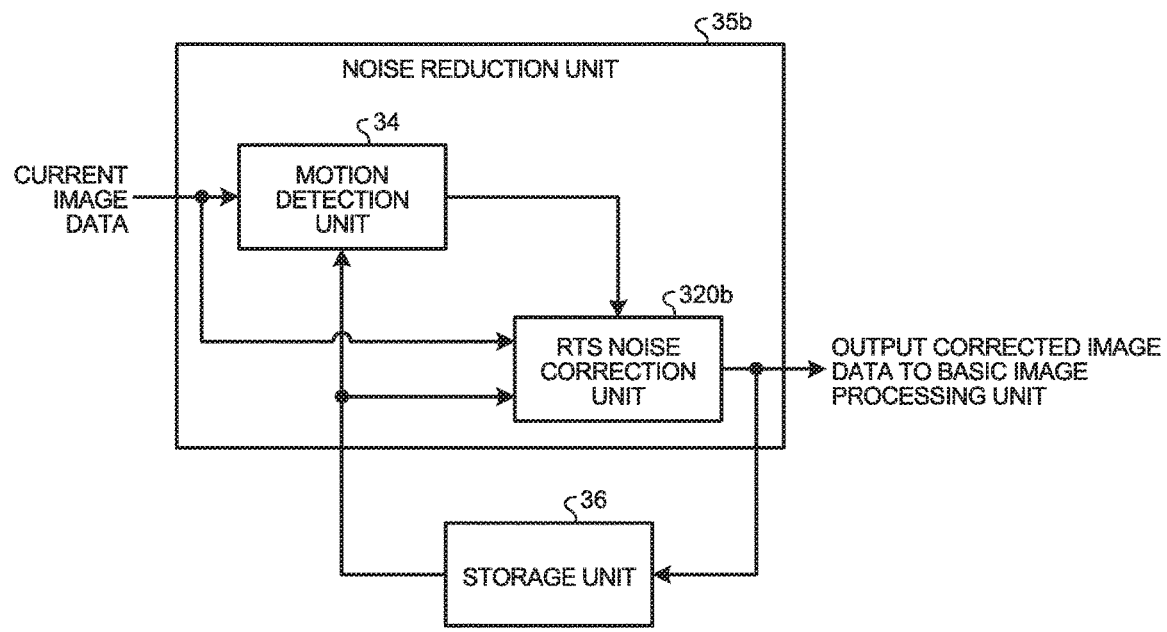
FIG. 18 is a block diagram illustrating a detailed configuration of a noise reduction unit according to a third embodiment of the disclosure.

FIG. 18 is a block diagram illustrating a detailed configuration of the noise reduction unit according to the third embodiment. A noise reduction unit 35b illustrated in FIG. 18 includes the motion detection unit 34 of the first embodiment described above and an RTS noise correction unit 320b.

The RTS noise correction unit 320b performs RTS noise correction processing for correcting the RTS noise with respect to a current image (RAW) input from the third external I/F unit 31, and outputs the corrected RAW image to the image processing unit 38.

Figure 19:
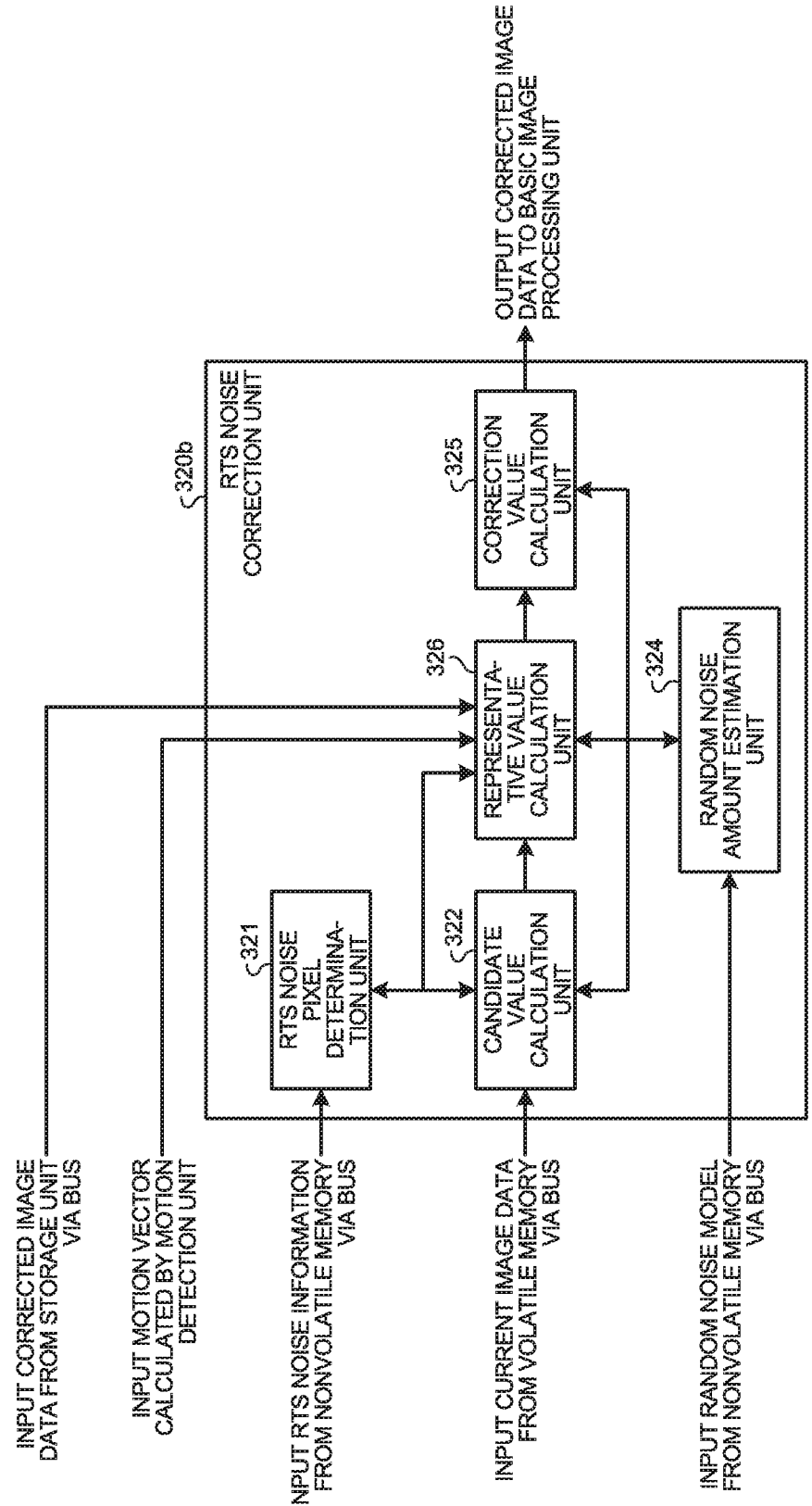
FIG. 19 is a block diagram illustrating a detailed configuration of an RTS noise correction unit according to the third embodiment of the disclosure.

A detailed configuration of the RTS noise correction unit 320b will be described below. FIG. 19 is a block diagram illustrating the detailed configuration of the RTS noise correction unit 320b.

As illustrated in FIG. 19, the RTS noise correction unit 320b includes a representative value calculation unit 326 instead of the representative value calculation unit 323 of the second embodiment described above.

The representative value calculation unit 326 calculates a representative value corresponding to a pixel value for which RTS noise does not occur, based on the motion vector detected by the motion detection unit 34, the pixel value of the pixel of interest of the current image (RAW image) input from the third external I/F unit 31, and the pixel value of the pixel of interest of the past image which corresponds to the pixel of interest of the current image (RAW image) and which is stored in the storage unit 36. Specifically, the representative value calculation unit 326 aligns the position of the pixel of interest of the current image and the position of the pixel of the past image corresponding to the pixel of interest of the current image by using the motion vector detected by the motion detection unit 34, and thereafter calculates a representative value corresponding to the pixel value for which the RTS noise does not occur, based on the pixel value of the pixel of interest of the current image and the pixel value of the pixel of interest of the past image.

Outline of Representative Value Calculation Processing

Figure 20:
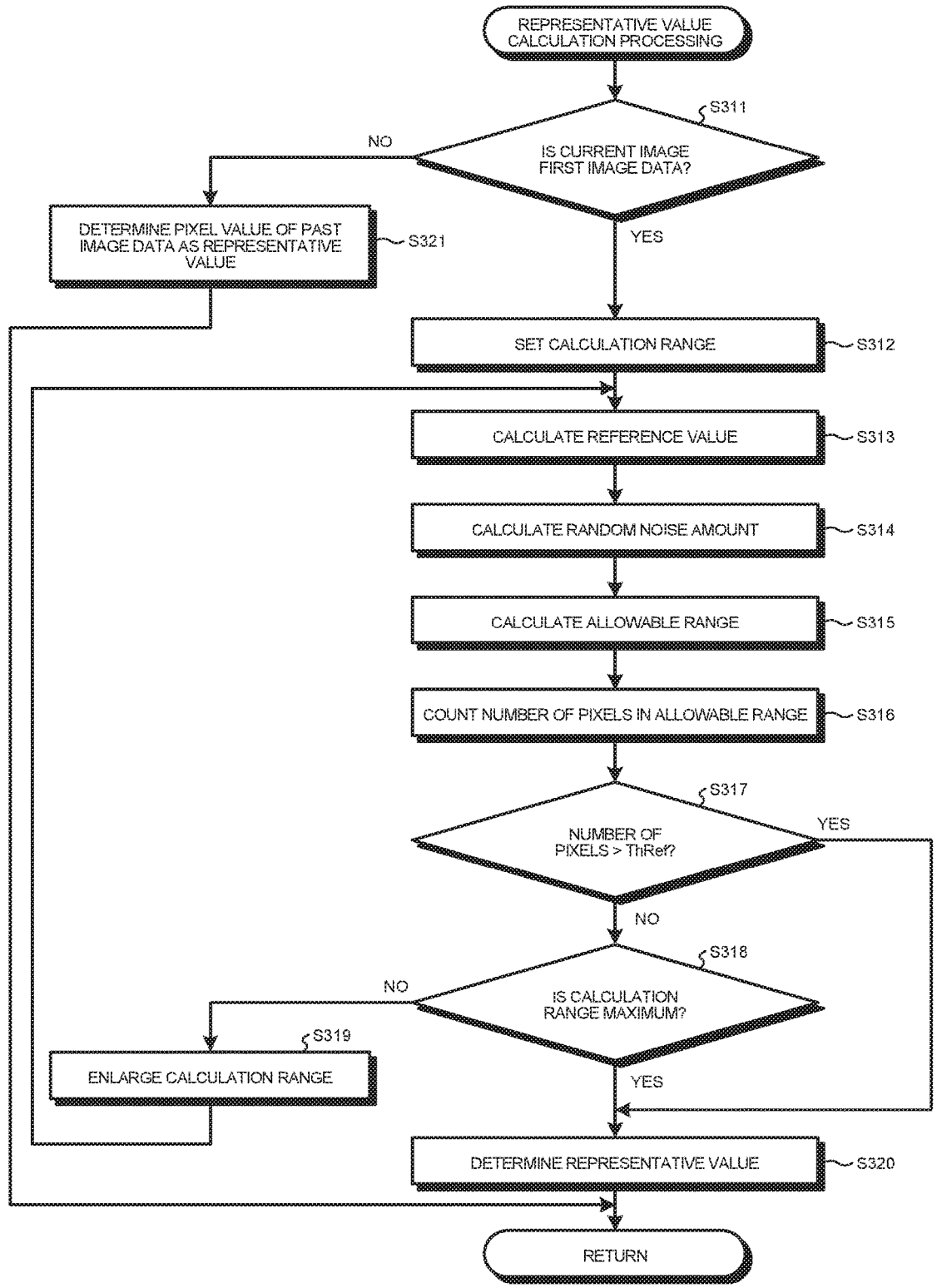
FIG. 20 is a flowchart illustrating an outline of representative value calculation processing performed by an image processing apparatus according to the third embodiment of the disclosure.

Next, the representative value calculation processing performed by the image processing apparatus 30a according to the third embodiment will be described. FIG. 20 is a flowchart illustrating an outline of the representative value calculation processing performed by the image processing apparatus 30a according to the third embodiment.

In FIG. 20, when the current image input from the third external I/F unit 31 is the first image data for calculating the representative value (Step S311: Yes), the image processing apparatus 30a proceeds to Step S312 to be described below. In contrast, when the current image input from the third external I/F unit 31 is not the first image data for calculating the representative value (Step S311: No), the image processing apparatus 30a proceeds to Step S321 to be described below.

Step S312 to Step S320 respectively correspond to Step S201 to Step S209 in FIG. 16 described above. After Step S320, the image processing apparatus 30a returns to the main routine in FIG. 15 described above.

At Step S321, the representative value calculation unit 326 determines a representative value corresponding to the pixel value for which the RTS noise does not occur, based on the past image stored in the storage unit 36 and the current image. Specifically, the representative value calculation unit 326 aligns the position of the pixel of interest of the current image and the position of the pixel of the past image corresponding to the position of the pixel of interest of the current image, based on the motion vector detected by the motion detection unit 34, and thereafter determines a pixel value of the past image corresponding to the position of the pixel of interest of the current image as the representative value. It is preferable for the representative value calculation unit 326 to use a local vector as the motion vector. Furthermore, the representative value calculation unit 326 may use a global vector. In this case, it is possible to perform positional alignment with respect to a motion, such as hand shake, on the entire image. After Step S321, the image processing apparatus 30a returns to the main routine in FIG. 15 described above.

According to the third embodiment of the disclosure as described above, the representative value calculation unit 326 aligns the position of the pixel of interest of the current image and the position of the pixel of the past image corresponding to the position of the pixel of interest of the current image based on the motion vector detected by the motion detection unit 34, and thereafter calculates, as the representative value, the pixel value of the past image corresponding to the position of the pixel of interest of the current image. Therefore, even when the magnitudes of the neighboring pixels of the pixel of interest of the current image fluctuate, it is possible to reduce fluctuation in the magnitudes, so that it is possible to reduce RTS noise without degrading image quality.

Furthermore, according to the third embodiment of the disclosure, even when only the magnitude of the pixel value of the pixel of interest fluctuates, it is possible to reduce RTS noise without degrading image quality.

Modification of Third Embodiment

Next, a modification of the third embodiment of the disclosure will be described. In the modification of the third embodiment, a noise reduction unit is configured differently, and an image processing apparatus performs different representative value calculation processing. Specifically, the noise reduction unit according to the modification of the third embodiment includes a reliability calculation unit that calculates reliability of a motion vector. Furthermore, in the modification of the third embodiment, a representative value corresponding to a pixel value for which the RTS noise does not occur is calculated by using the pixel value of the pixel of interest of the current image and the pixel value of the pixel of the past image corresponding to the pixel of interest of the current image. Hereinafter, a configuration of the noise reduction unit according to the modification of the third embodiment will be first described, and then the representative value calculation processing performed by an image processing apparatus according to the modification of the third embodiment will be described. The same components as those of the embodiments as described above are denoted by the same reference signs, and explanation thereof will be omitted.

Figure 21:
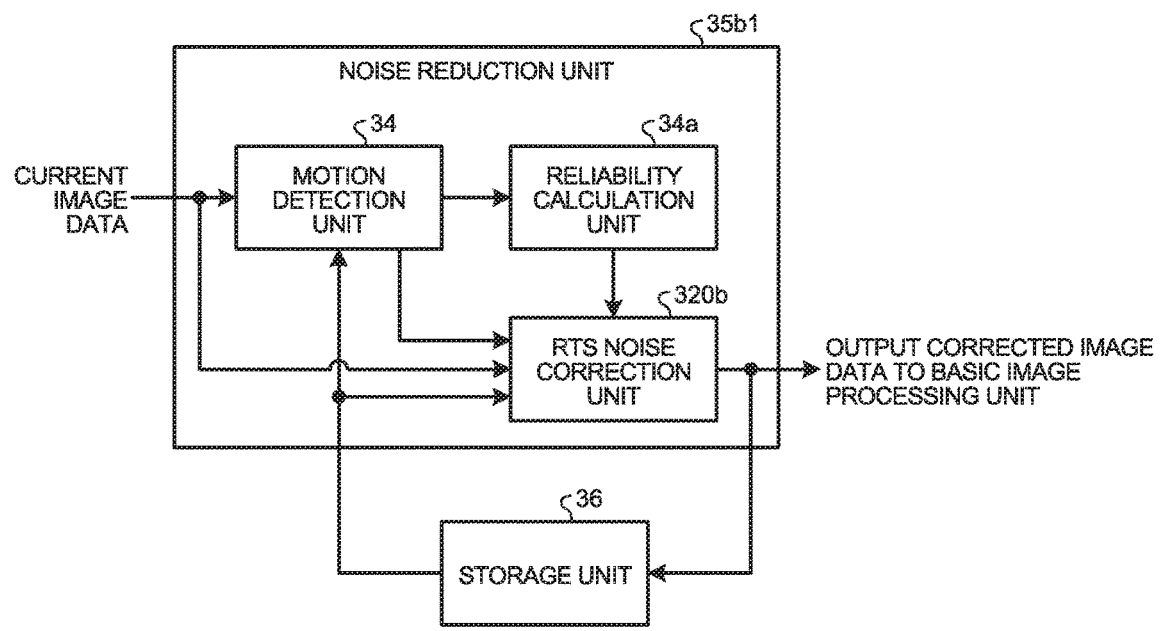
FIG. 21 is a block diagram illustrating a detailed configuration of an RTS noise correction unit according to a modification of the third embodiment of the disclosure.

FIG. 21 is a block diagram illustrating a detailed configuration of the noise reduction unit according to the modification of the third embodiment of the disclosure. A noise reduction unit 35b1 illustrated in FIG. 21 includes a reliability calculation unit 34a in addition to the components of the noise reduction unit 35b of the third embodiment described above.

The reliability calculation unit 34a calculates reliability indicating the likelihood of a movement amount of a subject calculated by the motion detection unit 34.

Outline of Representative Value Calculation Processing

Figure 22:
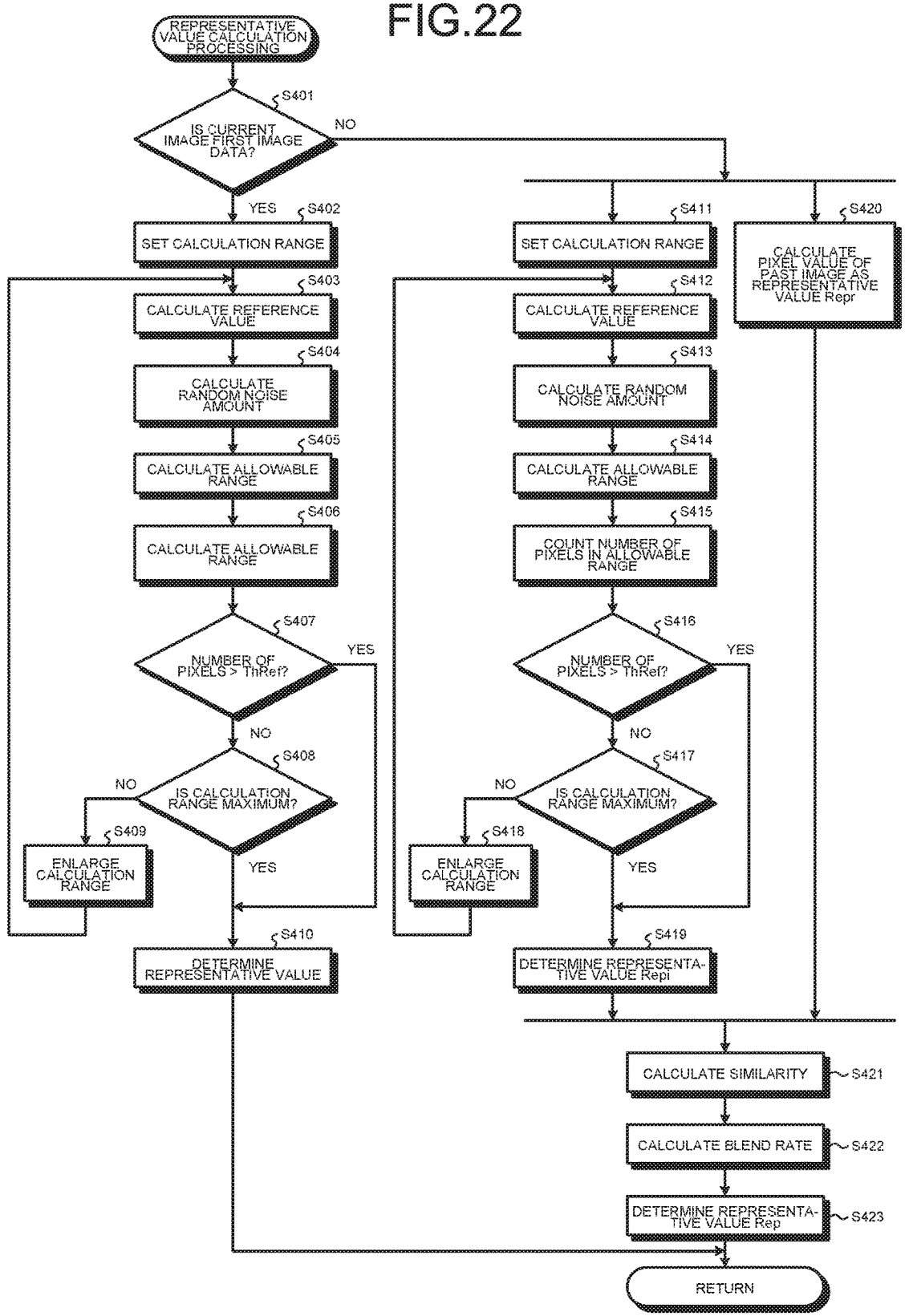
FIG. 22 is a flowchart illustrating an outline of representative value calculation processing according to the modification of the third embodiment of the disclosure.

FIG. 22 is a flowchart illustrating an outline of the representative value calculation processing according to the modification of the third embodiment of the disclosure.

In FIG. 22, Step S401 to Step S410 respectively correspond to Step S311 to Step S320 in FIG. 20 described above. Furthermore, Step S411 to Step S418 respectively correspond to Step S312 to Step S319 in FIG. 20 described above.

At Step S419, the representative value calculation unit 326 determines a representative value Repi. Specifically, the representative value calculation unit 326 performs the same processing as the processing at Step S410 to determine the representative value Repi. After Step S419, the image processing apparatus 30a proceeds to Step S421 to be described below.

At Step S420, the representative value calculation unit 326 calculates a pixel value of a past image as a representative value Repr. After Step S420, the image processing apparatus 30a proceeds to Step S421 to be described below.

Subsequently, the representative value calculation unit 326 calculates a similarity between the representative value Repi of the current image and the representative value Repr of the past image (Step S421). Specifically, the representative value calculation unit 326 calculates a difference between the representative value Repi of the current image and the representative value Repr of the past image (|Repi−Repr|).

Thereafter, the representative value calculation unit 326 calculates a similarity based on the magnitude of the motion vector input from the motion detection unit 34, the reliability calculated by the reliability calculation unit 34a, and the difference between the representative value Repi of the current image and the representative value Repr of the past image (|Repi−Repr|) calculated at Step S421, and calculates a blend rate b of each of the representative value Repi of the current image and the representative value Repr of of the past image based on the similarity (Step S422). Specifically, a value obtained by dividing the similarity between the representative value Repi of the current image and the representative value Repr of the past image by the magnitude of the motion vector |Vec| (|Repi−Repr|/|Vec|) is calculated as the similarity, and the blend rate b is calculated such that the blend rate b increases as the similarity increases.

Figure 23:
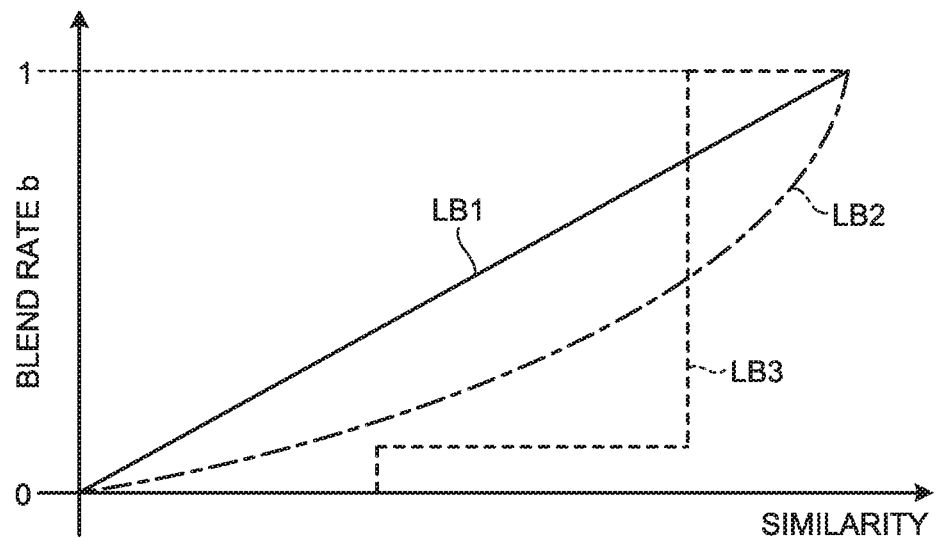
FIG. 23 is a diagram schematically illustrating a method of calculating a blend rate that is calculated by a representative value determination unit according to the modification of the third embodiment of the disclosure.

FIG. 23 is a diagram schematically illustrating a method of calculating the blend rate b by the representative value calculation unit 326. In FIG. 23, a horizontal axis represents the similarity and a vertical axis represents the blend rate b. Furthermore, in FIG. 23, each of a straight line LB1, a curve LB2, and a polygonal line LB3 indicate examples of the blend rate.

In the case illustrated in FIG. 23, when the similarity increases, a pixel value of an identical pixel has largely changed in the current image; therefore, the representative value calculation unit 326 assigns a weight to the pixel value of the current image relative to the pixel value of the past image.

The representative value calculation unit 326 may calculate, as the similarity, a value obtained by multiplying the similarity between the representative value Repi of the current image and the representative value Repr of the past image calculated by the reliability calculation unit 34a by reliability Rel of the motion vector (|Repi−Repr|*Rel). In this case, when the similarity increases, the reliability of the motion vector calculated by the reliability calculation unit 34a is likely to increase and it is likely that the past image has a pixel value of a normal image; therefore, a weight is assigned to the pixel value (representative value) of the past image. Meanwhile, it may be possible to assume that the pixel of interest of the past image has a pixel value of a normal image. Furthermore, the reliability Rel is a value representing the likelihood of each motion vector based on images between which positional alignment is performed. The reliability Rel is calculated by the differential average value mSAD of the above-described first embodiment, well-known SSD, well-known MCC, well-known ZMCC, or the like.

Referring back to FIG. 22, the explanation of the processing from Step S423 will be continued.

At Step S423, the representative value calculation unit 326 determines the representative value Rep. After Step S423, the image processing apparatus 30a returns to the main routine in FIG. 15. Specifically, the representative value determination unit 323d determines the representative value Rep by Equation (11) below.

$$\text{Rep}=\text{Rep}i \times b+\text{Rep}r \times (1-b) \qquad (11)$$

The representative value calculation unit 326 may determine the representative value Rep from Equation (12) below using a pixel value Vali of the current image and a pixel value Valr of the past image.

$$\text{Rep}=\text{Val}i \times b+\text{Val}r \times (1-b) \qquad (12)$$

The representative value calculation unit 326 may store the current image and the uncorrected past image in the storage unit 36, and use the uncorrected past image instead of the past image.

According to the modification of the third embodiment of the disclosure as described above, it is possible to achieve the same effects as those of the third embodiment described above.

Fourth Embodiment

Next, a fourth embodiment of the disclosure will be described. In an imaging system according to the fourth embodiment, a noise reduction unit is configured differently from the noise reduction unit 35a of the image processing apparatus 30a of the second embodiment described above, and an image processing apparatus according to the fourth embodiment performs different representative value calculation processing. Specifically, in the fourth embodiment, a representative value corresponding to a pixel value of a pixel of interest for which RTS noise does not occur is calculated by using a current image and a plurality of past images. Hereinafter, a configuration of the noise reduction unit according to the fourth embodiment will be first described, and then the representative value calculation processing performed by the image processing apparatus according to the fourth embodiment will be described. The same components as those of the imaging system 1 of the first embodiment described above are denoted by the same reference signs, and explanation thereof will be omitted.

Figure 24:
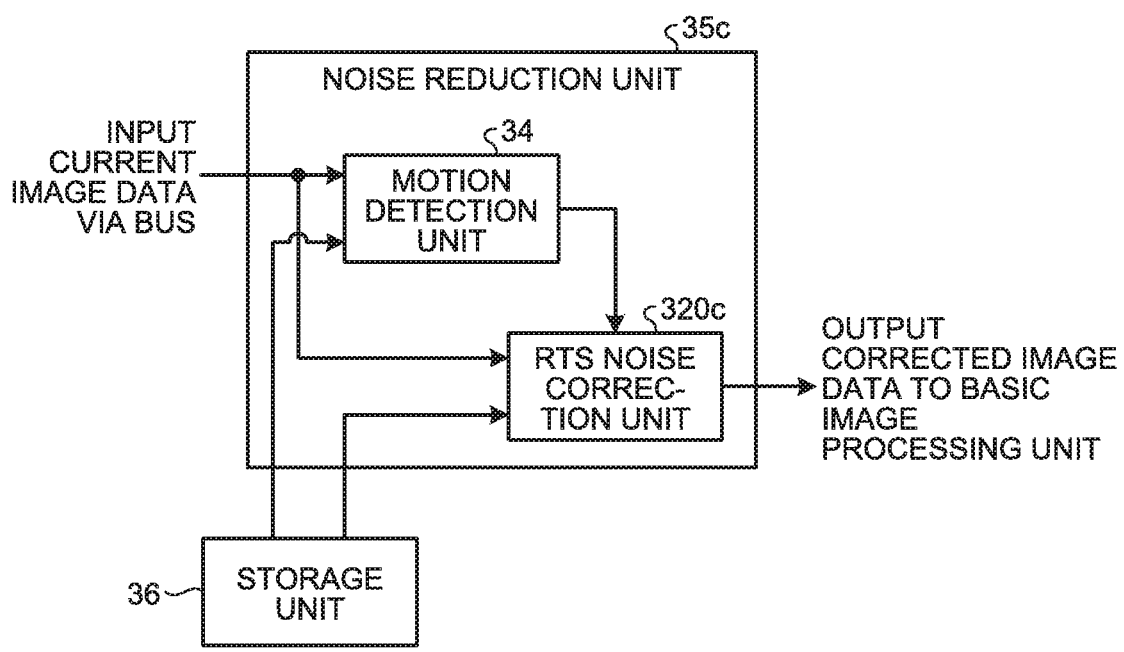
FIG. 24 is a block diagram illustrating a detailed configuration of a noise reduction unit according to a fourth embodiment of the disclosure.

FIG. 24 is a block diagram illustrating a detailed configuration of the noise reduction unit according to the fourth embodiment. A noise reduction unit 35c illustrated in FIG. 24 includes the motion detection unit 34 of the first embodiment described above and an RTS noise correction unit 320c.

The RTS noise correction unit 320c performs RTS noise correction processing for correcting RTS noise with respect to a current image input from the third external I/F unit 31, and outputs the corrected RAW image to the image processing unit 38.

Figure 25:
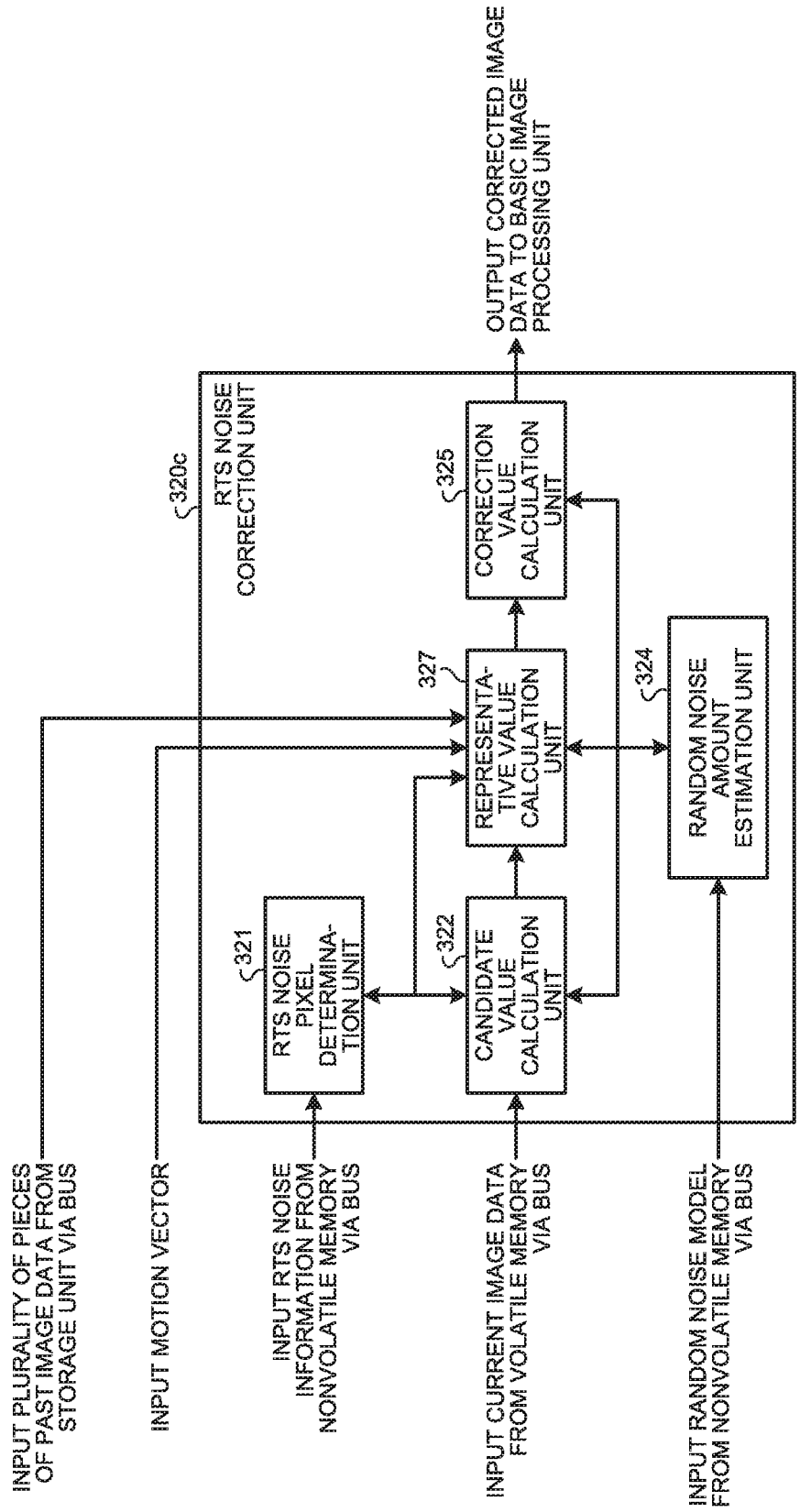
FIG. 25 is a block diagram illustrating a detailed configuration of an RTS noise correction unit according to the fourth embodiment of the disclosure.

A detailed configuration of the RTS noise correction unit 320c will be described below. FIG. 25 is a block diagram illustrating the detailed configuration of the RTS noise correction unit 320c.

As illustrated in FIG. 25, the RTS noise correction unit 320c includes a representative value calculation unit 327 instead of the representative value calculation unit 323 of the second embodiment described above.

The representative value calculation unit 327 calculates a representative value corresponding to a pixel value of a pixel of interest for which RTS noise does not occur, based on the motion vector detected by the motion detection unit 34, the current image, and a plurality of past images that are temporally continued to the current image and stored in the storage unit 36.

Representative Value Calculation Processing

Figure 26:
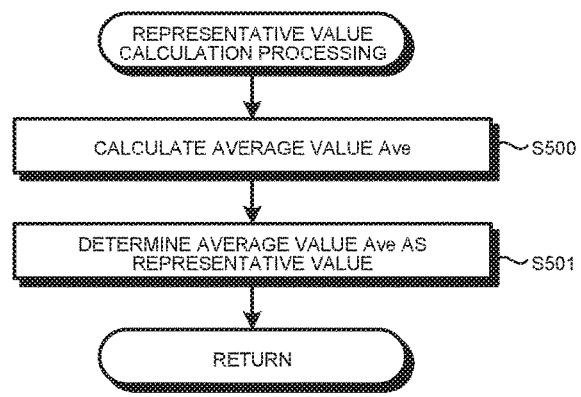
FIG. 26 is a flowchart illustrating an outline of representative value calculation processing performed by an image processing apparatus according to the fourth embodiment of the disclosure.

Next, the representative value calculation processing performed by the image processing apparatus 30a will be described. FIG. 26 is a flowchart illustrating an outline of the representative value calculation processing performed by the image processing apparatus 30a according to the fourth embodiment.

As illustrated in FIG. 26, the representative value calculation unit 327 calculates an average value Ave of the pixel value of the pixel of interest of the current image and the pixel value of the pixel of interest of each of the past images (Step S500). The representative value calculation unit 327 may perform calculation using a statistical value, such as a median value of the pixel value of the pixel of interest of the current image and the pixel value of the pixel of interest of each of the past images, instead of the average value.

Subsequently, the representative value calculation unit 327 determines the average value Ave calculated at Step S500 described above as the representative value (Step S501). After Step S501, the image processing apparatus 30a returns to the main routine in FIG. 15 described above.

According to the fourth embodiment of the disclosure as described above, the representative value calculation unit 323 calculates a representative value corresponding to a pixel value for which the RTS noise does not occur, by using the current image input from the third external I/F unit 31 and the plurality of past images stored in the storage unit 36. Therefore, even when the magnitudes of the neighboring pixels of the pixel of interest of the current image fluctuate, it is possible to reduce fluctuation in the magnitudes, so that it is possible to reduce RTS noise without degrading image quality.

In the fourth embodiment of the disclosure, the representative value calculation unit 323 calculates the representative value corresponding to the pixel value for which the RTS noise does not occur by using the current image and the plurality of past images. However, the representative value may be calculated by using, for example, a past image or an image corresponding to future (new) image data (hereinafter, a "future image") obtained at around a capturing time (generation timing) of the current image. In this case, when m past images and future images are used, it is sufficient to use n past images among m images and use m-n future images. When the future images are used, frame delay is likely to occur; therefore, it is preferable to use the future images within a range in which the frame delay is allowed.

Furthermore, in the fourth embodiment of the disclosure, the representative value calculation unit 323 may store, in the storage unit 36, an uncorrected image that is temporally continued to the current image, and use the uncorrected past image instead of the past image.

First Modification of Fourth Embodiment

Next, a first modification of the fourth embodiment of the disclosure will be described. In the first modification of the fourth embodiment, a noise reduction unit is configured differently, and an image processing apparatus performs different representative value calculation processing. Specifically, an image processing apparatus according to the first modification of the fourth embodiment calculates a representative value by using a current image and an uncorrected past image. Hereinafter, a configuration of the noise reduction unit according to the first modification of the fourth embodiment will be first described, and then the representative value calculation processing performed by the image processing apparatus according to the first modification of the fourth embodiment will be described. The same components as those of the embodiments as described above are denoted by the same reference signs, and explanation thereof will be omitted.

Figure 27:
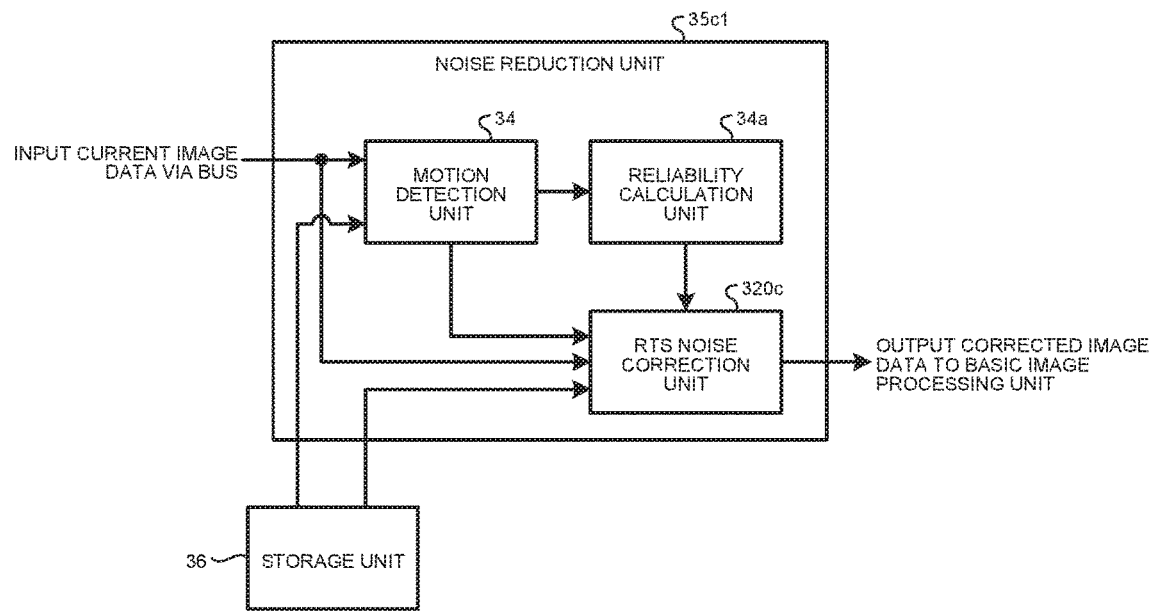
FIG. 27 is a block diagram illustrating a detailed configuration of an RTS noise correction unit according to a first modification of the fourth embodiment of the disclosure.

FIG. 27 is a block diagram illustrating a detailed configuration of the noise reduction unit according to the first modification of the fourth embodiment of the disclosure. A noise reduction unit 35c1 illustrated in FIG. 27 includes the reliability calculation unit 34a in addition to the components of the noise reduction unit 35c of the fourth embodiment described above.

Outline of Representative Value Calculation Processing

Figure 28:
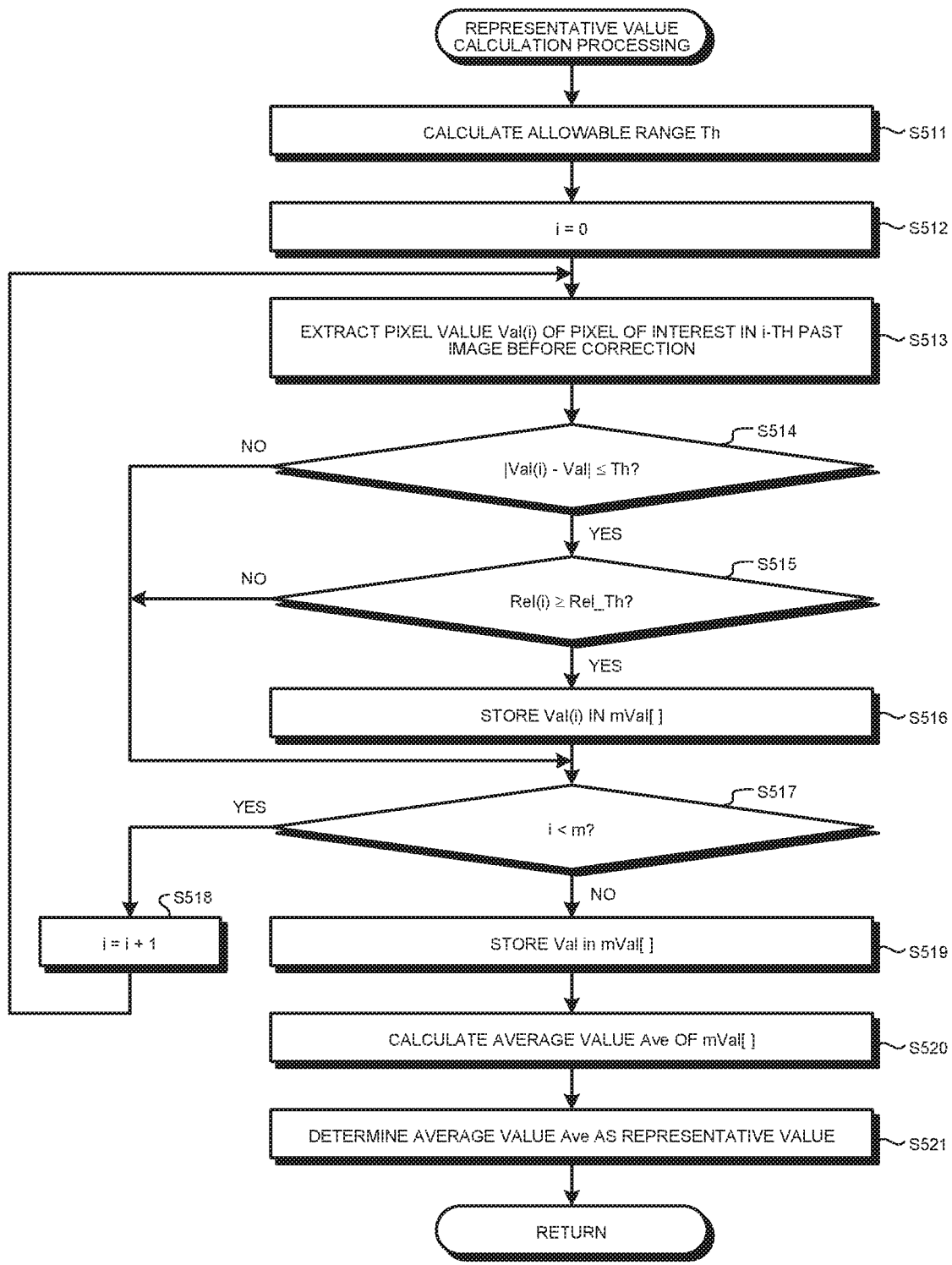
FIG. 28 is a flowchart illustrating an outline of representative value calculation processing performed by an image processing apparatus according to the first modification of the fourth embodiment of the disclosure.

FIG. 28 is a flowchart illustrating an outline of the representative value calculation processing performed by the image processing apparatus 30a according to the first modification of the fourth embodiment.

As illustrated in FIG. 28, the allowable range calculation unit 323c calculates an allowable range Th (effective range), which is a range of pixel values available for the representative value calculation processing, based on RTS noise information on a pixel of interest (Step S511). Specifically, the allowable range calculation unit 323c calculates the allowable range Th (effective range) by Equation (13) below.

$$Th = RTS\_Value \text{ of Pixel of interest} \times Co \quad (13)$$

Here, Co is a predetermined coefficient and is preferably set to 1 or more for example. Co may be set to a constant value in advance or may be set to an arbitrary value by a user.

Subsequently, the representative value calculation unit 327 initializes a counter (i=0) (Step S512), and extracts a pixel value Val(i) of a pixel of interest in an i-th image among a plurality of uncorrected past images input from the storage unit 36 (Step S513). Specifically, the representative value calculation unit 327 uses m uncorrected past images input from the storage unit 36 as 0-th, 1-th, . . . , m−1-th (a larger number indicates an older image) uncorrected past images in a chronological order. It is assumed that each of the uncorrected past images input from the storage unit 36 at Step S513 is subjected to positional alignment processing for the pixel of interest. Furthermore, the 0-th past image is equal to the current image.

Thereafter, the representative value calculation unit 327 determines whether a difference between the pixel value Val of the pixel of interest of the current image and the pixel value Val(i) of the pixel of interest of the i-th uncorrected past image is equal to or smaller than the allowable range Th (|Val(i)−Val|≤Th) (Step S514). When the representative value calculation unit 327 determines that the difference between the pixel value Val of the pixel of interest of the current image and the pixel value Val(i) of the pixel of interest of the i-th uncorrected past image is equal to or smaller than the allowable range Th (Step S514: Yes), the image processing apparatus 30a proceeds to Step S515 to be described below. In contrast, when the representative value calculation unit 327 determines that the difference between the pixel value Val of the pixel of interest of the current image and the pixel value Val(i) of the pixel of interest of the i-th uncorrected past image is not equal to or smaller than the allowable range Th (Step S514: No), the image processing apparatus 30a proceeds to Step S517 to be described below.

At Step S515, the representative value calculation unit 327 determines whether reliability Rel(i) of the motion vector of the i-th uncorrected past image, which is calculated by the reliability calculation unit 34a, is equal to or larger than a predetermined threshold Rel_Th (Rel(i)≥Rel_Th). Here, the threshold Rel_Th may be set to a constant value in advance or may be set to an arbitrary value by a user. When the representative value calculation unit 327 determines that the reliability Rel(i) of the motion vector of the i-th uncorrected past image calculated by the reliability calculation unit 34a is equal to or larger than the predetermined threshold Rel_Th (Step S515: Yes), the image processing apparatus 30a proceeds to Step S516 to be described below. In contrast, when the representative value calculation unit 327 determines that the reliability Rel(i) of the motion vector of the i-th uncorrected past image calculated by the reliability calculation unit 34a is not equal to or larger than the predetermined threshold Rel_Th (Step S515: No), the image processing apparatus 30a proceeds to Step S517 to be described below.

At Step S516, the representative value calculation unit 327 stores the pixel value Val(i) of the pixel of interest of the i-th uncorrected past image in mVal[ ] in the storage unit 36.

Subsequently, the representative value calculation unit 327 determines whether a counter i is smaller than the number m of the uncorrected past images input from the storage unit 36 (i<m) (Step S517). When the representative value calculation unit 327 determines that the counter i is smaller than the number m of the uncorrected past images input from the storage unit 36 (Step S517: Yes), the representative value calculation unit 327 increments the counter (i=i+1) (Step S518), and returns to Step S513. In contrast, when the representative value calculation unit 327 determines that the counter i is not smaller than the number m of the uncorrected past images input from the storage unit 36 (Step S517: No), the image processing apparatus 30a proceeds to Step S519.

At Step S519, the representative value calculation unit 327 stores the pixel value Val of the pixel of interest in mVal[ ] of the storage unit 36.

Subsequently, the representative value calculation unit 327 calculates an average value Ave of all of the pixel values stored in mVal[ ] of the storage unit 36 (Step S520). The representative value calculation unit 327 may calculate the average value by assigning a weight to the pixel value of the pixel of interest of each image. As a method of calculating the weighting coefficient, it may be possible to increase the weighting coefficient as the reliability of the motion vector increases, it may be possible to decrease the weighting coefficient as |Val(i)−Val| decreases, or it may be possible to calculate the weight from a combination of a plurality of parameters (for example, the reliability of the motion vector, a difference, and the like). Furthermore, the representative value calculation unit 327 may use other statistical values, such as a median value or a mode value, other than the average value or the weighted average value.

Thereafter, the representative value calculation unit 327 determines the average value Ave calculated at Step S520 as the representative value (Step S521). After Step S521, the image processing apparatus 30a returns to the main routine in FIG. 15.

According to the first modification of the fourth embodiment of the disclosure as described above, the representative value calculation unit 327 determines, as the representative value, a value extracted and calculated from the pixel value of a pixel of each of the uncorrected past images corresponding to the position of the pixel of interest of the current image, based on the pixel value of the pixel of interest of the current image. Therefore, even when a luminance value of a subject changes, the representative value is calculated only from a pixel value similar to the pixel value of the current image. Consequently, it is possible to improve the reliability of the representative value.

Second Modification of Fourth Embodiment

Next, a second modification of the fourth embodiment of the disclosure will be described. The second modification of the fourth embodiment is different only in that the image processing apparatus 30a of the fourth embodiment described above performs different representative value calculation processing. Specifically, the image processing apparatus 30a according to the second modification of the fourth embodiment calculates a representative value by using an uncorrected past image and a past image. Hereinafter, the representative value calculation processing performed by the image processing apparatus 30a according to the second modification of the fourth embodiment will be described.

Outline of Representative Value Calculation Processing

Figure 29:
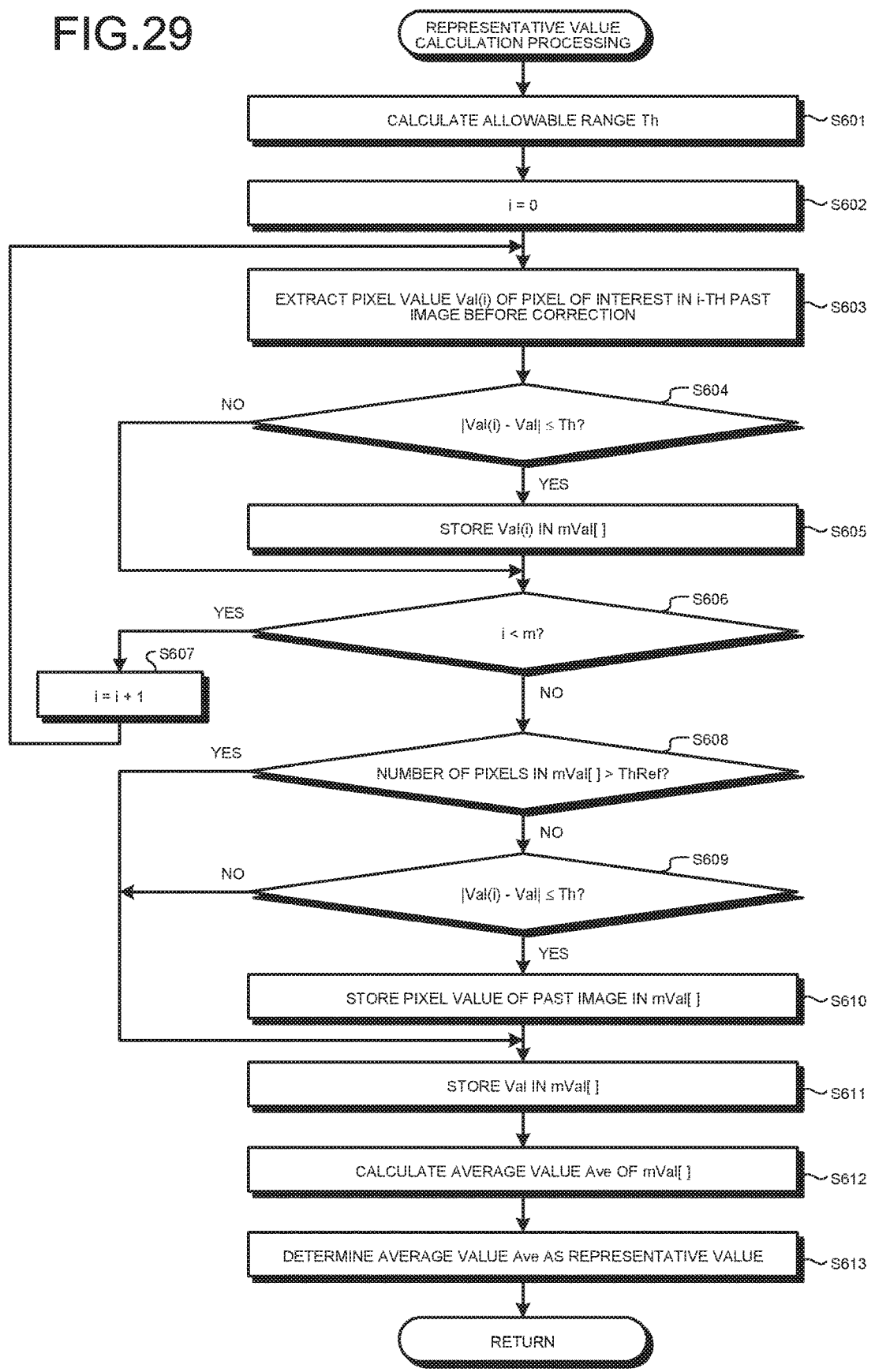
FIG. 29 is a flowchart illustrating an outline of representative value calculation processing performed by an image processing apparatus according to a second modification of the fourth embodiment of the disclosure.

FIG. 29 is a flowchart illustrating an outline of the representative value calculation processing performed by the image processing apparatus 30a according to the second modification of the fourth embodiment.

In FIG. 29, Step S601 to Step S607 respectively correspond to Step S511 to Step S514 and Step S516 to Step S518 illustrated in FIG. 28. At Step S602, it is not necessary that i=0, and it may be possible to calculate the representative value by using only the uncorrected past image by setting i=1.

At Step S608, the representative value calculation unit 327 determines whether the number of pixels stored in mVal[ ] of the storage unit 36 is larger than the threshold ThRef (mVal[ ]>ThRef). When the representative value calculation unit 327 determines that the number of pixels stored in mVal[ ] of the storage unit 36 is larger than the threshold ThRef (Step S608: Yes), the image processing apparatus 30a proceeds to Step S611 to be described below. In contrast, when the representative value calculation unit 327 determines that the number of pixels stored in mVal[ ] of the storage unit 36 is not larger than the threshold ThRef (Step S608: No), the image processing apparatus 30a proceeds to Step S609 to be described below.

At Step S609, the representative value calculation unit 327 determines whether a difference between the pixel value Val of the pixel of interest of the current image and the pixel value Val(i) of the pixel of interest of the past image is equal to or smaller than the allowable range Th ($|Val(i)-Val| \leq Th$) (Step S609). When the representative value calculation unit 327 determines that the difference between the pixel value Val of the pixel of interest of the current image and the pixel value Val(i) of the pixel of interest of the past image is equal to or smaller than the allowable range Th (Step S609: Yes), the image processing apparatus 30a proceeds to Step S610 to be described below. In contrast, when the representative value calculation unit 327 determines that the difference between the pixel value Val of the pixel of interest of the current image and the pixel value Val(i) of the pixel of interest of the past image is not equal to or smaller than the allowable range Th (Step S609: No), the image processing apparatus 30a proceeds to Step S611 to be described below.

At Step S610, the representative value calculation unit 327 stores the pixel value Val(i) of the pixel of interest of the past image in mVal[ ] of the storage unit 36. After Step S610, the image processing apparatus 30a proceeds to Step S611.

Step S611 to Step S613 respectively correspond to Step S519 to Step S521 illustrated in FIG. 26 described above. After Step S613, the image processing apparatus 30a returns to the main routine in FIG. 15.

According to the second modification of the fourth embodiment of the disclosure as described above, when the number of pixel values that is included in the uncorrected past image and similar to the pixel of interest is small, the representative value calculation unit 327 calculates the representative value by referring to the pixel values of the past image; therefore, it is possible to improve the reliability of the representative value.

Third Modification of Fourth Embodiment

Next, a third modification of the fourth embodiment of the disclosure will be described. The third modification of the fourth embodiment is different in that the image processing apparatus 30a of the fourth embodiment described above performs different representative value calculation processing. Specifically, the image processing apparatus 30a according to the third modification of the fourth embodiment calculates a representative value by using pixel values of neighboring pixels in a past image. Hereinafter, the representative value calculation processing performed by the image processing apparatus 30a according to the third modification of the fourth embodiment will be described.

Representative Value Calculation Processing

Figure 30:
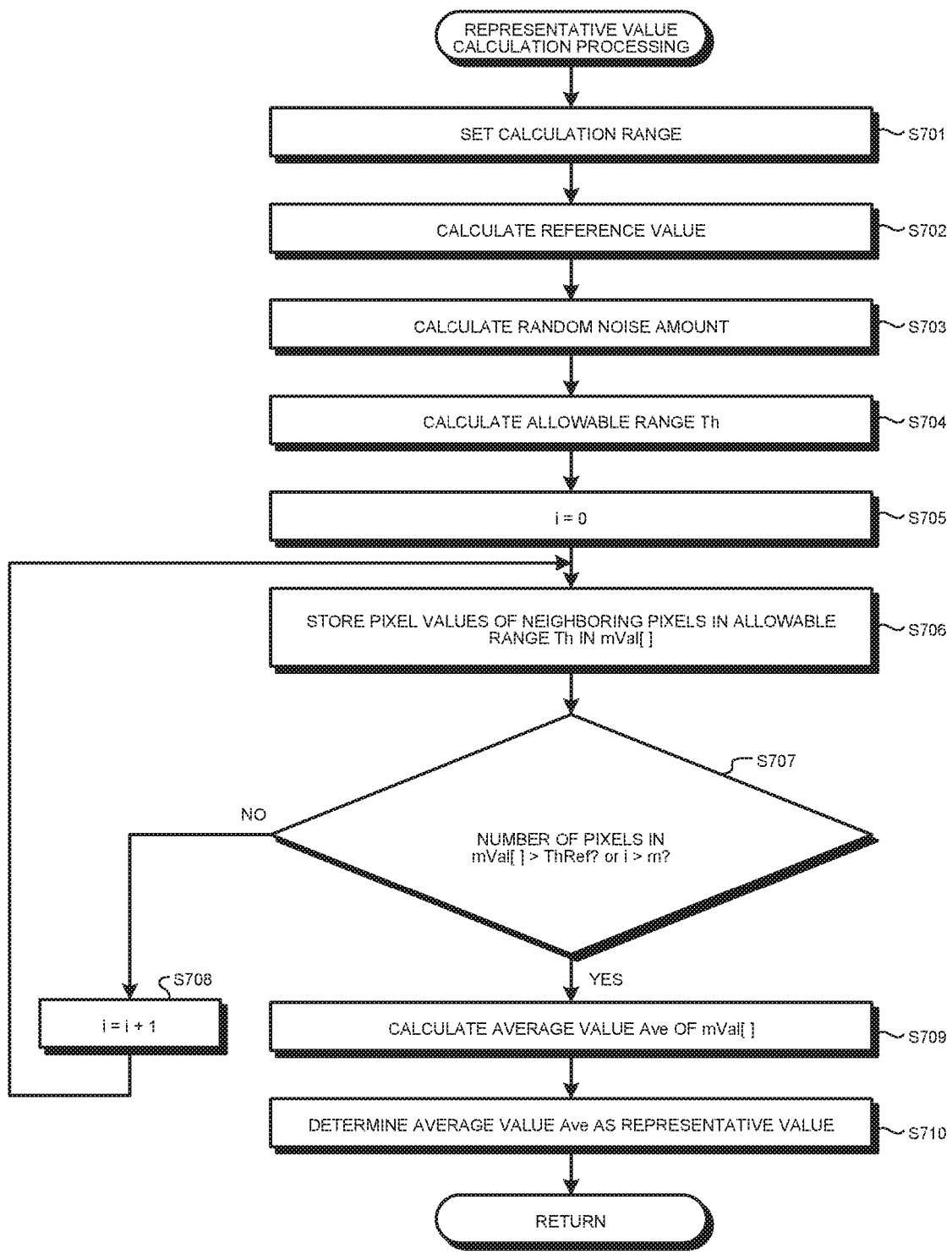
FIG. 30 is a flowchart illustrating an outline of representative value calculation processing performed by an image processing apparatus according to a third modification of the fourth embodiment of the disclosure.

FIG. 30 is a flowchart illustrating an outline of the representative value calculation processing performed by the image processing apparatus 30a according to the third modification of the fourth embodiment.

In FIG. 30, Step S701 to Step S704 respectively correspond to Step S201 to Step S204 of FIG. 16 described above.

At Step S705, the counter is initialized (i=0) (Step S705), and pixel values of neighboring pixels in the allowable range Th are stored in mVal[ ] of the storage unit 36 (Step S706).

Subsequently, when the number of pixels stored in mVal[ ] of the storage unit 36 is larger than the threshold ThRef (Step S707: Yes) or when the counter i is larger than the number m of the past images input from the storage unit 36, the image processing apparatus 30a proceeds to Step S709 to be described below.

At Step S707, when the number of pixels stored in mVal[ ] of the storage unit 36 is not larger than the threshold ThRef and when the counter i is not larger than the number m of the past images input from the storage unit 36 (Step S707: No), the image processing apparatus 30a proceeds to Step S708 to be described later.

At Step S708, the representative value calculation unit 327 increments the counter (i=i+1). After Step S708, the image processing apparatus 30a returns to Step S706.

Step S709 and Step S710 respectively correspond to Step S612 and Step S613 of FIG. 29 described above.

The representative value calculation unit 327 may store, in the storage unit 36, an uncorrected image that is temporally continued to the current image, and use the uncorrected past image instead of the past image.

According to the third modification of the fourth embodiment of the disclosure as described above, the representative value calculation unit 327 calculates the representative value by using the pixel values of the neighboring pixels in the past image. Therefore, it is possible to improve the reliability of the representative value.

Fifth Embodiment

Next, a fifth embodiment of the disclosure will be described. In the first embodiment described above, the image processing apparatus 30 is separately provided. However, in the fifth embodiment, an image processing apparatus is provided in a main body of an imaging apparatus. Therefore, hereinafter, the same components as those of the imaging system 1 of the first embodiment described above are denoted by the same reference signs, and explanation thereof will be omitted.

Configuration of Imaging System

Figure 31:
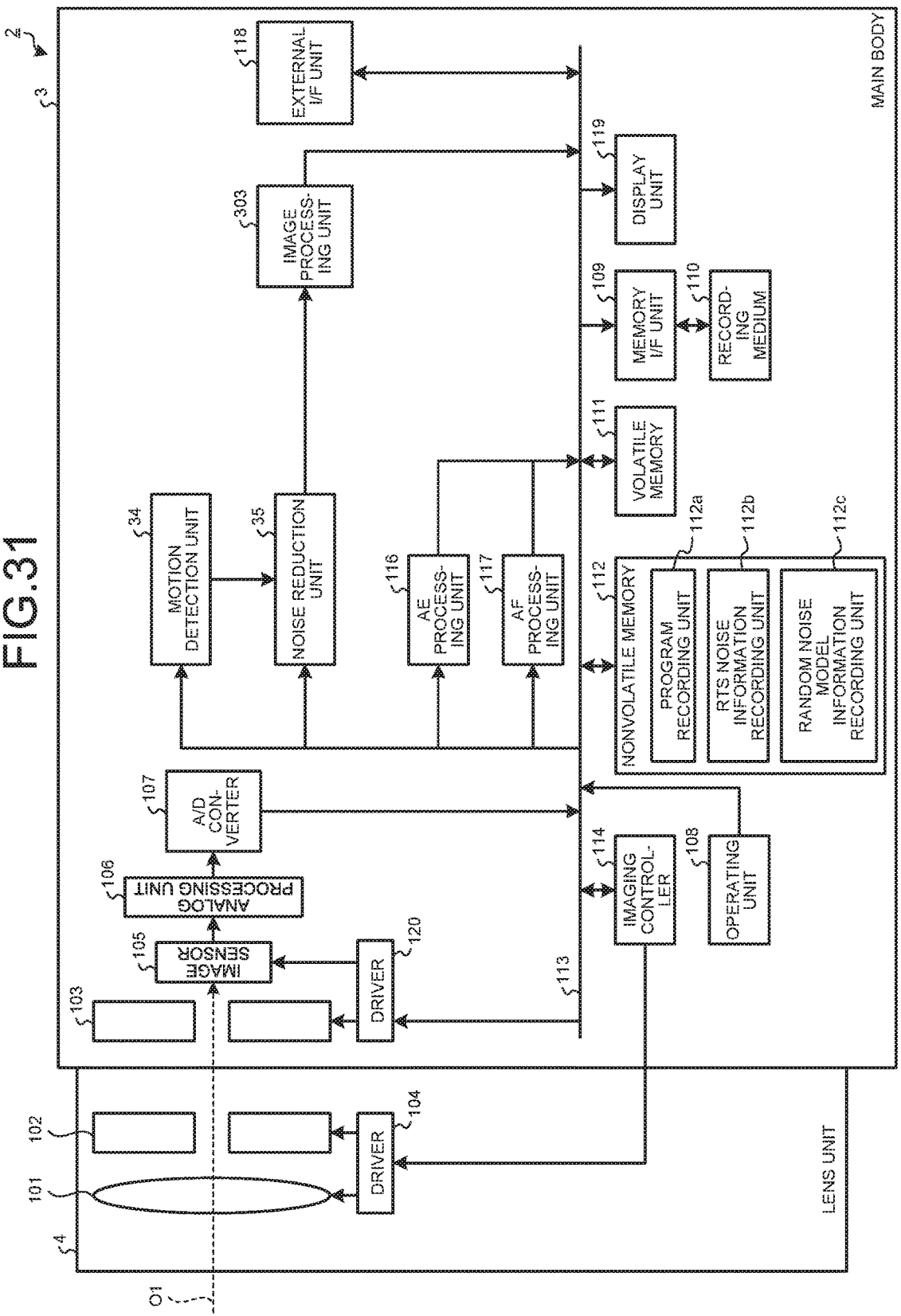
FIG. 31 is a block diagram schematically illustrating a configuration of an imaging system according to a fifth embodiment of the disclosure.

FIG. 31 is a block diagram schematically illustrating a configuration of an imaging system 2 according to the fifth embodiment of the disclosure. The imaging system 2 illustrated in FIG. 31 includes a main body 3 and a lens unit 4 that is removably connectable to the main body 3.

Configuration of Main Body

The main body 3 includes the shutter 103, the image sensor 105, the analog processing unit 106, the A/D converter 107, the operating unit 108, the memory I/F unit 109, the recording medium 110, the volatile memory 111, the nonvolatile memory 112, the bus 113, the imaging controller 114, an AE processing unit 116, an AF processing unit 117, an external I/F unit 118, a display unit 119, a driver 120, and the noise reduction unit 35. The driver 120 drives the shutter 103 under the control of the imaging controller 114.

The AE processing unit 116 acquires image data stored in the volatile memory 111 via the bus 113, and sets an exposure condition used for capturing a still image or capturing a moving image, based on the acquired image data. Specifically, the AE processing unit 116 calculates luminance from the image data, and performs automatic exposure (auto exposure) of the imaging system 2 by determining, for example, a diaphragm value, an exposure time, an ISO sensitivity, or the like based on the calculated luminance.

The AF processing unit 117 acquires image data stored in the volatile memory 111 via the bus 113, and adjusts autofocus of the imaging system 2 based on the acquired image data. For example, the AF processing unit 117 extracts a high frequency component signal from the image data and performs autofocus (AF) calculation processing on the high frequency component signal, to thereby determine focus evaluation of the imaging system 2 and adjust autofocus of the imaging system 2. As a method of adjusting the autofocus of the imaging system 2, it may be possible to acquire a phase difference signal by the image sensor 105.

The external I/F unit 118 can read and write data in various blocks in the main body 3 and perform control using a dedicated command or the like. The external I/F unit 118 is an interface capable of controlling various blocks in the main body 3 by connecting a dedicated circuit on which an FPGA, a DSP, a GPU, or the like is mounted or an external apparatus, such as a personal computer (PC).

The display unit 119 is constituted by a display panel made of liquid crystal, organic electro luminescence (EL), or the like. The display unit 119 displays an image corresponding to image data generated by the image sensor 105.

Configuration of Lens Unit

As illustrated in FIG. 31, the lens unit 4 forms, on the image sensor 105, an image of a subject using light collected from a predetermined field of view. The optical system 101, the diaphragm 102, and the driver 104 are provided.

Processing Performed by Imaging System

Figure 32:
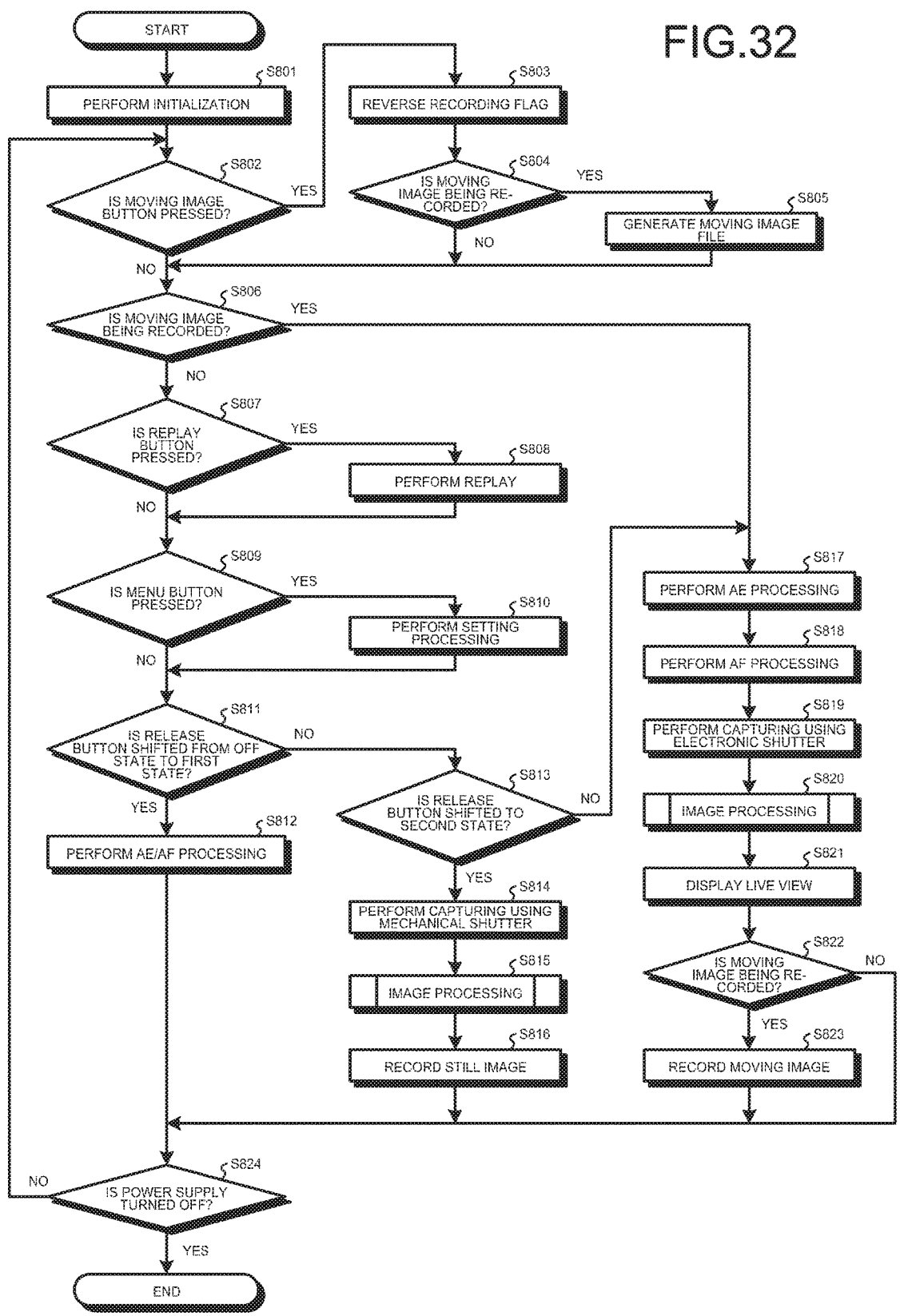
FIG. 32 is a flowchart illustrating an outline of processing performed by the imaging system according to the fifth embodiment of the disclosure.

Next, processing performed by the imaging system 2 will be described. FIG. 32 is a flowchart illustrating an outline of the processing performed by the imaging system 2.

As illustrated in FIG. 32, first, when a user operates a power button (not illustrated) of the operating unit 108 to turn on a power supply of the main body 3, the imaging controller 114 initializes the imaging system 2 (Step S801). Specifically, the imaging controller 114 performs initialization to turn off a recording flag indicating that a moving image is being recorded. The recording flag is a flag that is turned on when a moving image is being captured and that is turned off when a moving image is not being captured, and is stored in the volatile memory 111.

Subsequently, when a moving image button of the operating unit 108 is pressed (Step S802: Yes), the imaging controller 114 reverses the recording flag indicating that a moving image is being recorded in an ON state (Step S803), and the imaging controller 114 determines whether the imaging system 2 is recording a moving image (Step S804). Specifically, the imaging controller 114 determines whether the recording flag recorded in the volatile memory 111 is in the ON state. When the imaging controller 114 determines that the imaging system 2 is recording a moving image (Step S804: Yes), the imaging system 2 proceeds to Step S805 to be described below. In contrast, when the imaging controller 114 determines that the imaging system 2 is not recording a moving image (Step S804: No), the imaging system 2 proceeds to Step S806 to be described below.

At Step S805, the imaging controller 114 generates a moving image file for recording image data in the recording medium 110 in chronological order. After Step S805, the imaging system 2 proceeds to Step S806 to be described below.

At Step S802, when the moving image button of the operating unit 108 is not pressed (Step S802: No), the imaging system 2 proceeds to Step S806.

Subsequently, the imaging controller 114 determines whether the imaging system 2 is recording a moving image (Step S806). When the imaging controller 114 determines that the imaging system 2 is recording a moving image (Step S806: Yes), the imaging system 2 proceeds to Step S817 to be described below. In contrast, when the imaging controller 114 determines that a moving image is not being recorded (Step S806: No), the imaging system 2 proceeds to Step S807 to be described below.

At Step S807, when a replay button of the operating unit 108 is pressed (Step S807: Yes), the imaging system 2 reproduces and displays an image corresponding to the image data recorded in the recording medium 110 on the display unit 119 (Step S808). After Step S808, the imaging system 2 proceeds to Step S809 to be described below.

At Step S807, when the replay button of the operating unit 108 is not pressed (Step S807: No), the imaging system 2 proceeds to Step S809.

Subsequently, when a menu button of the operating unit 108 is pressed (Step S809: Yes), the imaging system 2 performs setting processing for performing various settings (Step S810). After Step S810, the imaging system 2 proceeds to Step S811 to be described below.

At Step S809, when the menu button of the operating unit 108 is not pressed (Step S809: No), the imaging system 2 proceeds to Step S811.

At Step S811, when a release button of the operating unit 108 is shifted from an OFF state to a first state (Step S811: Yes), the imaging controller 114 causes the AE processing unit 116 to perform AE processing for adjusting exposure and causes the AF processing unit 117 to perform AF processing for adjusting focus (Step S812). Thereafter, the imaging system 2 proceeds to Step S824 to be described below.

At Step S811, when the release button of the operating unit 108 is not shifted from the OFF state to the first state (Step S811: No), the imaging system 2 proceeds to Step S813.

Subsequently, when the release button of the operating unit 108 is shifted to a second state (Step S813: Yes), the imaging controller 114 performs capturing using a mechanical shutter (Step S814). Specifically, the imaging controller 114 controls the shutter 103 and causes the image sensor 105 to perform capturing.

Subsequently, the imaging system 2 corrects RTS noise on the image data generated by the image sensor 105, and performs image processing for performing predetermined processing (Step S815). Details of the image processing will be described later.

Thereafter, the imaging controller 114 records, in the recording medium 110, the image data on which the image processing has been performed by an image processing unit 303 (Step S816). After Step S816, the imaging system 2 proceeds to Step S824 to be described below.

At Step S813, when the release button of the operating unit 108 is not shifted to the second state (Step S813: No), the imaging system 2 proceeds to Step S817.

Subsequently, the imaging controller 114 causes the AE processing unit 116 to perform AE processing for adjusting exposure (Step S817), and causes the AF processing unit 117 to perform AF processing for adjusting focus (Step S818).

Thereafter, the imaging controller 114 causes the image sensor 105 to perform capturing using a so-called electronic shutter that electronically controls exposure time, via the driver 120 (Step S819). The image data generated by the image sensor 105 through the capturing using the electronic shutter is output to the volatile memory 111 via the analog processing unit 106, the A/D converter 107, and the bus 113.

Subsequently, the imaging system 2 performs the same image processing as the processing performed at Step S815 (Step S820). Details of the image processing will be described later.

Thereafter, the imaging system 2 causes the display unit 119 to display a live view image corresponding to the image data that is generated by the image sensor 105 through the capturing using the electronic shutter (Step S821).

Subsequently, when the imaging system 2 is recording a moving image (Step S822: Yes), the imaging controller 114 causes an image compression/decompression unit (not illustrated) to compress the image data in a recording format set through the setting processing at Step S810, and records the compressed image data as a moving image in a moving image file generated in the recording medium 110 (Step S823). After Step S823, the imaging system 2 proceeds to Step S824.

At Step S822, when the imaging system 2 is not recording a moving image (Step S822: No), the imaging system 2 proceeds to Step S824.

Subsequently, when the power button of the operating unit 108 is pressed and the power supply of the imaging system 2 is turned off (Step S824: Yes), the imaging system 2 ends the processing. In contrast, when the power supply of the imaging system 2 is not turned off (Step S824: No), the imaging system 2 returns to Step S802.

Outline of Image Processing

Figure 33:
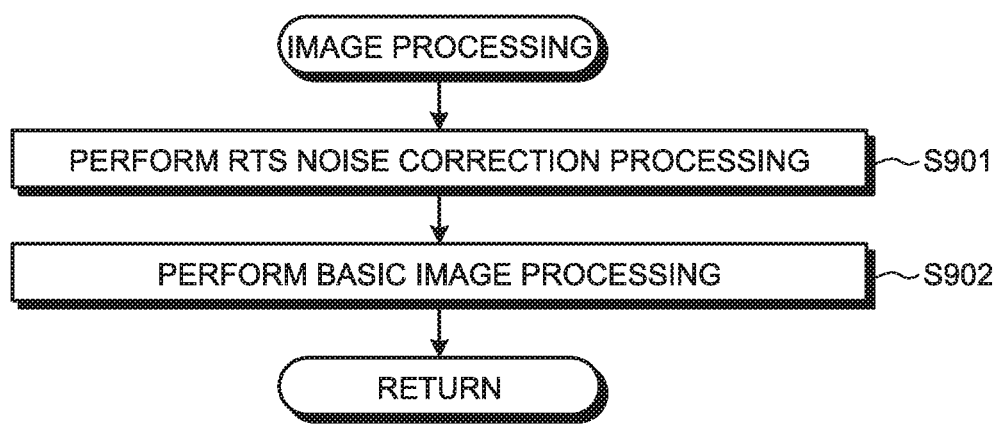
FIG. 33 is a flowchart illustrating an outline of image processing illustrated in FIG. 30.

Next, the image processing described at Step S815 and Step S820 in FIG. 32 will be described. FIG. 33 is a flowchart illustrating an outline of the image processing.

As illustrated in FIG. 33, the noise reduction unit 35 performs RTS noise correction processing for correcting RTS noise in the image data generated by the image sensor 105 (Step S901). Here, the RTS noise correction processing corresponds to the processing performed by the image processing apparatus 30 according to the first embodiment described above or the processing performed by the image processing apparatus 30a according to the second to the fourth embodiments described above; therefore, explanation thereof will be omitted.

Subsequently, the image processing unit 303 performs basic image processing on the image data in which the RTS noise has been corrected by the noise reduction unit 35 (Step S902). After Step S902, the imaging system 2 returns to the main routine in FIG. 32.

According to the fifth embodiment of the disclosure as described above, it is possible to achieve the same effects as those of the first embodiment described above.

Other Embodiments

The disclosure is not limited to the embodiments as described above, and various modifications and applications are of course possible within the scope of the gist of the disclosure. For example, in addition to the imaging apparatus used in the description of the disclosure, the disclosure may be applied to any device capable of capturing an image of a subject, such as a portable device with an image sensor in a mobile phone or a smartphone, an imaging apparatus capable of capturing an image of a subject through an optical system, such as a video camera, an endoscope, a surveillance camera, or a microscope, and the like.

In the embodiment, the reference value of the random noise model and the noise model to be referred to are changed depending on RTS_Value that is a characteristic amount of RTS noise or depending on the maximum value of the candidate values based on RTS_Value. However, it may be possible to combine these values, select a random noise model in accordance with the characteristic amount of the RTS noise, and estimate the random noise amount by changing the reference value. Furthermore, because the random noise amount fluctuates depending on temperature, it may be possible to select a random noise model depending on temperature of the image sensor at the time of capturing image data, and then apply the above-described method.

Moreover, in the embodiments, the RTS noise information recording unit is provided inside the imaging apparatus; however, the RTS noise information recording unit may be provided inside the image processing apparatus as described above, or may be provided in a server capable of performing bidirectional communication via a network, and acquire the RTS noise information via the network.

Furthermore, the disclosed technology may be applied to image data other than image data used for display or recording; for example, the disclosed technology may be applied to image data of an OB region or image data of a region outside an image circle for which optical design assurance is not ensured.

Moreover, in the explanation of each operation flowchart described above in this document, the operations are described using "first", "then", "subsequently", "thereafter", and the like; however, this does not mean that it is necessary to perform the operations in this order.

In addition, each of the processing methods by the image processing apparatus according to the embodiments described above, that is, the processing described in each flowchart, may be stored as a program that can be executed by a controller, such as a CPU. Furthermore, each processing may be stored in a storage medium of an external storage device, such as a memory card (a ROM card, a RAM card, or the like), a magnetic disk (a floppy (registered trademark) disk, a hard disk, or the like), an optical disk (a CD-ROM, a DVD, or the like), or a semiconductor memory, and then distributed. Then, the controller, such as a CPU, reads the program stored in the storage medium of the external storage device, and the operations are controlled by the read program, so that the above-described processing can be executed.

According to some embodiments, it is possible to improve image quality even when a correlation between a pixel value of a pixel of interest and a pixel value of a neighboring pixel is low.

The disclosure is not limited to the above-described embodiments and modifications as they are. In the implementation stage, the disclosure may be embodied with various modifications of the constituent elements within the scope not departing from the gist of the disclosure. In addition, various inventions may be made by appropriately combining a plurality of constituent elements disclosed in the above embodiments. For example, some constituent elements may be deleted from all of the constituent elements described in the embodiments and the modifications described above. Furthermore, the constituent elements described in the embodiments and the modifications may be appropriately combined.

Moreover, in the specification or the drawings, a term that is at least once described together with a different term having a broader meaning or the same meaning may be replaced with the different term at any point in the specification or the drawings. Thus, various modifications and applications may be made without departing from the scope of the invention.

What is claimed is:

1. An image processing apparatus for correcting blinking defect noise contained in image data generated by an image sensor, the image sensor comprising: a plurality of pixels arranged two-dimensionally and configured to receive light from outside to generate a signal according to an amount of the received light; and a plurality of reading circuits configured to read the signal as a pixel value, the image processing apparatus comprising:
  an image processor that comprises hardware, the image processor being configured to:
    acquire the image data and noise information including one of positional information on a reading circuit in which blinking defect noise caused by the reading circuit occurs and positional information on each of the pixels;
    set the image data acquired by the acquisition interface as correction target image data;
    calculate a movement amount of a subject based on the correction target image data and reference image data, the reference image data being based on image data acquired at a time different from the acquisition of the correction target image data;
    estimate a random noise amount around a pixel of interest of the correction target image data, wherein the estimation comprises:
      acquire a reference pixel of the reference image data corresponding to one of the pixel of interest and a neighboring pixel of the pixel of interest, based on the movement amount;
      calculate, based on the random noise amount, a representative value that indicates an expected pixel value in which blinking defect noise does not occur; and
      correct the pixel value of the pixel of interest based on the representative value.

2. The image processing apparatus according to claim 1, wherein when the blinking defect noise occurs at the pixel of interest, and the image processor is configured to increase intensity of noise reduction processing at the pixel of interest as compared to a case where the blinking defect noise does not occur.

3. The image processing apparatus according to claim 2, wherein when the blinking defect noise occurs at the pixel of interest, and the image processor is configured to increase intensity of noise reduction processing in a time direction using the reference image data.

4. The image processing apparatus according to claim 2, wherein when the blinking defect noise occurs at the pixel of interest, and the image processor is configured to increase intensity of noise reduction processing in a spatial direction using the neighboring pixel of the pixel of interest.

5. The image processing apparatus according to claim 1, wherein the image processor is configured to calculate the representative value based on the pixel value of the pixel of interest.

6. The image processing apparatus according to claim 1, wherein the image processor is configured to calculate the representative value based on one of a pixel value of the reference pixel at which the blinking defect noise does not occur and a pixel value of the reference pixel at which the blinking defect noise is corrected.

7. The image processing apparatus according to claim 1, wherein the image processor is configured to calculate the representative value based on a pixel value of the neighboring pixel of the pixel of interest at which the blinking defect noise does not occur.

8. The image processing apparatus according to claim 1, wherein
  the noise information further includes a blinking defect noise level that is a noise level of the blinking defect noise and associated with one of the positional information on the reading circuit in which the blinking defect noise caused by the reading circuit occurs and the positional information on each of the pixels, and
  the image processor is configured to correct the pixel value of the pixel of interest by using the blinking defect noise level.

9. The image processing apparatus according to claim 2, wherein
  the noise information further includes a blinking defect noise level that is associated with one of the positional information on the reading circuit in which the blinking defect noise caused by the reading circuit occurs and the positional information on each of the pixels, and the image processor is configured to increase intensity of noise reduction processing at the pixel of interest as the blinking defect noise level increases.

10. The image processing apparatus according to claim 1, wherein
the noise information further includes a blinking defect noise level that is a noise level of the blinking defect noise and associated with one of the positional information on the reading circuit in which the blinking defect noise caused by the reading circuit occurs and the positional information on each of pixels, and
the image processor is configured to calculate the representative value based on the blinking defect noise level.

11. The image processing apparatus according to claim 1, wherein the image processor is further configured to:
calculate a reliability indicating likelihood of the movement amount calculated by the movement amount calculation unit, wherein
calculate the representative value based on the reliability.

12. The image processing apparatus according to claim 1, wherein the reference image data is image data generated by the image sensor immediately before the image data corresponding to the correction target image data.

13. The image processing apparatus according to claim 1, wherein the reference image data is image data corrected by the image processor immediately before the correction of the target image data.

14. The image processing apparatus according to claim 1, wherein the reference image data is a plurality of pieces of image data generated by the image sensor before the image data corresponding to the correction target image data.

15. The image processing apparatus according to claim 1, wherein the blinking defect noise is a random telegraph signal noise.

16. An image processing method performed by an image processing apparatus for correcting blinking defect noise contained in image data generated by an image sensor, the image sensor comprising: a plurality of pixels arranged two-dimensionally and configured to receive light from outside to generate a signal according to an amount of the received light; and a plurality of reading circuits configured to read the signal as a pixel value, the image processing method comprising:
acquiring the image data and noise information including one of positional information on a reading circuit in which blinking defect noise caused by the reading circuit occurs and positional information on each of the pixels;
setting the acquired image data as correction target image data;
determining a movement amount of a subject based on the correction target image data and reference image data, the reference image data being based on image data acquired at a time different from the acquisition of the correction target image data;
estimating a random noise amount around a pixel of interest of the correction target image data;
acquiring a reference pixel of the reference image data corresponding to one of the pixel of interest and a neighboring pixel of the pixel of interest, based on the movement amount;
determining, based on the random noise amount, a representative value that indicates an expected pixel value in which blinking defect noise does not occur; and
correcting the pixel value of the pixel of interest based on the representative value.

17. A non-transitory computer-readable recording medium recording a program that causes an image processing apparatus for correcting blinking defect noise contained in image data generated by an image sensor, the image sensor comprising: a plurality of pixels arranged two-dimensionally and configured to receive light from outside to generate a signal according to an amount of the received light; and a plurality of reading circuits configured to read the signal as a pixel value, to execute:
acquiring the image data and noise information including one of positional information on a reading circuit in which blinking defect noise caused by the reading circuit occurs and positional information on each of the pixels;
setting the acquired image data as correction target image data;
determining a movement amount of a subject based on the correction target image data and reference image data, the reference image data being based on image data acquired at a time different from the acquisition of the correction target image data;
estimating a random noise amount around a pixel of interest of the correction target image data;
acquiring a reference pixel of the reference image data corresponding to one of the pixel of interest and a neighboring pixel of the pixel of interest, based on the movement amount;
determining, based on the random noise amount, a representative value that indicates an expected pixel value in which blinking defect noise does not occur; and
correcting the pixel value of the pixel of interest based on the representative value.

* * * * *